United States Patent
Barnidge et al.

(10) Patent No.: US 12,546,782 B2
(45) Date of Patent: Feb. 10, 2026

(54) IDENTIFICATION AND MONITORING OF MONOCLONAL IMMUNOGLOBULINS RELATED TO MONOCLONAL GAMMOPATHY BY MOLECULAR MASS WITH MASS SPECTROMETRY

(71) Applicant: MAYO FOUNDATION FOR MEDICAL EDUCATION AND RESEARCH, Rochester, MN (US)

(72) Inventors: David R. Barnidge, Rochester, MN (US); David L. Murray, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 0 days.

(21) Appl. No.: 14/777,236

(22) PCT Filed: Mar. 10, 2014

(86) PCT No.: PCT/US2014/022475
§ 371 (c)(1),
(2) Date: Sep. 15, 2015

(87) PCT Pub. No.: WO2014/150170
PCT Pub. Date: Sep. 25, 2014

(65) Prior Publication Data
US 2016/0041184 A1    Feb. 11, 2016

Related U.S. Application Data

(60) Provisional application No. 61/792,944, filed on Mar. 15, 2013.

(51) Int. Cl.
G01N 33/68    (2006.01)
G01N 30/72    (2006.01)
(Continued)

(52) U.S. Cl.
CPC ..... *G01N 33/6848* (2013.01); *G01N 30/7233* (2013.01); *G01N 33/57426* (2013.01);
(Continued)

(58) Field of Classification Search
CPC ...................................................... G01N 33/68
(Continued)

(56) References Cited

U.S. PATENT DOCUMENTS 1,075,394 A * 10/1913 Band ......................... A41B 3/00
2/129
5,567,282 A * 10/1996 Wang ................. G01N 33/6854
204/450
(Continued)

FOREIGN PATENT DOCUMENTS

CN        101354379 A  *  1/2009
CN        103217499       7/2013
(Continued)

OTHER PUBLICATIONS

Frangione, B., "Structure of Human Immuniglobulins and their Varient" in Immunogenetics and Immunodeficiency, 1975, 1-53, Benacerraf, B. Ed.*

(Continued)

*Primary Examiner* — Arlen Soderquist
(74) *Attorney, Agent, or Firm* — Fish & Richardson P.C.

(57) ABSTRACT

Disclosure herein are methods for determining whether or not an immunoglobulin is present above the polyclonal background level in a biological sample, and methods for determining whether an immunoglobulin contains a kappa or lambda light chain. These methods are useful for screening biological samples for the presence or absence of monoclonal gammopathy, and for diagnosing and monitoring monoclonal gammopathy in a subject.

10 Claims, 25 Drawing Sheets

(51) Int. Cl.
  *G01N 33/574* (2006.01)
  *H01J 49/00* (2006.01)
  *H01J 49/16* (2006.01)

(52) U.S. Cl.
  CPC ..... *G01N 33/6851* (2013.01); *G01N 33/6857* (2013.01); *H01J 49/0027* (2013.01); *H01J 49/164* (2013.01); *G01N 2800/52* (2013.01)

(58) Field of Classification Search
  USPC .................................................. 436/86, 173
  See application file for complete search history.

(56) References Cited

U.S. PATENT DOCUMENTS

| | | | |
|---|---|---|---|
| 5,846,735 A | | 12/1998 | Stapleton et al. |
| 5,922,184 A * | | 7/1999 | Binder ............. G01N 27/44721 702/22 |
| 8,501,907 B2 | | 8/2013 | Jordan et al. |
| 8,679,767 B2 | | 3/2014 | Kaur et al. |
| 10,267,806 B2 * | | 4/2019 | Murray .............. G01N 33/6857 |
| 11,604,196 B2 * | | 3/2023 | Murray .............. G01N 33/6857 |
| 2002/0182649 A1 * | | 12/2002 | Weinberger ........ G01N 33/6803 435/7.9 |
| 2003/0027216 A1 | | 2/2003 | Kiernan et al. |
| 2005/0009009 A1 * | | 1/2005 | Peiris ..................... C07H 21/04 435/5 |
| 2005/0064422 A1 | | 3/2005 | Barnidge et al. |
| 2005/0064511 A1 * | | 3/2005 | Buechler ................ G01N 33/74 435/7.1 |
| 2005/0191677 A1 * | | 9/2005 | Franzen ............... G01N 33/6848 436/526 |
| 2005/0232929 A1 * | | 10/2005 | Kadkhodayan ........ C07K 16/32 435/7.1 |
| 2006/0024296 A1 * | | 2/2006 | Williams ......... C07K 14/70503 424/133.1 |
| 2006/0177870 A1 * | | 8/2006 | Tai-Tung ............... G16B 40/20 435/7.1 |
| 2006/0281122 A1 * | | 12/2006 | Bryant ................. C12Q 1/6886 435/6.16 |
| 2007/0015222 A1 | | 1/2007 | Kaneko et al. |
| 2007/0041979 A1 * | | 2/2007 | Raju ....................... A61P 43/00 435/68.1 |
| 2007/0054407 A1 | | 3/2007 | Chen et al. |
| 2007/0105181 A1 | | 5/2007 | Pope et al. |
| 2007/0184470 A1 | | 8/2007 | Arman et al. |
| 2007/0259398 A1 * | | 11/2007 | Arnott ..................... C12P 21/00 435/68.1 |
| 2007/0292441 A1 * | | 12/2007 | Glover ................ C07K 16/2884 424/174.1 |
| 2008/0026949 A1 | | 1/2008 | Hoidal et al. |
| 2008/0060092 A1 * | | 3/2008 | Dickey ................... A61P 29/00 536/23.6 |
| 2008/0064055 A1 * | | 3/2008 | Bryant ................. C12Q 1/6886 435/29 |
| 2008/0131882 A1 * | | 6/2008 | Rasmussen ........ G01N 33/6803 435/7.1 |
| 2008/0142696 A1 | | 6/2008 | Geromanos et al. |
| 2008/0166742 A1 * | | 7/2008 | Bradwell ........ G01N 33/57426 435/7.92 |
| 2008/0171312 A1 | | 7/2008 | Ley et al. |
| 2008/0317745 A1 * | | 12/2008 | Boruchov ........... C07K 16/283 424/133.1 |
| 2009/0155280 A1 | | 6/2009 | Jordan et al. |
| 2009/0186423 A1 * | | 7/2009 | Frandsen ............... C07K 16/34 436/512 |
| 2009/0203602 A1 * | | 8/2009 | Gelber ................. C12Q 1/6883 514/5.9 |
| 2009/0258828 A1 | | 10/2009 | Beuerman et al. |
| 2010/0015652 A1 | | 1/2010 | Granda et al. |
| 2010/0054996 A1 * | | 3/2010 | Oh .................. G01N 33/54313 422/68.1 |
| 2010/0086922 A1 * | | 4/2010 | Bryant ................. C12Q 1/6883 435/5 |
| 2010/0167267 A1 | | 7/2010 | Schulzknappe et al. |
| 2010/0190652 A1 | | 7/2010 | Nagalla et al. |
| 2010/0261216 A1 * | | 10/2010 | Eser ......................... C12Q 1/34 435/24 |
| 2010/0323381 A1 | | 12/2010 | Bergen, III et al. |
| 2011/0065199 A1 | | 3/2011 | Kuge et al. |
| 2011/0117021 A1 | | 5/2011 | Smith et al. |
| 2011/0151494 A1 | | 6/2011 | Koomen et al. |
| 2011/0183426 A1 | | 7/2011 | Chan et al. |
| 2011/0294150 A1 | | 12/2011 | Koll et al. |
| 2012/0014940 A1 * | | 1/2012 | Preuss ................ G01N 33/6854 424/131.1 |
| 2012/0109537 A1 * | | 5/2012 | Makarov ............. H01J 49/0036 702/27 |
| 2012/0208295 A1 * | | 8/2012 | Wang ..................... H01J 49/164 536/23.1 |
| 2012/0309040 A1 | | 12/2012 | Madian et al. |
| 2012/0315645 A1 | | 12/2012 | Kaur et al. |
| 2012/0322073 A1 | | 12/2012 | Lopez-Girona |
| 2013/0040851 A1 | | 2/2013 | Hanzawa et al. |
| 2013/0149389 A1 | | 6/2013 | Flora et al. |
| 2013/0178370 A1 | | 7/2013 | Lavnder et al. |
| 2013/0178385 A1 | | 7/2013 | Bahn et al. |
| 2013/0185096 A1 * | | 7/2013 | Giusti ..................... G06Q 50/24 705/3 |
| 2013/0260406 A1 | | 10/2013 | Koomen et al. |
| 2014/0045276 A1 | | 2/2014 | Singh et al. |
| 2014/0186332 A1 | | 7/2014 | Ezrn et al. |
| 2014/0242072 A1 * | | 8/2014 | Hansson ............... C07K 16/2821 424/133.1 |
| 2014/0242624 A1 * | | 8/2014 | Valliere-Douglass ...................... G01N 33/6848 435/18 |
| 2014/0249049 A1 | | 9/2014 | Stoll et al. |
| 2014/0249142 A1 * | | 9/2014 | Treon ................... C12Q 1/6886 514/262.1 |
| 2015/0051839 A1 * | | 2/2015 | Harding ................. G16H 50/30 702/19 |
| 2015/0204884 A1 | | 7/2015 | Robblee |
| 2015/0219665 A1 | | 8/2015 | Chapple et al. |
| 2015/0276771 A1 | | 10/2015 | Madasamy |
| 2015/0340219 A1 * | | 11/2015 | Mellors ................. H01J 49/165 250/288 |
| 2015/0362506 A1 | | 12/2015 | Zhu et al. |
| 2016/0033511 A1 | | 2/2016 | Pannell et al. |
| 2016/0047819 A1 | | 2/2016 | Viscom et al. |
| 2016/0206660 A1 | | 7/2016 | Shi et al. |
| 2016/0231329 A1 | | 8/2016 | Olsson et al. |
| 2016/0257763 A1 | | 9/2016 | Von Kreudenstein et al. |
| 2016/0349269 A1 | | 12/2016 | Hunt et al. |
| 2017/0023584 A1 | | 1/2017 | Murray et al. |
| 2017/0044608 A1 | | 2/2017 | Wang et al. |
| 2017/0205423 A1 | | 7/2017 | Higel et al. |
| 2017/0336419 A1 | | 11/2017 | Tran et al. |
| 2018/0267057 A1 | | 9/2018 | Barnidge et al. |
| 2019/0195888 A1 | | 6/2019 | Barnidge et al. |
| 2020/0003784 A1 | | 1/2020 | Murray et al. |
| 2020/0271663 A1 | | 8/2020 | Murray et al. |
| 2020/0284800 A1 | | 9/2020 | Murray et al. |
| 2020/0292556 A1 | | 9/2020 | Murray et al. |
| 2020/0341003 A1 | | 10/2020 | Murray et al. |
| 2023/0243845 A1 | | 8/2023 | Murray et al. |

FOREIGN PATENT DOCUMENTS

| | | | |
|---|---|---|---|
| CN | 103497254 | | 1/2014 |
| CN | 103792315 | | 5/2014 |
| DE | 102005042100 A1 * | 3/2007 | ......... G01N 33/6893 |
| DE | 102005042132 A1 * | 3/2007 | ........... C12Q 1/6883 |
| EP | 1329719 | | 7/2003 |
| EP | 2233502 | | 9/2010 |
| EP | 3270154 | | 1/2018 |
| JP | H04-49299 A | | 2/1992 |
| JP | 2011-522213 | | 7/2011 |
| SG | 183701 | | 9/2012 |
| WO | WO-03050517 A1 * | 6/2003 | ............. B82Y 30/00 |
| WO | WO-2005071421 A1 * | 8/2005 | ......... G01N 33/6887 |
| WO | WO 2005/101017 | | 10/2005 |

(56) References Cited

FOREIGN PATENT DOCUMENTS

| WO | WO 2008/057083 | 12/2006 | |
|---|---|---|---|
| WO | WO2006138629 | 12/2006 | |
| WO | WO-2008010677 A1 * | 1/2008 | ............ B01L 3/5027 |
| WO | WO-2009065414 A1 * | 5/2009 | ............ C07K 16/34 |
| WO | WO-2010002911 A2 * | 1/2010 | ............ A61P 35/00 |
| WO | WO 2010/119295 | 10/2010 | |
| WO | WO 2011/077129 | 6/2011 | |
| WO | WO 2012/056232 | 5/2012 | |
| WO | WO 2013/049410 | 4/2013 | |
| WO | WO 2013/096451 | 6/2013 | |
| WO | WO 2013/185180 | 12/2013 | |
| WO | WO 2014/078374 | 5/2014 | |
| WO | WO 2014/105985 | 7/2014 | |
| WO | WO2014109927 | 7/2014 | |
| WO | WO 2014/121031 | 8/2014 | |
| WO | WO2014150170 | 9/2014 | |
| WO | WO 2015/131169 | 9/2015 | |
| WO | WO2015154052 | 10/2015 | |
| WO | WO2016018978 | 2/2016 | |
| WO | WO 2016/134365 | 8/2016 | |
| WO | WO 2016/172485 | 10/2016 | |
| WO | WO 2017/022315 | 2/2017 | |
| WO | WO 2017/134274 | 8/2017 | |
| WO | WO 2017/144903 | 8/2017 | |
| WO | WO 2017/180735 | 10/2017 | |
| WO | WO 2017/205694 | 11/2017 | |
| WO | WO 2018/049001 | 3/2018 | |

OTHER PUBLICATIONS

Hieter, P. A. et al, Nature 1981, 294, 536-540.*
Pang, J. X. et al, Journal of Proteome Research 2002, 1, 161-169.*
Aucouturier, P. et al, "Monoclonal immunoglobulin light chains associated to Fanconi's syndrome" in Monoclonal Gammopathies and the Kidney 2003, 87-92, Touchard, G. et al, Eds, Kluwer Academic Publishers.*
Bergen, H. R. et al, Biomedical Chromatography 2004, 18, 191-201.*
Bergon E. et al, Clinical Chemistry and Laboratory Medicine 2005, 43, 721-723.*
Bermudez-Crespo, J. et al, Proteomics Clinical Applications 2007, 1, 983-1003.*
Hagman, C. et al, Analytical Chemistry 2008, 80, 1290-1296.*
Koomen, J. M. et al, Molecular & Cellular Proteomics 2008, 7, 1780-1794.*
Hsieh, F. Y. et al, Journal of Pharmaceutical and Biomedical Analysis 2009, 49, 115-122.*
Wang, Q.-T. et al, Anatomical Record 2009, 292, 604-610.*
Landgren, O. et al, Blood 2009, 113, 5412-5417.*
Radovic, V. V., Journal of Medical Biochemistry 2010, 29, 1-8.*
De Costa, . et al, Journal of Proteome Research 2010, 9, 2937-2945.*
VanDuijn, M. M. et al, Journal of Biological Chemistry 2010, 285, 29247-29253.*
Remily-Wood, E. R. et al, Proteomics Clinical Applications 2011, 5, 383-396.*
Dekker, L. J. M. et al, Analytical and Bioanalytical Chemistry 2011, 399, 1081-1091.*
Li, H. et al, Analytical Chemistry 2012, 84, 1267-1273.*
Merlini, G. et al, Hematology 2012, 595-603.*
Leung, N. et al, Blood, 2012, 120, 4292-4295.*
Cohen, S., Journal of Clinical Pathology 1975, 28 Supplement, 1-7.*
Kroon, D. J. et al, Pharmaceutical Research 1992, 9, 1386-1393.*
Bourell, J. H. et al, Analytical Chemistry 1994, 66, 2088-2095.*
Bennett, K. L. et al, Analytical Biochemistry 1997, 245, 17-27.*
Hagmann, M.-L. et al, Journal of Chromatography A 1998, 816, 49-58.*
Adamczyk, M. et al, Journal of Immunological Methods 2000, 237, 95-104.*
Lebeau, A. et al, Blood 2002, 100, 1817-1827.*
Stubbs, E. B. et al, Acta Neuropathology 2003, 105, 109-116.*
Joosten, V. et al, Microbial Cell Factories 2003, 2,1 (15 pages).*
Jones, R. G. A. et al, Journal of Immunological Methods 2003, 275, 239-250.*
Favereaux, A. et al, Journal of Neurology, Neurosurgery, and Psychiatry 2003, 74, 1262-1266.*
Cordoba, A. J. et al, Journal of Chromatography B 2005, 818, 115-121.*
Ren, D. et al, Journal of Chromatography A 2008, 1179, 198-204.*
Kaplan, B. et al, British Journal of Haematology 2008, 144, 705-715.*
Sethi, S. et al, Clinical Journal of the American Society of Nephrology 2010, 5, 2180-2187.*
Rajkumar, S. V. et al, Mayo Clinic Proceedings 2010, 85, 945-948.*
Chen, G. et al, Drug Discovery Today 2011, 16, 58-64.*
Kaltashov, I. A. et al, Biotechnology Advances 2012, 30, 210-222.*
Cheung, W. C. et al, Nature Biotechnology 2012, 30, 447-452.*
Whiteaker, J. R. et al, Molecular & Cellular Proteomics 2012, 11, 10.1074/mcp.M111.015347, 10 pages.*
Abcam, "Understanding secondary antibodies" 2012, 12 pages, downloaded from http://docs.abcam.com/pdf/general/understanding_secondary_antibodies.pdf.*
Adamczyk, M. et al, Rapid Communications in Mass Spectrometry 2000, 14, 49-51.*
Zhang, Z. et al, Analytical Chemistry 2007, 79, 5723-5729.*
Bondarenko, P. V. et al, Journal of the American Society for Mass Spectrometry 2009, 20, 1415-1424.*
Lu, C.-H. et al, Journal of Proteomics & Bioinformatics 2010, 3, 005-009.*
Schaefer, E. W. et al, Cancer 2010, 116, 640-646.*
Aucouturier, P. et al, Journal of Immunology 1993, 150, 3561-3568.*
Kalaga, R. et al, Journal of Immunology 1995, 155, 2695-2702.*
Abraham,, R. S. et al, Clinical Chemistry 2002, 48, 655-657.*
Marien, G. et al, Clinical Chemistry 2002, 48, 1600-1601.*
Kyle, R. A. et al, The International Myeloma Working Group British Journal of Haematology, 2003, 121, 749-757.*
Damoc, E. et al, Proteomics 2003, 3, 1425-1433.*
Coriu, D. et al, Blood, 2004, 104, 829-831.*
Chung, C. M. et al, Biophysical Journal 2005, 88, 4232-4242.*
Dillon, T. M. et al, Journal of Chromatography A 2006, 1120, 112-1230.*
Hill, P. G. et al, Clinical Chemistry 2006, 52, 1743-1748.*
Johnson, K. A. et al, Analytical Biochemistry 2007, 360, 75-83.*
Dear, A. et al, Haematologica 2007, 92, e111-e117.*
Mimura, Y. et al, Journal of Immunological Methods 2007, 326, 116-126.*
Barratt, M. et al, Canadian Medical Association Journal 2007, 177, 361-368.*
Kaplan, B. et al, Clinical Chemistry and Laboratory Medicine 2008, 46, 335-341.*
Alldridge, L. et al, Journal of Proteome Research 2008, 7, 1458-1469.*
Piehler, A. P. et al, Clinical Chemistry 2008, 54, 1823-1830.*
Micallef, J. et al, Journal of Hematology & Oncology 2010, 3, 11 pages.*
Mohr, J. et al, Proteomics 2010, 10, 3598-3609.*
Holding, S. et al, Clinical Chemistry and Laboratory Medicine 2011, 49, 83-88.*
Kaplan, B. et al, The Scientific World Journal 2011, 11, 726-735.*
Ruan, Q. et al, Analytical Chemistry 2011, 83, 8937-8944.*
Wang, Y. et al, Journal of Pharmaceutical and Biomedical Analysis 2012, 70, 440-446.*
Gucinski, A. C. et al, Analytical Chemistry 2012, 84, 8045-8051.*
Breitkopf, S. B. et al, Proceedings of the National Academy of Sciences 2012, 109, 16190-16195.*
Rosati, S. et al, Angewandte Chemie International Edition 2012, 51, 12992-12996.*
Beck, A. et al, Analytical Chemistry 2013, 85, 715-736.*
Murray, D. et al, Critical Reviews in Clinical Laboratory Sciences 2013, 50, 91-102.*
Legros, V. et al, Protein Science 2000, 9, 1002-1010.*

(56) References Cited

OTHER PUBLICATIONS

Sun, S. et al, Rapid Communications in Mass Spectrometry 2001, 15, 708-712.*
Huse, K. et al, Journal or Biochemical and Biophysical Methods 2002, 51, 217-231.*
Qin, S. et al, Proteomics 2006, 6, 3199-3209.*
Faca, V. et al, BioTechniques 2007, 43, 279-282.*
Gadgil, H. S. et al, Jornal of Pharmaceutical Sciences 2007, 96, 2607-2621.*
Kleemann, G. R. et al, Analytical Chemistry 2008, 80, 2001-2009.*
Hanash, S. M. et al, Nature 2008, 45, 571-579.*
Wagner-Rousset, E. et al, Journal of Chromatography B 2008, 872, 23-37.*
Vrana,, J. A. et al, Blood 2009, 114, 4957-4960.*
Reid,, C. Q. et al, Biotechnology and Bioengineering 2010, 107, 85-95.*
Chevreux, G. et al, Analytical Biochemistry 2011, 415, 212-214.*
Mazur, M. T. et al, American Association of Pharmaceutical Scientists Journal 2012, 14, 530-541.*
Kissel, J. T. et al, Neuromuscular Disorders 1995, 6, 3-18.*
Roberts, G. D. et al, Analytical Chemistry 1995, 67, 3613-3625.*
Kiselar, J. G. et al, Analytical Chemistry 1999, 71, 1792-1801.*
Attealmannan, M. et al, Clinical Chemistry 2000.*
Lim, A. et al, Analytical Biochemistry 2001, 295, 45-56.*
Markowitz, G. S., Advances in Anatomic Pathology 2004, 11, 49-63.*
Wang, L. et al, Pharmaceutical Research 2005, 22, 1338-1349.*
Sikkink, L. A. et al, Amyloid 2008; 15, 29-39.*
Shaheen, S. P. et al, Advances in Anatomic Pathology 2008, 15, 196-210.*
Mischak, H. et al, Journal of Medical Biochemistry 2009, 28, 223-234.*
Persson, P. et al, Analytical Chemistry 2010, 82, 7274-7282.*
Hutchison, C. A. et al, Nature Reviews Nephrology 2012, 8, 43-51.*
Haeney, M., "Monoclonal Immunoglobulins" in Immunoglobulins in Health and Disease. Immunology and Medicine Series, vol. 1, French M.A.H. (eds), Springer, Dordrecht !986, 143-172.*
Cutillas, P. R. et al, Clinical Science 2003, 104, 483-490.*
Hutchison, C. A. et al, Clinical Journal of the American Society of Nephrology 2008, 3, 1684-1690.*
Grodzki, A. C. et al, in "Immunocytochemical Methods and Protocols, Methods in Molecular Biology" C. Oliver et al, (eds), Humana press 1995, 588, 33-41.*
Kyle, R. A., Archives of Pathology & Laboratory Medicine 1999, 123, 114-118.*
Nemeth-Cawley, J. F. et al, Journal of Proteome Research 2003, 2, 495-505.*
Bida, J. P. et al, Mayo Clinic Proceedings 2009, 84, 685-693.*
Tissot, J. D. et al, Applied and Theoretical Electrophoresis 1991, 2, 7-12.*
Tsai, P. K. et al, Pharmaceutical Research 1993, 10, 1580-1586.*
Attaelmannan, M. et al, Clinical Chemistry 2000, 46, 1230-1238.*
Bhattacharyya, S. et al, Disease Markers 2006, 22, 245-255.*
Siuti, N. et al, Nature Methods 2007, 4, 817-821.*
Fang, X. et al, Journal of Proteomics 2008, 71, 284-303.*
Perdivara, I. Thesis 2009, 185 pages.*
Ankeny, D. P. et al, Journal of Clinical Investigation 2009, 119, 2990-2999.*
Lu, Q. et al, Analytical Chemistry 2009, 81, 8715-8723.*
Cumova, J. et al, Molecular Biotechnology 2011, 47, 83-93.*
Kahn, S. N. et al, Laboratory Medicine 1987, 18, 170-172 (Year: 1987).*
Favereaux, A. et al, Journal of Neurology, Neurosurgery, and Psychiatry 2003, 74, 1262-1266. (Year: 2003).*
Paradis, V. et al, Gasteroenterology 2004, 126, 1323-1329. (Year: 2004).*
Dillon, T. M. et al, Journal of Chromatography A 2004, 1053, 299-305. (Year: 2004).*
Le, J. C. et al, Journal of the American Society for Mass Spectrometry 2005, 16, 307-311. (Year: 2004).*
Moore, J. S. et al, AIDS 2005, 19, (Year: 2005).*
Lyubarskaya, Y, et al, Analytical Biochemistry 2006, 348, 24-39. (Year: 2006).*
Gadgil, H. S. et al, Journal of the American Society for Mass Spectrometry 2006, 17, 867-872. (Year: 2006).*
Guedj, N. et al, Laboratory Investigation 2006, 86, 951-958. (Year: 2006).*
Cole, J. R. et al, Analytical Chemistry 2007, 79, 273-279. (Year: 2007).*
Yang, Z. et al, Analytical Chemistry 2007, 79, 9294-9301. (Year: 2007).*
Olivova, P. et al, Rapid Communications in Mass Spectrometry 2008, 22, 29-40. (Year: 2008).*
Brady, L. J, et al, Journal of the American Society for Mass Spectrometry 2008, 19, 502-509. (Year: 2008).*
McCudden, V. R. et al, American Journal of Clinical Pathology 2008, 129, 451-458. (Year: 2008).*
Schild, C. et al, Clinical Chemistry and Laboratory Medicine 2008, 46, 876-877. (Year: 2008).*
Bergon, E. et al, Clinical Chemistry and Laboratory Medicine 2008, 46, 1156-1162. (Year: 2008).*
Damen, C. W. N. et al, Journal of the American Society for Mass Spectrometry 2009, 20, 2021-2033. (Year: 2009).*
Liu, H. et al, Journal of the American Society for Mass Spectrometry 2009, 20, 2258-2264. (Year: 2009).*
Dornmair, K. et al, Seminars in Immunopathology 2009, 31, 467-477. (Year: 2009).*
Kaneko, S. et al, Clinical and Experimental Nephrology 2010, 14, 389-395. (Year: 2010).*
Janin-Bussat,, M.-C. et al, in Antibody Engineering Kontermann, R. et al, (eds), Springer-Verlag Berlin Heidelberg 2010, 613-634. (Year: 2010).*
Zhang, J. et al, Journal of Mass Spectrometry 2010, 45, 112-120. (Year: 2010).*
Xu, K. et al, Analytical Biochemistry 2011, 412, 56-66. (Year: 2011).*
Alvarez, M. et al, Analytical Biochemistry 2011, 419, 17-25. (Year: 2011).*
Hao, Z. et al, Thermo Scientific Note 2012, 9 pages. (Year: 2012).*
Rosati, S. et al, Analytical Chemistry 2012, 84, 7227-7232. (Year: 2012).*
Rose, R. J. et al, Nature Methods 2012, 9, 1084-1086 with 2 pages of supplementary material. (Year: 2012).*
Maleszewski, J. J. et al, Cardiovascular Pathology 2013, 22, 189-194. (Year: 2013).*
Hale, J. E., International Journal of Proteomics 2013, Article ID 219452, 6 pages. (Year: 2013).*
Dati, F. et al, European Journal of Clinical Chemistry and Clinical Biochemistry 1996, 34, 517-520. (Year: 1996).*
Torres, M. et al, Journal of Biological Chemistry 2007, 282 13917-13927. (Year: 2007).*
Kuker, B. et al, Pharmaceutical Research 2010, 27, 2197-2204. (Year: 2010).*
Maisnar, V. et al, Clinical Biochemistry 2011, 44, 403-405. (Year: 2011).*
Arentz, G. et al, Journal of Autoimmunity 2012, 39, 466-470. (Year: 2012).*
Ludwig, H. et al, Blood 2012, 120, abstract 1828. (Year: 2012).*
Nelson, R. W. et al, Rapid Communications in Mass Spectrometry 1994, 8, 627-631. (Year: 1994).*
Nelson, R. W. et al, Rapid Communications in Mass Spectrometry 1995, 9, 625. (Year: 1995).*
Arun et al., "Immunohistochemical examination of light-chain expression (lambda/kappa ratio) in canine, feline, equine, bovine and porcine plasma cells," *Zentralbl Veterinarmed A.*, 43(9):573-576, Nov. 1996.
Awad et al., "Analyses of cerebrospinal fluid in the diagnosis and monitoring of multiple sclerosis," *J Neuroimmunol.*, 219(1-2):1-7, Epub Sep. 25, 2009.
Barnidge et al., "Monitoring free light chains in serum using mass spectrometry," Clinical Chemistry and Laboratory Medicine (CCLM). ISSN (Online) 1437-4331, ISSN (Print) 1434-6621, DOI: 10.1515/cclm-2015-0917, Feb. 2016.

(56) References Cited

OTHER PUBLICATIONS

Barnidge et al., "Monitoring M-proteins in patients with multiple myeloma using heavy-chain variable region clonotypic peptides and LC-MS/MS," *J Proteome Res.*, 13(4):1905-1910, Epub Mar. 5, 2014.

Barnidge et al., "Phenotyping polyclonal kappa and lambda light chain molecular mass distributions in patient serum using mass spectrometry," *J Proteome Res.*, 13(11):5198-5205, Epub Aug. 26, 2014.

Barnidge et al., "Using mass spectrometry to monitor monoclonal immunoglobulins in patients with a monoclonal gammopathy," *J Proteome Res.*, 13(3):1419-1427, Epub Feb. 11, 2014.

Barnidge, "Monitoring specific IgG tryptic peptides in multiple myeloma using the TripleTOFtm 5600 System," AB SCIEX Annual Users Meeting at ASMS, May 20, 2012, 28 slides.

Berg et al., "Mass spectrometry based proteomic analysis identifies two distinct types of cutaneous amyloidosis," *Mod Pathol.*, vol. 22; p100A, 2009.

Bois et al., "Cutaneous amyloidosis: mass spectrometry based proteomic analysis reveals diverse etiology associated with unique histopathological features," *Mod Pathol.*, 26:320A-321A, Feb. 2013.

Bradwell et al., "Highly sensitive, automated immunoassay for immunoglobulin free light chains in serum and urine," *Clin Chem.*, 47(4):673-680, Apr. 2001.

Brochet et al., "IMGT/V-QUEST: the highly customized and integrated system for IG and TR standardized V-J and V-D-J sequence analysis," *Nucleic Acids Res.*, 36(Web Server issue):W503-W508, Epub May 24, 2008.

Butler et al., "Immunoglobulins, antibody repertoire and B cell development," *Dev Comp Immunol.*, 33(3):321-333, Epub Sep. 18, 2008.

Dogan et al., "Leukocyte Chemotactic Factor 2 Amyloidosis: A Novel Type of Amyloidosis That Mimics AL Amyloidosis," presented at the United States and Canadian Academy of Pathology Annual Meeting, Mar. 2009, 1 page.

Fortini et al., "Cerebrospinal fluid oligoclonal bands in the diagnosis of multiple sclerosis. Isoelectric focusing with IgG immunoblotting compared with high-resolution agarose gel electrophoresis and cerebrospinal fluid IgG index," *Am J Clin Pathol.*, 120(5):672-675, Nov. 2003.

GenBank Accession AAA59107, "immunoglobulin lambda light chain C2 region, partial [*Homo sapiens*]," May 4, 2000, 2 pages.

Haraldsson et al., "Determination of kappa and lambda light chains in serum immunoglobulins G, A and M," *Ann Clin Biochem.*, 28 (Pt 5):461-466, Sep. 1991.

Jemal et al., "Cancer statistics, 2003," *CA Cancer J Clin.*, 53(1):5-26, Jan.-Feb. 2003.

Kabat et al., "An electrophoretic study of the protein components in cerebrospinal fluid and their relationship to the serum proteins," *J Clin Invest.*, 21(5):571-577, Sep. 1942.

Kohlhagen, "Using MALDI-TOF MS to Screen for Monoclonal Proteins in Serum," The Association for Mass Spectrometry Applications to the Clinical Lab [online] 2015. Retrieved from the Internet: <URL: https://www.msacl.org/2015_US_Long_Abstracts/201412041312_53747.pdf>, MSACL 2015 US: Preliminary Conference Program, San Diego, CA, Mar. 28-Apr. 1, 2015, 2 pages.

Kowarik et al., "The cerebrospinal fluid immunoglobulin transcriptome and proteome in neuromyelitis optica reveals central nervous system-specific B cell populations," *J Neuroinflammation.*, 12:19, Jan. 28, 2015.

Lefranc, "IMGT, the International ImMunoGeneTics Information System," *Cold Spring Harb Protoc.*, 2011(6):595-603, Jun. 1, 2011.

Li et al., "Simultaneous analysis of multiple monoclonal antibody biotherapeutics by LC-MS/MS method in rat plasma following cassette-dosing," *AAPS J.*, 15(2):337-346, Epub Dec. 12, 2012.

McBride et al., "Chromosomal location of human kappa and lambda immunoglobulin light chain constant region genes," *J Exp Med.*, 155(5):1480-1490, May 1, 1982.

Mukhopadhyay et al., "A tribute to Frank Anscombe and random central limit theorem from 1952," *Sequential Analysis*, 31(3): 265-277, 2012.

Murphy et al., "Characterization of systemic amyloid deposits by mass spectrometry," *Methods Enzymol.*, 412:48-62, 2006.

Obermeier et al., "Matching of oligoclonal immunoglobulin transcriptomes and proteomes of cerebrospinal fluid in multiple sclerosis," *Nat Med.*, 14(6):688-693, Epub May 18, 2008.

Rodriguez et al., "Immunoglobulin derived depositions in the nervous system: novel mass spectrometry application for protein characterization in formalin-fixed tissues," *Lab Invest.*, 88(10):1024-1037, Epub Aug. 18, 2008.

Singh et al., "Cerebrospinal-fluid-derived immunoglobulin G of different multiple sclerosis patients shares mutated sequences in complementarity determining regions," *Mol Cell Proteomics*, 12(12):3924-3934, Epub Aug. 22, 2013.

Song et al., "Characterization of N-terminal processing of group VIA phospholipase A2 and of potential cleavage sites of amyloid precursor protein constructs by automated identification of signature peptides in LC/MS/MS analyses of proteolytic digests," *J Am Soc Mass Spectrom.*, 15(12):1780-1793, Dec. 2004.

Sun et al., "Immunoglobulin genes and diversity: what we have learned from domestic animals, " *J Anim Sci Biotechnol.*, 3(1):18, Jun. 20, 2012.

Theis et al., "Immunoglobulin Light Chain Gene Constant Region Is an Invariable Part of Amyloid Deposits in AL Amyloidosis," *Blood*, 112(11):3128, Nov. 16, 2008.

Theis et al., "Mass spectrometry based proteomic analysis of AL amyloidosis: Immunoglobulin Light Chain Gene Constant Region Is an Invariable Part of Amyloid Deposits and provides valuable diagnostic target," presented at the United States and Canadian Academy of Pathology Annual Meeting, Mar. 2009, 1 page.

Thermo Scientific, "Melon™ Gel IgG Spin Purification Kit" [online], 2011 [retrieved on Aug. 6, 2015]. Retrieved from the Internet: <URL: https://tools.lifetechnologies.com/content/sfs/manuals/MAN0011513_Melon_Gel_IgG_Spin_Purifi_UG.pdf>, 4 pages.

Verheesen et al., "Beneficial properties of single-domain antibody fragments for application in immunoaffinity purification and immunoperfusion chromatography," *Biochim Biophys Acta.*, 1624(1-3):21-28, Dec. 5, 2003.

Vrana et al., "Amyloidosis typing based on Laser Microdissection and Mass Spectrometry of Paraffin-Embedded Tissue Biopsies" *Companion to Peripheral Neuropathy*, pp. 347-349, 2010.

Vrana et al., "Classification of Amyloidosis in Fat Aspiration Specimens Using Mass Spectrometry Based Proteomics," presented at the United States and Canadian Academy of Pathology Annual Meeting, Mar. 2009, 1 page.

Vrana et al., "Diagnosis and Classification of Amyloidosis in Abdominal Subcutaneous Fat Aspiration Specimens Using Mass Spectrometry Based Proteomics," *Blood*, 112(11):2710, Nov. 16, 2008.

Vrana et al., "Diagnosis and Typing of Cardiac Amyloidosis in Routine Clinical Specimens by Mass Spectrometry Based Proteomic Analysis," presented at the United States and Canadian Academy of Pathology Annual Meeting, Mar. 2009, 1 page.

International Preliminary Report on Patentability for PCT/US2014/022475, mailed Sep. 24, 2015, 8 pages.

International Search Report and Written Opinion for PCT/US2014/022475, mailed Jun. 9, 2014, 11 pages.

Abraham et al., "Trimolecular complexes of lambda light chain dimers in serum of a patient with multiple myeloma," *Clin Chem.*, 48(10):1805-1811, Oct. 2002.

Biosis accession No. PREV200200151435, 2 pages, Dec. 2001, abstract only.

Biosis accession No. PREV201100424453, 2 pages, Dec. 2010, abstract only.

Boissinot et al., "Up-Regulation of Anti-Inflammatory, STAT3-Activating Hepatocyte Growth Factor and Interleukin-11 in Polycythemia Vera Is Independent of JAK2V617F and Contributes to the Growth of Clonal Erythroblasts," *Blood*, 116(21):796, Nov. 2010, 52nd Annual Meeting of the American Society of Hematology, Orlando, FL, USA Dec. 4-7, 2010.

(56) References Cited

OTHER PUBLICATIONS

Heudi et al., "Towards absolute quantification of therapeutic monoclonal antibody in serum by LC-MS/MS using isotope-labeled antibody standard and protein cleavage isotope dilution mass spectrometry," *Anal Chem.*, 80(11):4200-4207, Epub May 9, 2008.

Jagannath et al., "Value of serum free light chain testing for the diagnosis and monitoring of monoclonal gammopathies in hematology," *Clin Lymphoma Myeloma*, 7(8):518-523, Sep. 2007.

Liu et al., "Quantitation of a recombinant monoclonal antibody in monkey serum by liquid chromatography-mass spectrometry," *Anal Biochem.*, 414(1):147-153, Epub Mar. 8, 2011.

Nasr et al., "Immunotactoid glomerulopathy: clinicopathologic and proteomic study," *Nephrol Dial Transplant.*, 27(11):4137-4146, Epub Aug. 7, 2012.

European Search Report for Application No. 14770418.3, dated Sep. 27, 2016, 10 pages.

"Abraham et al., ""Characterization of free immunoglobulin light chains (LC) by mass spectrometry in light chain-associated (AL) amyloidosis,"" American Society of Hematology 43rd Annual Meeting, part 2, Orlando, Florida, USA, 98(11 Pt 2), p. 31b, Abstract#3722, Nov. 16, 2001".

Barnidge et al., "Using MALDI-TOF MS to Screen for Monoclonal Gammopathies in Serum and Urine," 61st Annual ASMS Conference on Mass Spectrometry and Allied Topics, Minneapolis, MN, Jun. 9-13, 2013, 1 page poster.

Lu et al., "LC-MS Analysis of Polyclonal Human Anti-Neu5Gc Xeno-Autoantibodies Inmunoglobulin G Subclass and Partial Sequence Using Multistep Intravenous Immunoglobulin Affinity Purification and Multienzymatic Digestion," Analytical Chemistry., 84(6):2761-2768, Mar. 20, 2012.

Extended European Search Report in European Application No. 14/770,418.3, dated Feb. 10, 2017, 17 pages.

International Preliminary Report on Patentability for PCT/US2015/024379, mailed Oct. 13, 2016, 10 pages.

International Preliminary Report on Patentability for PCT/US2015/042580, issued Jan. 31, 2017, 10 pages.

International Search Report and Written Opinion for PCT/US2016/53675, mailed Feb. 28, 2017, 15 pages.

Extended European Search Report in European Application No. 15827198.1, dated Nov. 23, 2017, 12 pages.

Ladwig et al., "Quantification of serum IgG subclasses by use of subclass-specific tryptic peptides and liquid chromatography-tandem mass spectrometry," *Clin Chem.*, 60(8):1080-1088, May 5, 2014.

Willrich et al., "Quantitation of infliximab using clonotypic peptides and selective reaction monitoring by LC-MS/MS," *International Immunopharmacology.*, 28(1): 513-520, Sep. 1, 2015.

Willrich et al., "Serum infliximab quantitation by LC-MS/MS in patients treated for inflammatory disorders," *Gastroenterology AGA Abstracts.*, Sa1252, May 1, 2014, Retrieved from the internet: URL:https://ac.els-cdn.com/SOO16508514608568/1-S2.0-S0016508514608568-mai n.pdf?_tid=e58e3b4c-caOa-lle7-96b2-OOOOOaabOf6b&acdnat=1510753563_74ab7a6bOb5f976b8c948a995d894fce, Retrieved on Nov. 15, 2017, Abstract Only.

Anonymous: "KappaSelect LambdaFabSelect," Data File 28-9448-22 AB, Mar. 1, 2012, Retrieved from the Internet: URL: https://www.gelifesciences.co.jp/catalog/pdf/Kappaselect_LamdaFabSelect.pdf Retrieved on Sep. 22, 2017, 4 pages.

Gebski et al., "Affinity chromatography applications with single-domain antibodies," *Bioprocess International.*, Aug. 1, 2013, Retrieved from the Internet: URL: http://www.bioprocessintl.com/2013/affinity-chromatography-applications-with-single-domain-antibodies-345480/ Retrieved on Sep. 22, 2017.

Lindop et al., "Molecular signature of a public clonotypic autoantibody in primary Sjogren's syndrome: A "forbidden" clone in systemic autoimmunity," *Arthritis & Rheumatism.*, 63(11):3477- 3486, Oct. 28, 2011.

Thurgood et al., "An Immunodominant La/SSB autoantibody proteome derives from public clonotypes," *Clinical and Experimental Immunology.*, 174:237-244, Oct. 6, 2013.

Katzmann et al., "Serum reference intervals and diagnostic ranges for free kappa and free lambda immunoglobulin light chains: relative sensitivity for detection of monoclonal light chains," Clin. Chem., 48(9):1437-44, Sep. 2002.

Extended European Search Report in Application No. 18174068.9, dated Jul. 10, 2018, 9 pages.

Lavatelli et al., "A novel approach for the purification and proteomic analysis of pathogenic immunoglobulin free light chains from serum," Biochimica rt Biophysica Acta., 1814(3):409-419, 2011.

Alge et al., "Proteomic Analysis of Plasma Exosome-Associated Proteins Reveals That Differences In Kappa: Lambda Ratios Predict Severe Acute Graft-Versus-Host Disease Early After Allogeneic Hematopoietic Stem Cell Transplantation," Blood., 1278, Nov. 2010.

Chiasserini et al., "CSF proteome analysis in multiple sclerosis patients by two-dimensional electrophoresis," Eur. J. Neurol., 15(9):998-1001, Sep. 2008.

D'Aguanno et al., "Differential cerebro spinal fluid proteome investigation of Leber hereditary optic neuropathy (LHON) and multiple sclerosis," 193(1-2):156-160, Dec. 2007.

Fan et al., "Identification of Niemann-Pick C1 disease biomarkers through sphingolipid profiling," J. Lipid. Res., 54(10):2800-2814, Oct. 2013.

Leung et al., "A novel and rapid approach to protein expression profiling of cerebrospinal fluid (CSF) from medulloblastoma patients using functionalized magnetic beads, AnchorChipTM technology, MALDI-TOf and MALDI-TOF/TOF mass spectrometry," 33rd Meeting of the Society of Neuroscience, 751.3, Nov. 2003.

Oeckl et al., "CSF concentrations of cAMP and cGMP are lower in patients with Creutzfeldt-Jakob disease but not Parkinson's disease and amyotrophic lateral sclerosis," PLoS One, 7(3):e32664, Mar. 2012.

Stoop et al., "Quantitative MALDI-FT-ICR analysis of cerebrospinal fluid of relapsing-remitting and primary progressive multiple sclerosis patients," Multiple Sclerosis., 15(9):S83, Sep. 2009.

Zhaoyu et al., "Alteration of DBP levels in CSF of patients with MS by proteomics analysis," Cell Mol. Neurobiol., 29(2):203-210, Mar. 2009.

Barnidge and Murray, "Using Mass Spectrometry to Identify IgG Fc and Fab Fragments Produced by Plasmin in Patient Serum," Poster, Presented at American Society for Mass Spectrometry meeting on Jun. 7, 2016.

Bastian et al., "ntra- and interchain disulfide bridges of the human J chain in secretory immunoglobulin A," Biol. Chem. Hoppe Seyler., 373(12):1255-63, Dec. 1992.

De Lorenzi et al., "Urokinase links plasminogen activation and cell adhesion by cleavage of the RGD motif in vitronectin," EMBO reports, 17(7):982-98, Jul. 2016.

Drożdż et al., "Immunoglobulin cleavage by hypochlorous acid treatment," Clinica. Chimica. acta., 236(2):155-60, May 1995.

Kragten et al., "Site-specific analysis of the N-glycans on murine polymeric immunoglobulin A using liquid chromatography/electrospray mass spectrometry," Journal of Mass Spectrometry, 30(12):1679-86, Dec. 1995.

Mills et al., "Using mass spectrometry to quantify rituximab and perform individualized immunoglobulin phenotyping in ANCA-associated vasculitis," Analytical chemistry, 88(12):6317-25, Jun. 2016.

Wang et al., "Molecular basis of assembly and activation of complement component C1 in complex with immunoglobulin Gl and antigen," Molecular cell, 63(1):135-45, Jul. 2016.

Wine, Y. et al. Molecular deconvolution of the monoclonal antibodies that comprise the polyclonal serum response, PNAS vol. 110, No. 8, pp. 2993-2998 (Year: 2013).

Yamazaki et al., "A proteolytic modification of AIM promotes its renal excretion," Scientific Reports, 6:38762, Dec. 2016.

Acera et al., "Changes in tear protein profile in keratoconus disease," Eye, 25(9):1225-33, Sep. 2011.

(56) References Cited

OTHER PUBLICATIONS

Aisina and Mukhametova, "Structure and Function of Plasminogen/Plasmin System," Russian Journal of Bioorganic Chemistry, 40(6):590-605, Nov. 2014.
Balakrishnan et al., "Differential proteomic analysis of synovial fluid from rheumatoid arthritis and osteoarthritis patients," Clin. Proteomics., 11(1):1, 2014.
Baldini et al., "Correspondence between salivary proteomic pattern and clinical course in primary Sjögren syndrome and non-Hodgkin's lymphoma: a case report," Journal of translational medicine, 9(1):188, Dec. 2011.
Chow et al., "Serum immune-related proteins are differentially expressed during hibernation in the American black bear," PLoS One, 8(6), 2013.
Cohen et al., "β-Elimination and peptide bond hydrolysis: two distinct mechanisms of human IgG1 hinge fragmentation upon storage," Journal of the American Chemical Society, 129(22):6976-7, Jun. 2007.
Cretu, "Identification and Validation of Candidate Soluble Biomarkers for Psoriatic Arthritis Using Quantitative Proteomics (Doctoral dissertation)", 2015.
Dai et al., "Proteomic study of peripheral blood mononuclear cells in systemic lupus erythematosus," Lupus, Sep. 2008, 17(9):799-804.
Deng et al., "Plasma proteomic analysis of pancreatic cancer by 2-dimensional gel electrophoresis," Pancreas, 34(3):310-7, Apr. 2007.
Deshpande et al., "GlycoSpectrumScan: fishing glycopeptides from MS spectra of protease digests of human colostrum sIgA," Journal of proteome research, 9(2):1063-75, Feb. 2010.
Ellias et al., "Proteomic analysis of saliva identifies potential biomarkers for orthodontic tooth movement," The Scientific World Journal, 2012.
Fan et al., "A single proteolytic cleavage within the lower hinge of trastuzumab reduces immune effector function and in vivo efficacy," Breast Cancer Research, Aug. 2012, 14(4):R116.
Ghafouri et al., "Newly identified proteins in human nasal lavage fluid from non-smokers and smokers using two-dimensional gel electrophoresis and peptide mass fingerprinting," Proteomics: International Edition, 2(1):112-20, Jan. 2002.
Goetze et al., "High-mannose glycans on the Fc region of therapeutic IgG antibodies increase serum clearance in humans," Glycobiology, 21(7):949-59, Jul. 2011.
Grazio et al., "Differential expression of proteins with heparin affinity in patients with rheumatoid and psoriatic arthritis: a preliminary study," Clin. Exp. Rheumatol., 31(5):665-671, 2013.
Hess et al., "Immunoglobulin cleavage by the streptococcal cysteine protease IdeS can be detected using protein G capture and mass spectrometry," Journal of microbiological methods, Aug. 2007, 70(2):284-91.
Huang et al., "Site-specific glycosylation of secretory immunoglobulin A from human colostrum. Journal of proteome research, " 14(3):1335-49, Mar. 2015.
Iannaccone et al., "Retinal pigment epithelium and microglia express the CD5 antigen-like protein, a novel autoantigen in age-related macular degeneration," Exp Eye Res., 155:64-74, 2017.
Ito and Arata, "Proton nuclear magnetic resonance study on the dynamics of the conformation of the hinge segment of human G1 immunoglobulin," Biochemistry, Nov. 1985, 24(23):6467-74.
Kim et al., "Prediction of Response to Sorafenib in Hepatocellular Carcinoma: A Putative Marker Panel by Multiple Reaction Monitoring-Mass Spectrometry (MRM-MS)," Mol. Cell Proteomics., 16(7):1312-132, 2017.
Koh et al., "Characterization of exosomes from body fluids of dairy cows," J. Anim. Sci., 95(9):3893-3904, 2017.
Kolialexi et al., "Plasma biomarkers for the identification of women at risk for early-onset preeclampsia," Expert Rev. Proteomics., 14(3):269-276, 2017.

Kurokawa et al., "Macrophage-derived AIM is endocytosed into adipocytes and decreases lipid droplets via inhibition of fatty acid synthase activity," Cell metabolism, 11(6):479-92, Jun. 2010.
Lee et al., "Relationship between Group-Specific Component Protein and the Development of Asthma," American journal of respiratory and critical care medicine 184(5):528-536, 2011.
Lill et al., "Microwave-assisted proteomics," Mass spectrometry reviews, 26(5):657-71, Sep. 2007.
Liu et al., "Analysis of plasma proteome from cases of the different traditional Chinese medicine syndromes in patients with chronic hepatitis B," Journal of Pharmaceutical and Biomedical Analysis, 59:173-178, 2012.
Lokamani et al., "Gelsolin and ceruloplasmin as potential predictive biomarkers for cervical cancer by 2D-DIGE proteomics analysis," Pathology & Oncology Research, 20(1):119-29, Jan. 2014.
Mitchell et al., "Alterations in the bovine bronchoalveolar lavage proteome induced by dexamethasone," Veterinary immunology and immunopathology, 118(3-4):283-93, Aug. 2007.
Moh et al., "Site-specific N-glycosylation of recombinant pentameric and hexameric human IgM," Journal of The American Society for Mass Spectrometry, 27(7):1143-55, Apr. 2016.
Okamoto et al., "Proteome analysis of bronchoalveolar lavage fluid in chronic hypersensitivity pneumonitis," Allergology International, 61(1):83-92, Jan. 2012.
Oruc et al., "IgA structure variations associate with immune stimulations and IgA mesangial deposition," Journal of the American Society of Nephrology, 27(9):2748-61, Sep. 2016.
Pabst et al., "A microarray-matrix-assisted laser desorption/ionization-mass spectrometry approach for site-specific protein N-glycosylation analysis, as demonstrated for human serum immunoglobulin M (IgM)," Molecular & Cellular Proteomics, 14(6):1645-56, Jun. 2015.
Salinas et al., "Buffer-dependent fragmentation of a humanized full-length monoclonal antibody," Journal of pharmaceutical sciences, 99(7):2962-74, Jul. 2010.
Sandoval et al., "Rapid removal of N-linked oligosaccharides using microwave assisted enzyme catalyzed deglycosylation," International Journal of Mass Spectrometry, 259(1-3):117-23, Jan. 2007.
Sanjurjo et al., "AIM/CD5L: a key protein in the control of immune homeostasis and inflammatory disease," J. Leukoc. Biol., 98(2):173-184, Aug. 2015.
Sarrias et al., "Biochemical characterization of recombinant and circulating human Spα," Tissue antigens, Apr. 2004, 63(4):335-44.
Skriner et al., "Association of citrullinated proteins with synovial exosomes," Arthritis & Rheumatism: Official Journal of the American College of Rheumatology, Dec. 2006, 54(12):3809-14.
Sloane et al., "Proteomic analysis of sputum from adults and children with cystic fibrosis and from control subjects. American journal of respiratory and critical care medicine," Dec. 2005, 172(11):1416-26.
Tissot et al., "IgM Are Associated to Sp Alpha (CD5 Antigen-Like)," Electrophoresis, 23(7-8):1203-1206, Apr. 2002.
Vase et al., "A57 Proteomic profiling of pretreatment serum from HIV-infected patients identifies candidate markers predictive of lymphoma development," AIDS, 2016, 30(12):1889-1898.
Vlasak and Ionescu, "Fragmentation of monoclonal antibodies," InMAbs, Taylor & Francis, May 2011, 3:253-263.
Wang et al., "Discovery of potential colorectal cancer serum biomarkers through quantitative proteomics on the colonic tissue interstitial fluids from the AOM-DSS mouse model," J. Proteomics, 2016, 132:31-40.
Xu et al., "Discovery and identification of serum potential biomarkers for pulmonary tuberculosis using iTRAQ-coupled two-dimensional LC-MS/MS," Proteomics, 2014, 14(2-3):322-331.
Yin et al., "Protein biomarkers of new-onset cardiovascular disease: prospective study from the systems approach to biomarker research in cardiovascular disease initiative," Arterioscler. Thromb. Vasc. Biol., 2014, 34(4):939-945.
Zhang et al., "Proteomic analysis of plasma in adult active pulmonary tuberculosis patients with diabetes mellitus," The FASEB Journal, Apr. 2015, 29(1 supplement):275-7, only abstract provided.
Zhong et al., "Microwave-assisted acid hydrolysis of proteins combined with liquid chromatography MALDI MS/MS for protein

(56) References Cited

OTHER PUBLICATIONS identification," Journal of the American Society for Mass Spectrometry, Apr. 2005, 16(4):471-81.

Zhong et al., "Protein sequencing by mass analysis of polypeptide ladders after controlled protein hydrolysis," Nature biotechnology, Oct. 2004, 22(10):1291-6.

Zhou et al., "Quantitative analysis of N-linked glycoproteins in tear fluid of climatic droplet keratopathy by glycopeptide capture and iTRAQ," Journal of proteome research, Apr. 2009, 8(4):1992-2003.

Arai et al., "Obesity-associated autoantibody production requires AIM to retain the immunoglobulin M immune complex on follicular dendritic cells," Cell Reports, 3(4):1187-98, Apr. 2013.

Botz et al., "Detecting monoclonal light chains in urine: micro LC-ESI-Q-TOF mass spectrometry compared to immunofixation electrophoresis," British journal of haematology, 167(3):437-8, Nov. 2014.

Dada et al., "High-Resolution Capillary Zone Electrophoresis with Mass Spectrometry Peptide. Mapping of Therapeutic Proteins: Peptide Recovery and Post-translational Modification Analysis in Monoclonal Antibodies and Antibody-Drug Conjugates," Anal. Chem. 2017, vol. 89, pp. 11236-11242.

Remily-Wood et al., "Quantification of Peptides from Immunoglobulin Constant and Variable Regions by Liquid Chromatography-Multiple Reaction Monitoring Mass Spectrometry for Assessment of Multiple Myeloma Patients," Proteomics Clin. Appl., Oct. 2014; 8(0), pp. 783-795. (Year: 2014).

Vanduijn et al., "Quantitative measurement of immunoglobulins and free light chains using mass spectrometry," Analytical chemistry, 87(16):8268-74, Aug. 2015.

Mills et al. "Detecting monoclonal immunoglobulins in human serum using mass spectrometry," Methods, Jun. 2015, 81:56-65.

ThermoFisher.com [online], "Protein Denaturing and Reducing Agents," available on or before Oct. 5, 2022, via Internet Archive: Wayback Machine URL<http://web.archive.org/web/20221005110723/https://www.thermofisher.com/us/en/home/life-science/protein-biology/protein-labeling-crosslinking/protein-modification/reducing-agents-protein-disulfides.html>, retrieved on Sep. 20, 2023, URL<https://www.thermofisher.com/US/en/home/life-science/protein-biology/protein-labeling-crosslinking/protein-modification/reducing-agents-protein-disulfides.html>, 3 pages.

Wang et al. "Structural comparison of two anti-CD20 monoclonal antibody drug products using middle-down mass spectrometry," Analyst, May 2013, 138(10):3058-3065.

Baumann et al., "Standardized approach to proteome profiling of human serum based on magnetic bead separation and matrix-assisted laser desorption/ionization time-of-flight mass spectrometry," Clin. Chem., Jun. 2005, 51(6):973-980.

Zhang et al., "Evaluation of a novel, integrated approach using functionalized magnetic beads, bench-top MALDI-TOF-MS with prestructured sample supports, and pattern recognition software for profiling potential biomarkers in human plasma," J. Biomol. Tech., Sep. 2004, 15(3):167-175.

Barnidge, "Monitoring specific IgG tryptic peptides in multiple myeloma using the TripleTOFtm 5600 System," Oral Presentation, Presented at Proceedings of the AB SCIEX Annual Users Meeting at ASMS, Vancouver, BC, May 20, 2012, 1 page.

Rehder et al., "Reversed-phase liquid chromatography/mass spectrometry analysis of reduced monoclonal antibodies in pharmaceutics," J. Chromatogr. A, Jan. 2006, 102(1-2):164-175.

U.S. Appl. No. 15/762,900, filed Mar. 23, 2018, David. R. Barnidge, Published.

U.S. Appl. No. 16/331,228, filed Mar. 7, 2019, David. R. Barnidge, Issued.

U.S. Appl. No. 16/297,340, filed Mar. 8, 2019, David L. Murray, Issued.

U.S. Appl. No. 16/646,279, filed Mar. 11, 2020, David L. Murray, Published.

U.S. Appl. No. 16/646,289, filed Mar. 11, 2020, David L. Murray, Published.

U.S. Appl. No. 16/646,296, filed Mar. 11, 2020, David L. Murray, Published.

U.S. Appl. No. 16/930,790, filed Jul. 16, 2020, David L. Murray, Published.

U.S. Appl. No. 15/301,633, filed Oct. 3, 2016, Murray.

U.S. Appl. No. 15/329,512, filed Jan. 26, 2017, Barnidge et al.

\* cited by examiner

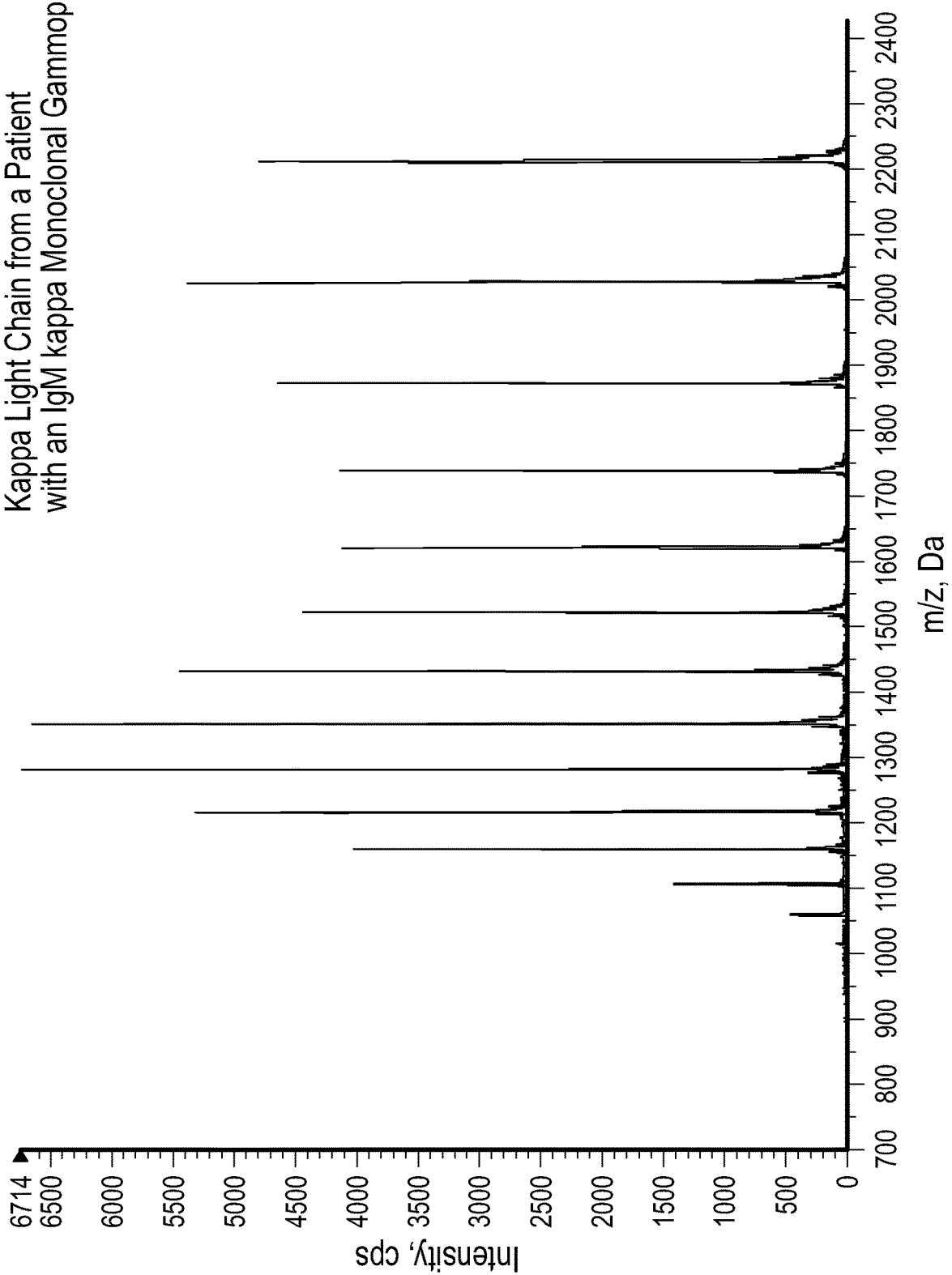

IDENTIFICATION AND MONITORING OF MONOCLONAL IMMUNOGLOBULINS RELATED TO MONOCLONAL GAMMOPATHY BY MOLECULAR MASS WITH MASS SPECTROMETRY

CROSS-REFERENCE TO RELATED APPLICATIONS

This application is a National Stage application under 35 U.S.C. § 371 of International Application No. PCT/US2014/022475, having an International Filing Date of Mar. 10, 2014, which claims the benefit of U.S. Provisional Application Ser. No. 61/792,944, filed Mar. 15, 2013. The disclosure of the prior applications are considered part of (and are incorporated by reference in) the disclosure of this application.

TECHNICAL FIELD

This disclosure relates to methods and materials for identifying and quantifying a monoclonal immunoglobulin present above the polyclonal background in a sample, such as a biological sample.

BACKGROUND

Human immunoglobulins contain two identical heavy chain polypeptides (each about 54 kilodaltons in MW) and two identical light chain polypeptides (each about 24 kilodaltons in molecular weight) which are bound together by disulfide bonds. Each light chain and each heavy chain include a constant region and a variable region. In healthy individuals, each plasma cell produces a single immunoglobulin having its own unique protein sequence contained within the variable regions of the fragment antigen binding (Fab) portion of the immunoglobulin. When examined in terms of molecular weight distribution, the mass spectrum of immunoglobulins or fragments containing the variable region(s) forms a normal distribution in a healthy individual. In a patient who has an abnormal expansion of a plasma cell, the abnormally expanded plasma cells all produce the same particular immunoglobulin, resulting in an overexpression of that immunoglobulin in the patient. A patient with such abnormality is at risk for developing serious diseases which collectively are known as monoclonal gammopathies.

The occurrence of a monoclonal immunoglobulin in the blood at a level above the normal immunoglobulin background can indicate a plasma B cell disorder. Serum protein gel electrophoresis (SPEP), immunofixation electrophoresis (IFE), urine protein gel electrophoresis (UPEP) and immunonephelometry are routine methods performed in clinical laboratories to confirm the presence of an abnormally high monoclonal immunoglobulin often referred to as an M-spike or M-protein-spike. The fundamental method of detection of these methods relies on either the differences in charge between immunoglobulins and interaction of specific antibodies with the immunoglobulins which are less specific properties than its mass.

There are two different isotypes of light chain polypeptides referred to as either kappa or lambda; and five different isotypes of heavy chain polypeptides referred to as gamma, alpha, mu, epsilon, and delta. Each of the two light chain polypeptides and each of the five heavy chain polypeptides contains two regions: the variable region and the constant region. The constant regions of the two types of light chains and five types of heavy chains have different amino acid sequences, and can be used to identify the isotype of the heavy or light chain. Current methods use antibody-based techniques to identify the isotype of the heavy or light chain. These antibodies are specific for each isotype only and hence do not directly detect clonality.

In certain diseases, such as monoclonal gammopathy, there is an increase in the amount of immunoglobulins in the bloodstream and in urine relative to a healthy individual. If high levels of immunoglobulin are detected, additional tests can be performed to determine the isotype of the light or heavy chain.

SUMMARY

The present disclosure is based, at least in part, on the development of new mass spectrometry-based methods for determining whether or not a monoclonal immunoglobulin is present above the polyclonal background level, and in some embodiments for identifying and quantifying the same in a sample, and methods for determining whether the monoclonal immunoglobulin contains a kappa or lambda light chain; or a gamma, alpha, mu, epsilon, or delta heavy chain. The use of mass over charge ratio (m/z), optionally with the use of antibody interaction techniques, such as SPEP, IFE and immunoassays, provides a more direct assessment of the clonality because it measures a fundamental property of the monoclonal immunoglobulin, its mass. These methods are useful for screening biological samples for the presence or absence of an endogenous monoclonal immunoglobulin above the polyclonal background or an exogenous therapeutic monoclonal immunoglobulin, for monitoring the concentration of the monoclonal immunoglobulin in a subject, and for diagnosing and monitoring a monoclonal gammopathy.

In one aspect, this disclosure features mass spectrometry based methods for determining the presence or absence of, and optionally the identity and concentration of a monoclonal immunoglobulin above the polyclonal background level in a sample, e.g., a serum, plasma, whole blood, urine sample, or a man-made reagent solution. Immunoglobulins can be isolated from the sample and subjected to a mass spectrometry technique to determine whether or not an immunoglobulin is above the polyclonal background. The immunoglobulins can be isolated from the sample by chemical-based fractionation, e.g. Melon Gel chromatography, by affinity purification, e.g. Protein A, Protein G or Protein L purification, or by size exclusion chromatography.

In some embodiments, intact immunoglobulins can be subjected to the mass spectrometry assays described herein. In some embodiments, the immunoglobulins can be processed to reduce their total mass while retaining the unique variable regions of the immunoglobulins before subjecting to the mass spectrometry technique. In some cases, portions of immunoglobulins containing the variable regions are subjected to mass spectrometry. For example, the immunoglobulin light chains can be decoupled from the immunoglobulin heavy chains, and subjected to the mass spectrometry based methods disclosed herein. Any portion of the polypeptide chain or post-translational modification to the polypeptide chain can also be cleaved from the total immunoglobulin using proteases, and subjected to the mass spectrometry based methods disclosed herein.

In some embodiments, the mass spectrometry technique used in these methods can include a liquid chromatography mass spectrometry (LC-MS). In some embodiments, a matrix assisted laser desorption ionization mass spectrometry (MALDI MS) technique can be used. In some embodiments, tandem mass spectrometry (MS/MS) techniques can be used, for example, a liquid chromatography tandem mass spectrometry (LC-MS/MS) technique.

The mass spectrometry based methods disclosed herein, when coupled with a fast and effective immunoglobulin isolation method (e.g., Melon Gel Chromatography), can be used to screen patient samples, e.g. serum, plasma, whole blood, or urine samples, for endogenous monoclonal immunoglobulins present above the polyclonal background and/or exogenous therapeutic monoclonal immunoglobulins in a clinical laboratory setting. The mass spectrometry based screening methods disclosed herein show superior speed, sensitivity, resolution, and robustness than the conventional laboratory tests in screening for elevated concentration of a monoclonal immunoglobulin in biological samples.

In some embodiments, the immunoglobulin is a therapeutic monoclonal antibody. The mass spectrometry based methods disclosed herein further comprises determining the presence or absence of a therapeutic monoclonal antibody in the sample based on the presence or absence of a peak in the mass spectrum. In some embodiments, the quantification of the therapeutic monoclonal antibody in the sample can be determined based on the area of the peak of the mass of the variable region fragment.

In another aspect, the mass spectrometry-based methods disclosed herein can be used for diagnosing and monitoring, e.g., monitoring treatment of, progression of, remission of, etc., a monoclonal gammopathy in a subject. A sample can be obtained from the subject and subjected to mass spectrometry-based screening methods described above to provide a diagnosis of the presence or absence of the monoclonal gammopathy. When the subject is diagnosed to have monoclonal gammopathy, the methods disclosed herein can further be used to monitor a treatment of monoclonal gammopathy. Such methods include providing a first sample of the subject before the treatment and a second sample of the subject during or after the treatment. Immunoglobulins are isolated from the first and second samples, and subjected to a mass spectrometry technique. Level of an immunoglobulin present above the polyclonal background is determined before and after the treatment and compared. A decrease in its level indicates that the treatment may be effective for the subject; while an increase or no change in its level indicates that the treatment may be ineffective for the subject.

In some embodiments, the mass spectrometry based methods disclosed herein are combined with one or more conventional laboratory tests, for example, one or more of serum protein gel electrophoresis (SPEP), immunofixation electrophoresis (IFE), urine protein gel electrophoresis (UPEP) and immunonephelometry, to provide a thorough assessment of the clonality.

In yet another aspect, the disclosure features methods for determining whether an immunoglobulin light chain is a kappa or lambda light chain. Such methods can include fragmenting a preselected immunoglobulin light chain precursor ion using a tandem mass spectrometry technique to generate a distribution spectrum of fragment ions. The m/z's of one or more of the fragment ions can then be compared to m/z's of one or more fragment ions that are expected to result from the constant region of either kappa or lambda light chain. The immunoglobulin light chain precursor ion can be selected using a mass spectrometry technique.

As used herein, a "sample" can be any biological sample, such as a tissue (e.g., adipose, liver, kidney, heart, muscle, bone, or skin tissue) or biological fluid (e.g., blood, serum, plasma, urine, lachrymal fluid, or saliva) sample, or a man-made reagent.

As used herein, a "subject" is an animal such as a mammal, e.g. a human, dog, cat, primate, rodent, pig, sheep, cow, or horse.

As used herein, "variable region-containing immunoglobulins" can be intact immunoglobulins or portions of immunoglobulins containing the variable regions, e.g., immunoglobulin light chains, immunoglobulin heavy chains, antigen binding fragments (Fabs) of immunoglobulins, and mixtures thereof.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION OF DRAWINGS

FIG. 1A is a mass spectrum showing a set of multiply charged ions that are converted to a molecular mass of 23 452.64 Da (FIG. 1B), which is within the expected mass range for an IgG light chain. FIG. 1C shows another set of multiply charged ions that are converted to a molecular mass of 51 596.07 and 51 758.27 Da (FIG. 1D), which is within the expected mass range for an IgG heavy chain. The difference between the molecular mass of series 2 and series 3 is 162.20 Da, which closely matches the mass of a hexose subunit.

FIG. 3 is a light chain mass spectrum of a serum sample from a patient with an IgM monoclonal gammopathy, measured by LC-MS.

FIG. 16A is a mass spectrum showing a series of multiply charged ions. FIG. 16B shows calculated molecular mass for the ions in FIG. A, which is only 0.47 Da different than the molecular mass observed in FIG. 1 for the light chain. FIG. 16C shows molecular mass for the proposed heavy chain ions can no longer be calculated because the ions are below the level of detection.

Like reference symbols in the various drawings indicate like elements.

DETAILED DESCRIPTION

Figure 1A:
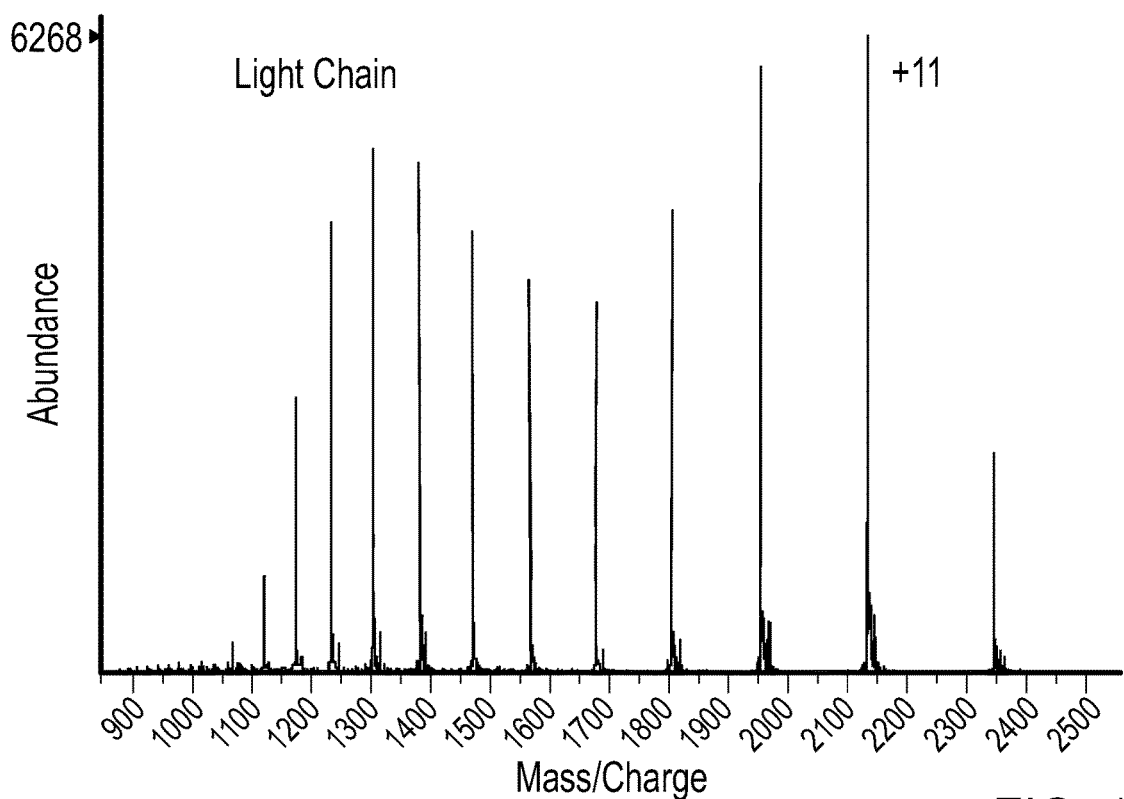
FIGS. 1A-1D show results from the analysis of a serum sample from a patient with IgG kappa multiple myeloma.

The present disclosure is based, at least in part, on the development of new mass spectrometry-based methods for determining whether or not an immunoglobulin is present in a biological sample, and methods for determining whether the immunoglobulin contains a kappa or lambda light chain. The use of mass over charge (m/z), optionally with one or more antibody interaction techniques, such as SPEP, IFE and immunoassays, provides a more direct assessment of the clonality because it measures a fundamental property of the immunoglobulin. These methods are useful for screening biological samples for the presence or absence of monoclonal gammopathy, for diagnosing and monitoring monoclonal gammopathy in a subject, and for quantifying a monoclonal therapeutic antibody in a patient.

Described herein are methods based on mass spectroscopy to identify whether or not a monoclonal immunoglobulin is present in a biological sample. The speed, sensitivity, resolution, and robustness of mass spectroscopy make the present methods superior than SPEP or UPEP for screening samples for monoclonal gammopathies. A method described herein can include the use of a liquid chromatography mass spectrometry (LC-MS). In some embodiments, tandem mass spectrometry (MS/MS) techniques can be used, for example, a liquid chromatography tandem mass spectrometry (LC-MS/MS) technique. In some embodiments, matrix assisted laser desorption ionization-time of flight mass spectrometry (MALDI-TOF MS) technique can be used.

Samples and Sample Preparation

A sample for analysis can be any biological sample, such as a tissue (e.g., adipose, liver, kidney, heart, muscle, bone, or skin tissue) or biological fluid (e.g., blood, serum, plasma, urine, lachrymal fluid, or saliva) sample, or a man-made reagent. The biological sample can be from a subject that has immunoglobulins, which includes but is not limited to a mammal, e.g. a human, dog, cat, primate, rodent, pig, sheep, cow, horse, bird, reptile, or fish.

A sample can be treated to remove components that could interfere with the mass spectrometry technique. A variety of techniques known to those having skill in the art can be used based on the sample type. Solid and/or tissue samples can be ground and extracted to free the analytes of interest from interfering components. In such cases, a sample can be centrifuged, filtered, and/or subjected to chromatographic techniques to remove interfering components (e.g., cells or tissue fragments). In yet other cases, reagents known to precipitate or bind the interfering components can be added. For example, whole blood samples can be treated using conventional clotting techniques to remove red and white blood cells and platelets. A sample can be deproteinized. For example, a plasma sample can have serum proteins precipitated using conventional reagents such as acetonitrile, KOH, NaOH, or others known to those having ordinary skill in the art, optionally followed by centrifugation of the sample.

Immunoglobulins can be isolated from the samples using standard methods known in the art. For example, the immunoglobulins can be purified by chemical-based fractionation, e.g., Melon Gel Chromatography (Thermo Scientific), where Melon Gel resins bind to non-immunoglobulin proteins in a sample and allow immunoglobulins to be collected in the flow-through fraction; or by affinity purification, e.g., by Protein A, Protein G, or Protein L purification, where immunoglobulins are bound by those proteins at physiologic pH and then released from the proteins by lowering the pH. When serum, plasma, or whole blood samples are used, a sample, such as a 10-250 ul sample, e.g., a 50 µl, can be directly subjected to Melon Gel, Protein A, Protein G, or Protein L purification. When urine samples are used, a urine sample can be buffered, e.g., a 50 µl urine sample can be diluted first with 50 µl of 50 mM ammonium bicarbonate.

Intact immunoglobulins can be further processed to reduce their overall mass while retaining the unique variable region of the immunoglobulin. In some embodiments, the light chains in a total immunoglobulin sample can be decoupled from the heavy chain immunoglobulins. Decoupling can be achieved by treating the total immunoglobulins with a reducing agent, such as dithiothreitol, tris(2-carboxyethyl)phosphine, or 2-mercaptoethanol. In some embodiments, the reducing step is performed at elevated temperature, e.g., in a range from about 30° C. to about 65° C., such as about 55° C., in order to denature the proteins. In some embodiments, the sample is further treated, e.g., by modifying the pH of the sample or buffering the sample. In some embodiments, the sample can be acidified.

In some embodiments, the antigen binding fragments (Fab) of immunoglobulins can be cleaved from the intact immunoglobulins using proteases such as pepsin. Excess reagents and salts can be removed from the samples using methods known to those having ordinary skill in the art.

Mass Spectrometry Methods

After sample preparation, an immunoglobulin sample, such as an intact, decoupled light chain or Fab immunoglobulin sample, can be subjected to a mass spectrometry (MS) technique, either directly or after separation on a high performance liquid chromatography column (HPLC). In some embodiments, liquid chromatography mass spectrometry (LC-MS) can be used to analyze the mass spectrum of the ions, e.g., the +1 ions, resulting from the intact, light chain or Fab immunoglobulin sample. LC-MS is an analytical technique that combines the physical separation capabilities of liquid chromatography with the mass analysis capabilities of mass spectrometry, and is suitable for detection and potential identification of chemicals in a complex mixture. Any LC-MS machine can be used, e.g., the ABSciex 5600 Mass Spectrometer. The ion mass spectrum can be analyzed for one or more peaks having an intensity greater than the intensity of the background ion levels, e.g., the ions resulting from non-overexpressed immunoglobulins. For example, one or more ion peaks, e.g., an ion peak of the highest intensity, can be examined to determine if the one or more ion peaks has an ion intensity greater than the background intensity. In some embodiments, the ion intensity of the one or more peaks is at least two standard deviations greater than the background intensity; in some cases, at least 50% greater, at least 75% greater, or at least 100% greater, or at least 3-fold higher, 5-fold higher, 6-fold, 7-fold, 8-fold, 9-fold, 10-fold higher, 25-fold higher, 50-fold higher, 75-fold higher, 100-fold higher, or more. The presence of one or more peaks having an ion intensity greater than the background level is considered as an M-protein peak or M-spike, indicating the presence of a monoclonal immunoglobulin above the polyclonal background.

In some embodiments, matrix assisted laser desorption ionization-time of flight mass spectrometry (MALDI-TOF MS) can be used to analyze the mass spectrum of an immunoglobulin sample, e.g., the mass spectrum of the +1 charge state of the molecules in the sample, i.e., the intact, light chain or Fab immunoglobulin sample. Matrix-assisted laser desorption/ionization mass spectrometry (MALDI MS) uses a soft ionization technique to obtain large ions in the gas phase, and is suitable for analyzing fragile biomolecules (such as DNA, proteins, peptides and sugars) and large organic molecules, which tend to be fragmented when ionized by conventional ionization methods. The time-of-flight (TOF) analyzer uses an electric field to accelerate the ions through the same potential, and then measures the time they take to reach the detector. If the particles all have the same charge, the kinetic energies are identical, and their velocities depend only on their masses. Lighter ions reach the detector first. Samples can be prepared using a dried droplet method for MALDI-TOF MS. The advantages of using MALDI-TOF MS include: 1) lower instrument costs, 2) higher throughput, 3) easy sample preparation, 4) easy to use instrumentation, and 5) lower charge states. Any MALDI-TOF mass spectrometer can be used, e.g., the Biflex III MALDI-TOF Mass Spectrometer (Bruker Daltonics). The mass spectrum, e.g., the mass spectrum of +1 intact light chain polypeptide ions, can be analyzed to identify one or more peaks having an ion intensity greater than the background ion intensity and at an appropriate mass/charge expected for a light chain or Fab immunoglobulin fragment, e.g., about 21,000 to about 26,000 m/z, or about 22,000 to about 24,500 m/z, or about 23,000 to about 24,000 m/z for light chains; or about 40,000 to about 65,000 m/z, or about 45,000 to about 62,000 m/z; or about 50,000 to about 60,000 m/z for Fab immunoglobulin fragments. In some embodiments, the one or more peaks has an ion intensity at least two standard deviations greater than background ion intensity; or in some embodiments, at least 50% greater, at least 75% greater, or at least 100% greater, or at least 3-fold higher, 5-fold higher, 6-fold, 7-fold, 8-fold, 9-fold, 10-fold higher, 25-fold higher, 50-fold higher, 75-fold higher, 100-fold higher, or more, than the background ion intensity. The presence of one or more peaks having an ion intensity greater than the background ion intensity level and at an appropriate m/z for a light chain or Fab immunoglobulin fragment is considered as an M-protein peak or M-spike, indicating the presence of a monoclonal immunoglobulin above the polyclonal background.

In some embodiments, tandem mass spectrometry (MS/MS) can be used to determine whether an immunoglobulin contains a kappa light chain. For example, two rounds of MS can be performed. During the first round, the sample, e.g., a decoupled immunoglobulin light chain sample, is subjected to LC-MS, and a light chain ion fragment mass spectrum is generated, e.g., a distribution of light chain immunoglobulin fragments having +1 m/z's, as described above. The most intense ion peak is identified and selected as the precursor ion for the second round of mass spectrometry, LC-MS/MS. Once the m/z of the precursor ion of highest intensity is determined, the LC-MS/MS method allows the quadrupole portion of the mass spectrometer to select for that specific ion. During the second round of LC-MS/MS, this precursor ion is fragmented using collision-induced dissociation (CID), which involves the collision of an ion with a neutral atom or molecule in the gas phase and subsequent dissociation of the ion. The fragment ions produced during CID can then be detected using the time-of-flight (TOF) portion of the mass spectrometer. One or more of the m/z's (e.g., one, two, three, four, five, six, seven, eight or more) of the resulting distribution of fragment ion peaks can be compared to a list of one or more expected m/z's for protein fragment ions, e.g., protein fragment +1 ions, that would be expected to result from a light chain's C-terminal constant region.

Light chain constant region amino assay sequence is available on public databases. Such ions are referred to as y-ions for the C-terminal constant region of the kappa light chain. When one or more of the fragment ions m/z's correlate, e.g., match, with one or more of the m/z's of the expected protein fragment ions, e.g., one, two, three, four, five, size, seven, eight, or more, the immunoglobulin light chain is determined to be a kappa light chain.

Similarly, tandem mass spectrometry can be used to determine whether an immunoglobulin contains a lambda light chain. For example, two rounds of MS can be performed, and during the first round, the sample, e.g., a decoupled immunoglobulin light chain sample, is subjected to LC-MS, and a light chain ion fragment mass spectrum is generated, e.g., a distribution of light chain immunoglobulin fragments having +1 m/z's, as described above. A precursor ion is selected for the second round LC-MS/MS. Preferably, but not necessarily, the precursor ion is selected from the most abundant ion within the mass range for precursor ion selection. Once the m/z of the precursor ion is determined, the LC-MS/MS method allows the quadrupole portion of the mass spectrometer to select for that specific ion. During the second round of LC-MS/MS, this precursor ion is fragmented using collision-induced dissociation (CID), which involves the collision of an ion with a neutral atom or molecule in the gas phase and subsequent dissociation of the ion. The fragment ions produced during CID can then be detected using the time-of-flight (TOF) portion of the mass spectrometer. One or more of the m/z's (e.g., one, two, three, four, five, six, seven, eight or more) of the resulting distribution of fragment ion peaks can be compared to a list of one or more expected m/z's for protein fragment ions, e.g., protein fragment+1 ions, that would be expected to result from a light chain's N-terminal portion of the constant region. Such ions are referred to as b-ions for the N-terminal portion of lambda constant region. The light chain constant region amino assay sequence is available on public databases. The comparison can be performed using commercially available software, e.g. ProSight P™ 2.0. When one or more of the fragment ions m/z's correlate, e.g., match, with one or more of the m/z's of the expected protein fragment ions, e.g., one, two, three, four, five, size, seven, eight, or more, the immunoglobulin light chain is determined to be a lambda light chain.

Methods for Screening Biological Samples, and for Diagnosing and Monitoring Monoclonal Gammopathy The mass spectrometry based methods disclosed herein can be used to determine whether or not a particular immunoglobulin is present in a biological sample. Immunoglobulins can be isolated from the biological sample and subjected to a mass spectrometry technique to determine whether or not an immunoglobulin is present above the polyclonal background. In some embodiments, intact immunoglobulins can be subjected to the mass spectrometry assays. In some embodiments, the immunoglobulins can be processed to reduce their mass while retaining the unique variable regions of the immunoglobulins before subjecting to the mass spectrometry technique. In those cases, portions of immunoglobulins containing the variable regions are subjected to mass spectrometry. For example, the immunoglobulin light chains can be decoupled from the immunoglobulin heavy chains, and subjected to the mass spectrometry based methods disclosed herein. The antigen binding fragments (Fab) of immunoglobulins can also be cleaved from the total immunoglobulin using enzymes such as pepsin, and subjected to the mass spectrometry based methods disclosed herein.

The mass spectrometry based methods disclosed herein when coupled with a fast and effective immunoglobulin isolation method (e.g., Melon Gel Chromatography) can be used to screen patient samples, e.g. serum, plasma, whole blood, or urine samples, for monoclonal gammopathies in a clinical laboratory setting. The mass spectrometry based screening methods disclosed herein show superior speed, sensitivity, resolution, and robustness than the conventional laboratory tests in screening for elevated monoclonal immunoglobulin expression in biological samples.

The mass spectrometry based methods disclosed herein can be used for diagnosing and monitoring monoclonal gammopathy in a subject. A sample can be obtained from the subject and subject to mass spectrometry based screening methods described above to provide a diagnosis of the presence or absence of the monoclonal gammopathy. When the subject is diagnosed to have monoclonal gammopathy, the methods disclosed herein can further be used to monitor a treatment of monoclonal gammopathy. Such methods include providing a first sample of the subject before the treatment and a second sample of the subject during or after the treatment. Immunoglobulins are isolated from the first and second samples, and subjected to a mass spectrometry technique. Level of an immunoglobulin is determined before and after the treatment and compared. A decrease in its level indicates that the treatment may be effective for the subject; while an increase or no change in its level indicates that the treatment may be ineffective for the subject.

Methods for Determining Whether an Immunoglobulin Contains a Kappa or Lambda Light Chain Knowing the type of light chain, either kappa or lambda, and its quantity associated with the M-spike, are critical for monoclonal gammopathy diagnosis and prognosis. Clinical labs commonly use immunofixation electrophoresis to identify the type of immunoglobulin light chains and use agarose gel electrophoresis to quantify them.

The methods described herein are based on the discovery of a unique top down fragmentation pattern produced by intact kappa and lambda light chains. Since kappa and lambda light chains each have unique C-terminal amino acid sequences, tandem mass spectrometry (MS/MS) on the intact ions can be performed to determine whether an immunoglobulin light chain is kappa or lambda light chain. Intact kappa ions when exposed to collision-induced dissociation (CID) during the MS/MS produce y-ion fragments from the C-terminal portion of the kappa constant region. Intact lambda ions when exposed to the same CID condition during MS/MS produce b-ions from the N-terminal portion of the lambda constant region.

Based on these findings, tandem mass spectrometry based methods for determining whether an immunoglobulin light chain is a kappa or lambda light chain have been developed. Such methods can include the steps of: (1) fragmenting a preselected immunoglobulin light chain precursor ion using a tandem mass spectrometry technique to generate a distribution spectrum of fragment ions; and (2) comparing the m/z's of one or more of the fragment ions to m/z's of one or more fragment ions that are expected to result from the constant region of either kappa or lambda light chain. The immunoglobulin light chain precursor ion can be selected using a mass spectrometry technique.

EXAMPLES

The invention is further described in the following examples, which do not limit the scope of the invention described in the claims.

Example 1

Detection of Monoclonal Immunoglobulins Using LC-MS Based Methods in Serum Samples from Patients with Documented IgG, IgA, or IgM Monoclonal Gammopathy Total immunoglobulins were isolated by subjecting a 50 µl serum sample from a subject to Melon Gel (Thermo Scientific) purification according to manufactures insert.

The light chain immunoglobulins were decoupled from heavy chain immunoglobulins by reducing and denaturing the total immunoglobulins with 50 mM dithiothreitol (DTT) for 1 hour at 55° C. The decoupled immunoglobulin sample was diluted in water and excess reagents were removed using a 3 kDa filter tube. The decoupled immunoglobulin sample was acidified with 0.1% formic acid, and then examined by liquid chromatography-mass spectrometry (LC-MS) using ABSciex 5600 mass spectrometer equipped with a C8 reverse phase column.

Figure 1B:
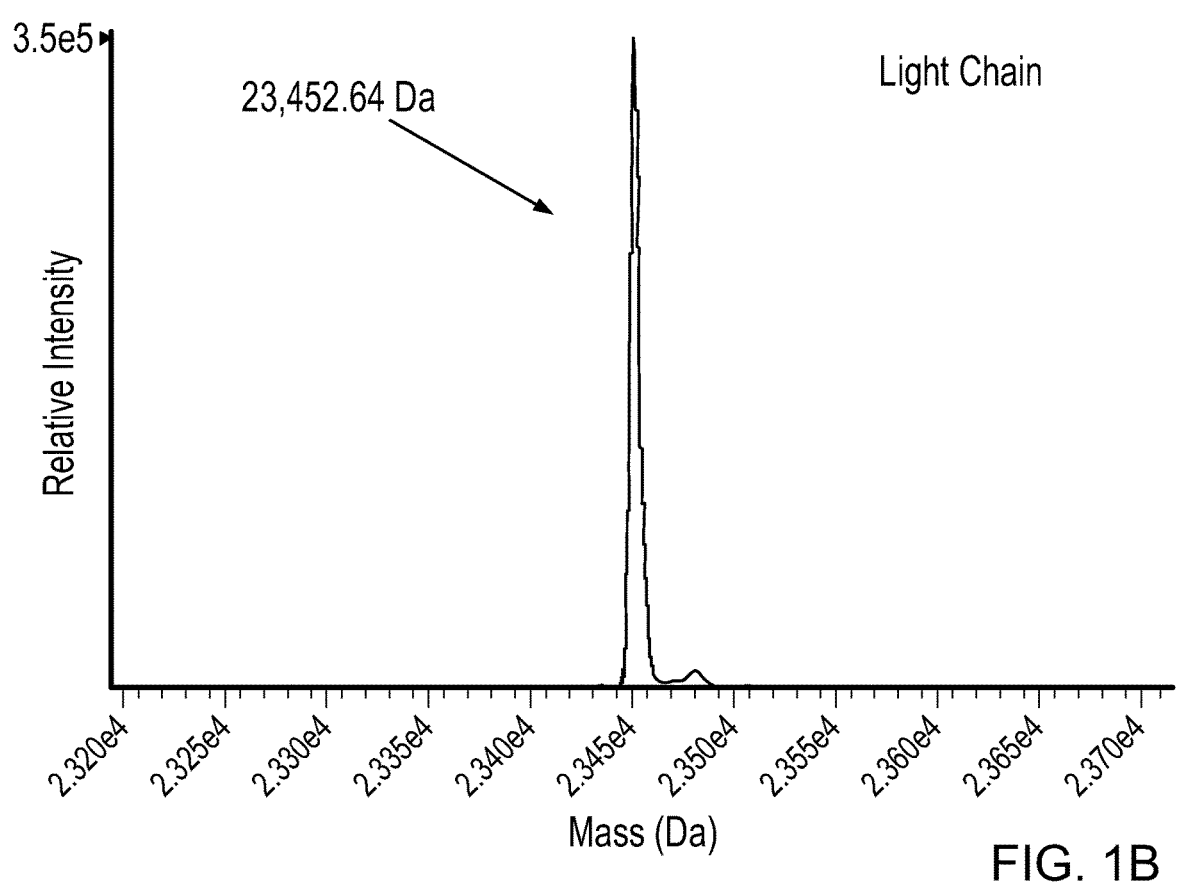
Figure 1C:
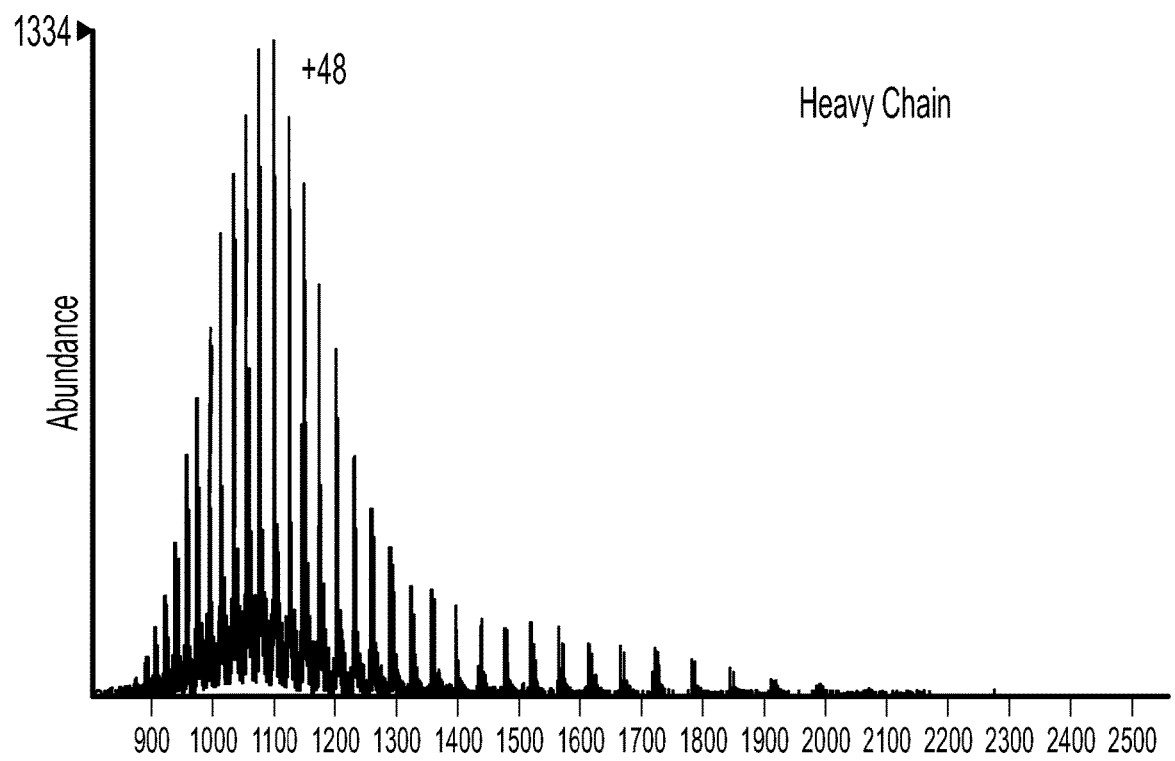
Figure 1D:
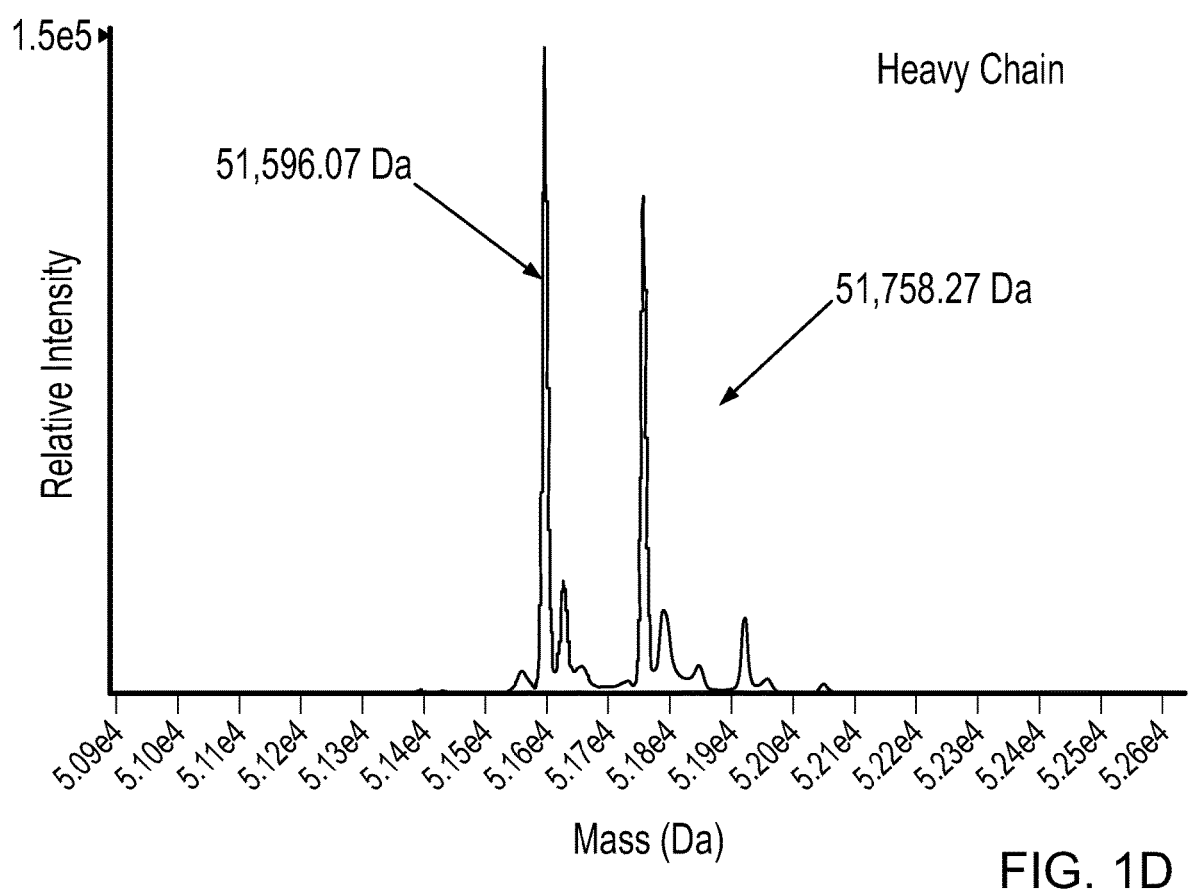
Figure 2A:
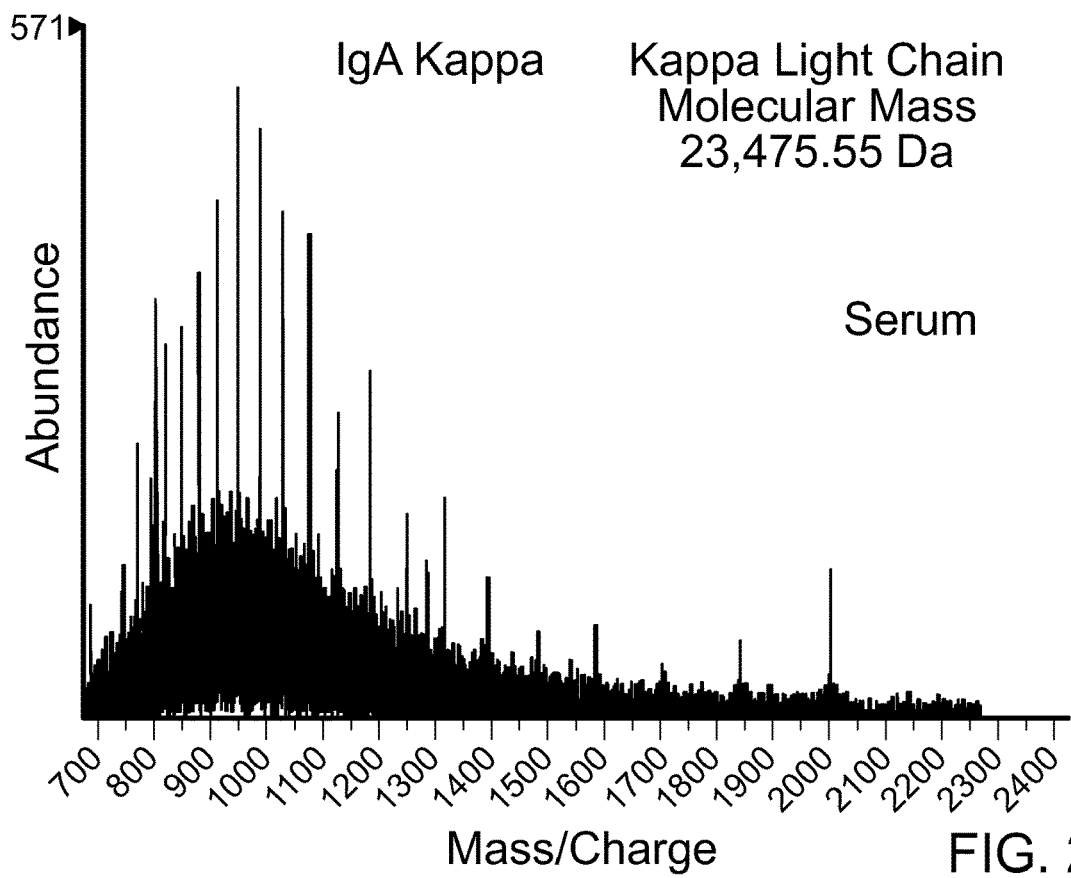
FIGS. 2A-2D are a set of mass spectra of serum (FIGS. 2A and 2B) and urine samples (FIGS. 2C and 2D) from two patients one with a with an IgA kappa monoclonal gammopathy (FIGS. 2A and 2C) and one with an IgA lambda monoclonal gammopathy (FIGS. 2B and 2D), measured by LC-MS.
Figure 2B:
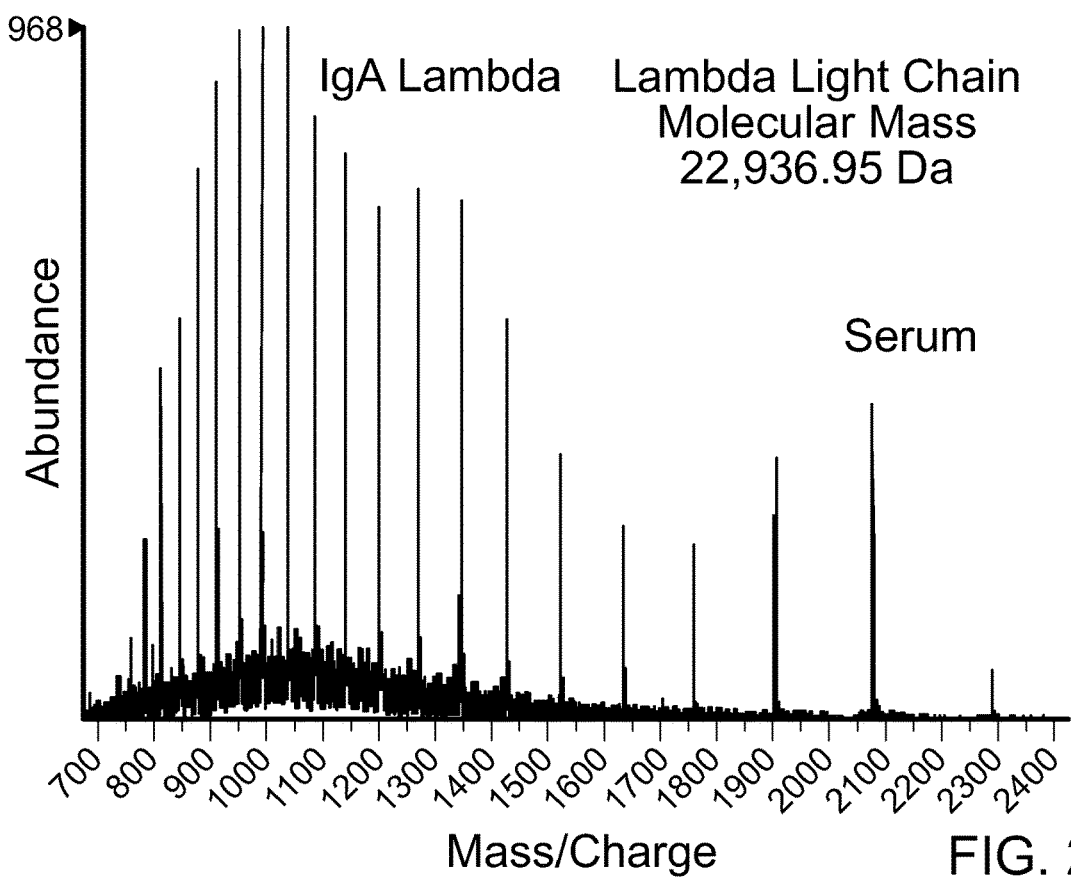
Figure 2C:
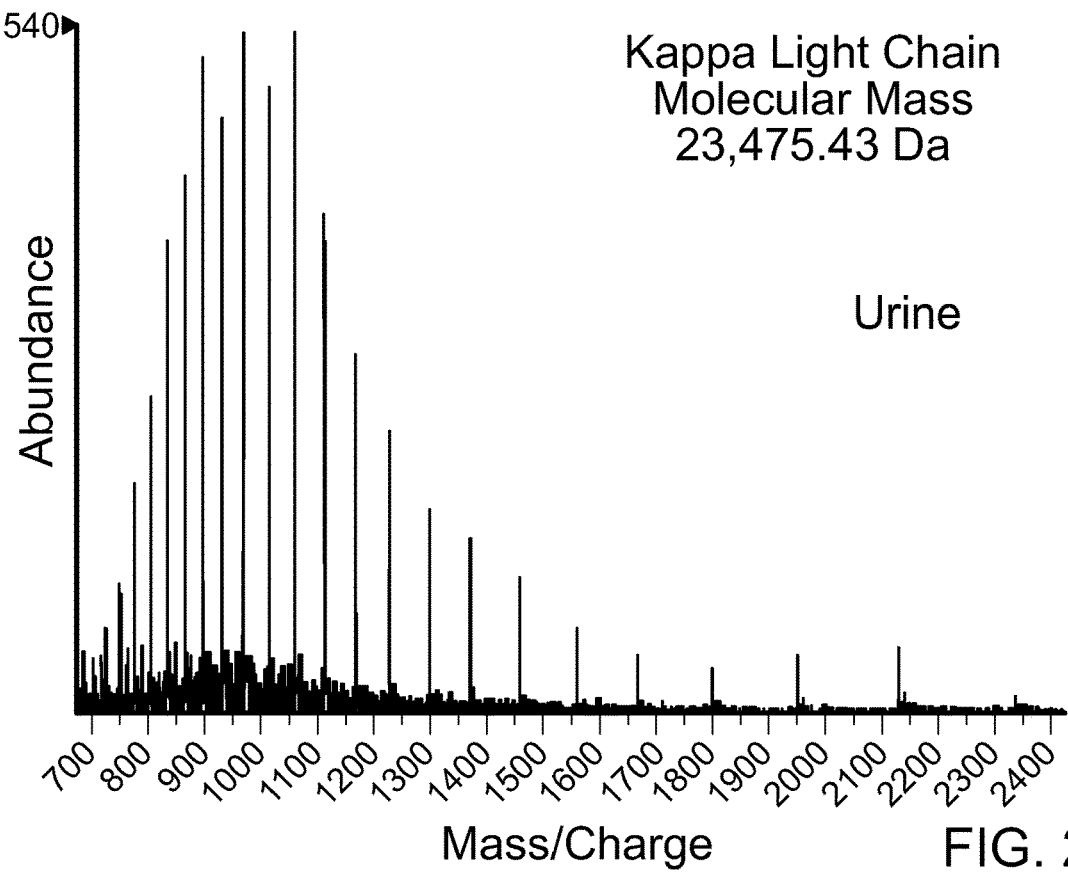
Figure 2D:
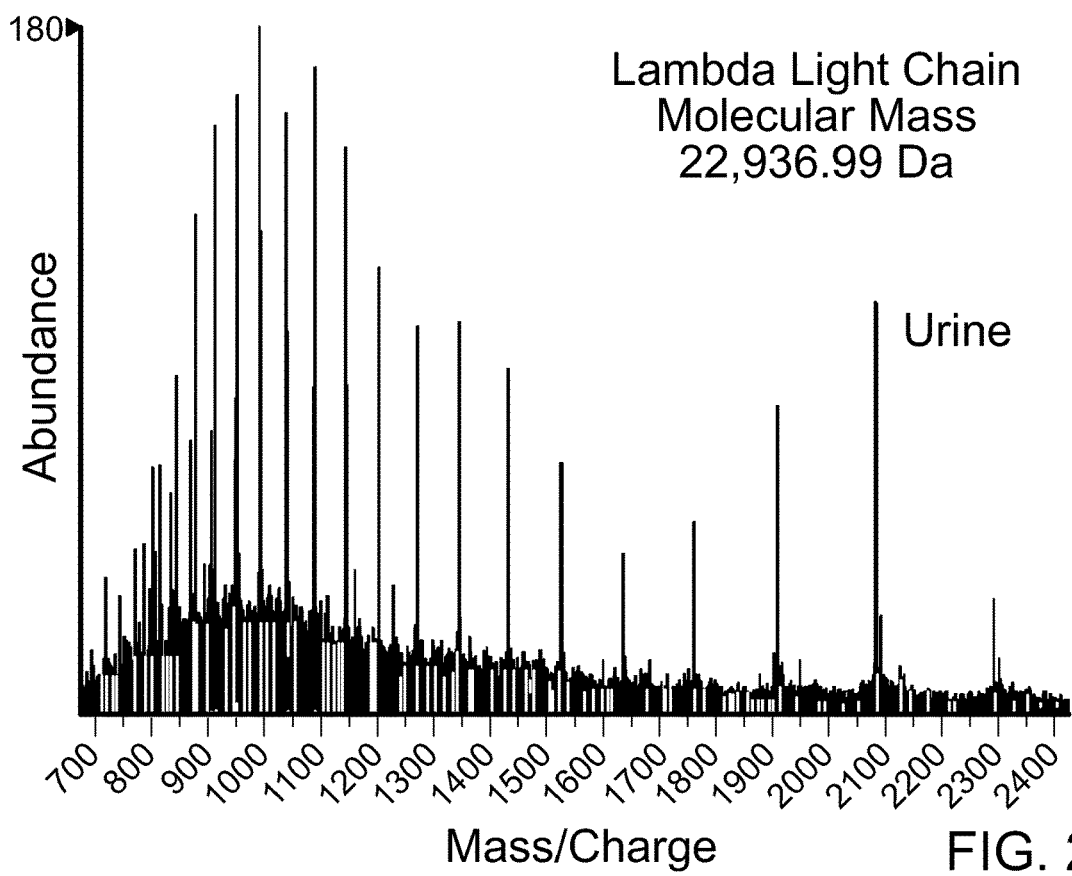

FIGS. 1A-1D show results from the analysis of a serum sample from a patient with IgG kappa multiple myeloma using methods described herein. FIG. 1A is a mass spectrum showing a set of multiply charged ions that are converted to a molecular mass of 23 452.64 Da (FIG. 1B), which is within the expected mass range for an IgG light chain. FIG. 1C shows another set of multiply charged ions that are converted to a molecular mass of 51 596.07 and 51 758.27 Da (FIG. 1D), which is within the expected mass range for an IgG heavy chain. The difference between the molecular mass of series 2 and series 3 is 162.20 Da, which closely matches the mass of a hexose subunit.

FIGS. 2A-2D show mass spectra of the serum (FIGS. 2A and 2B) and urine samples (FIGS. 2C and 2D) from two patients one with a with an IgA kappa monoclonal gammopathy (FIGS. 2A and 2C) and one with an IgA lambda monoclonal gammopathy (FIGS. 2B and 2D), measured by LC-MS.

FIG. 3 shows a light chain mass spectrum of a serum sample from a patient with an IgM monoclonal gammopathy, measured by LC-MS.

Figure 4:
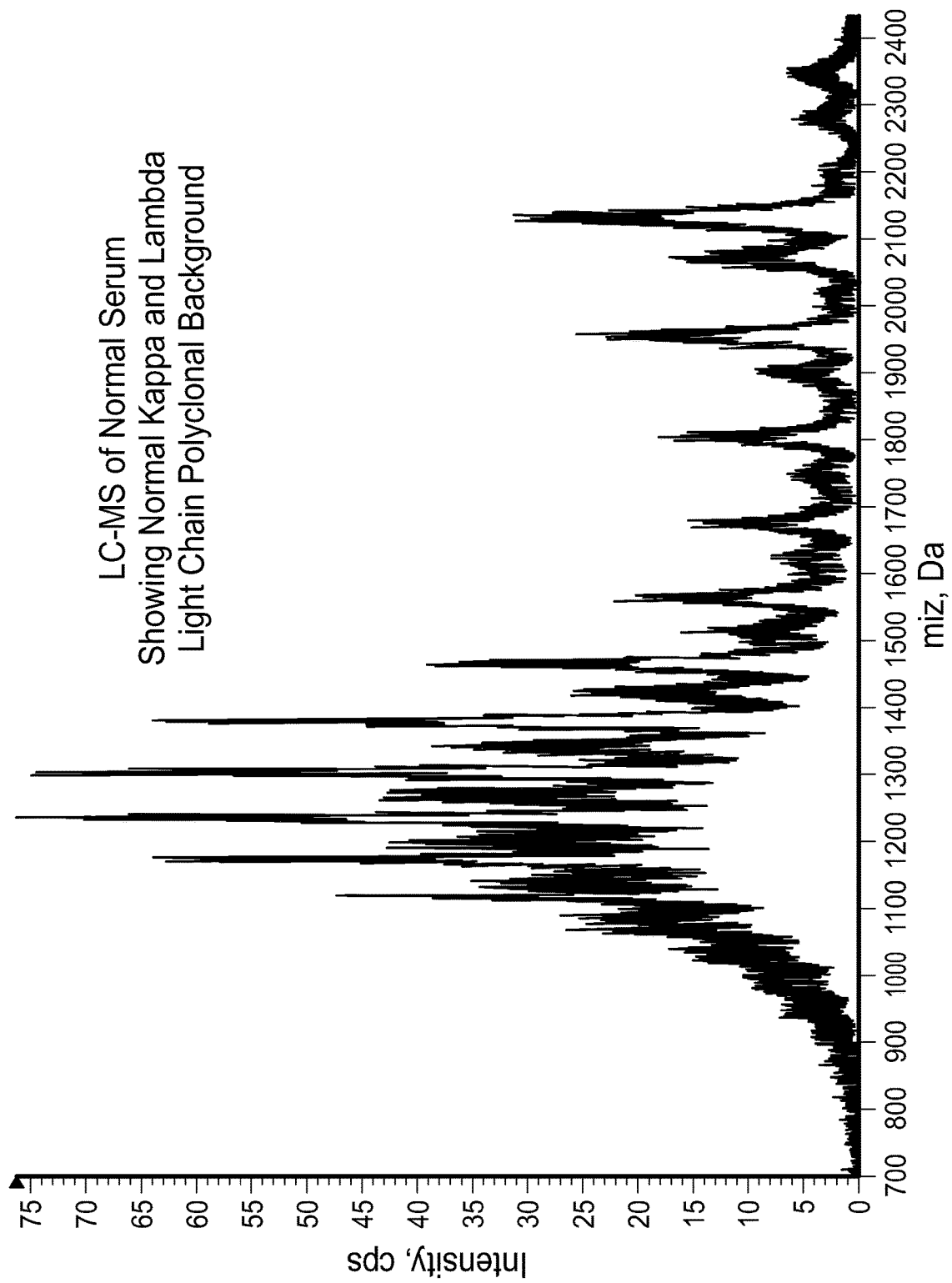
FIG. 4 is a light chain mass spectrum of a serum sample from a healthy individual without monoclonal gammopathy, measured by LC-MS.

FIG. 4 shows a light chain mass spectrum of a serum sample from a healthy individual without monoclonal gammopathy, measured by LC-MS.

Example 2

Figure 5:
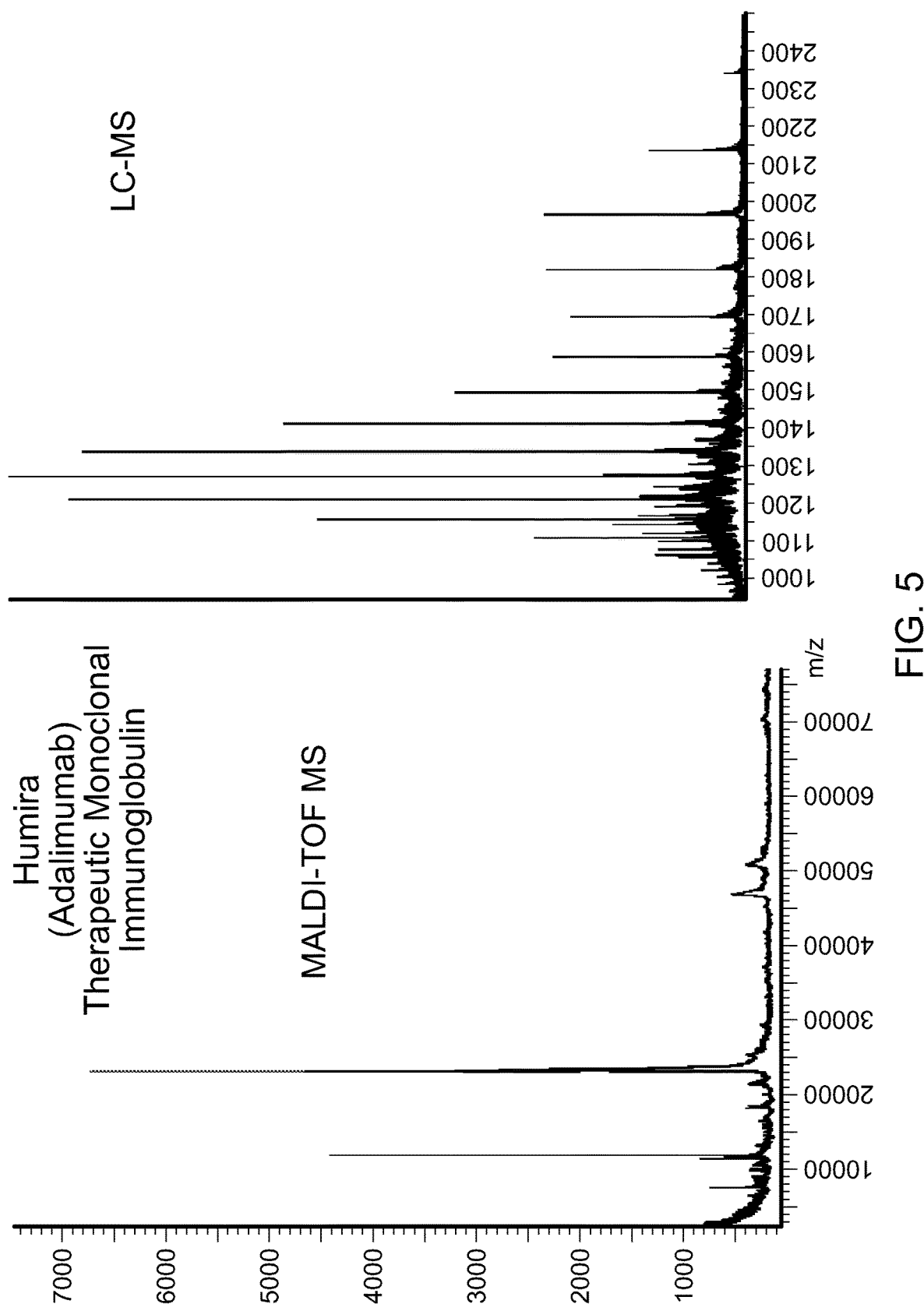
FIG. 5 is a mass spectrum of the therapeutic monoclonal immunoglobulin adalimumab (HUMIRA®), measured by matrix assisted laser desorption ionization-time of flight mass spectrometry (MALDI-TOF MS) and LC-MS analysis.
Figure 6:
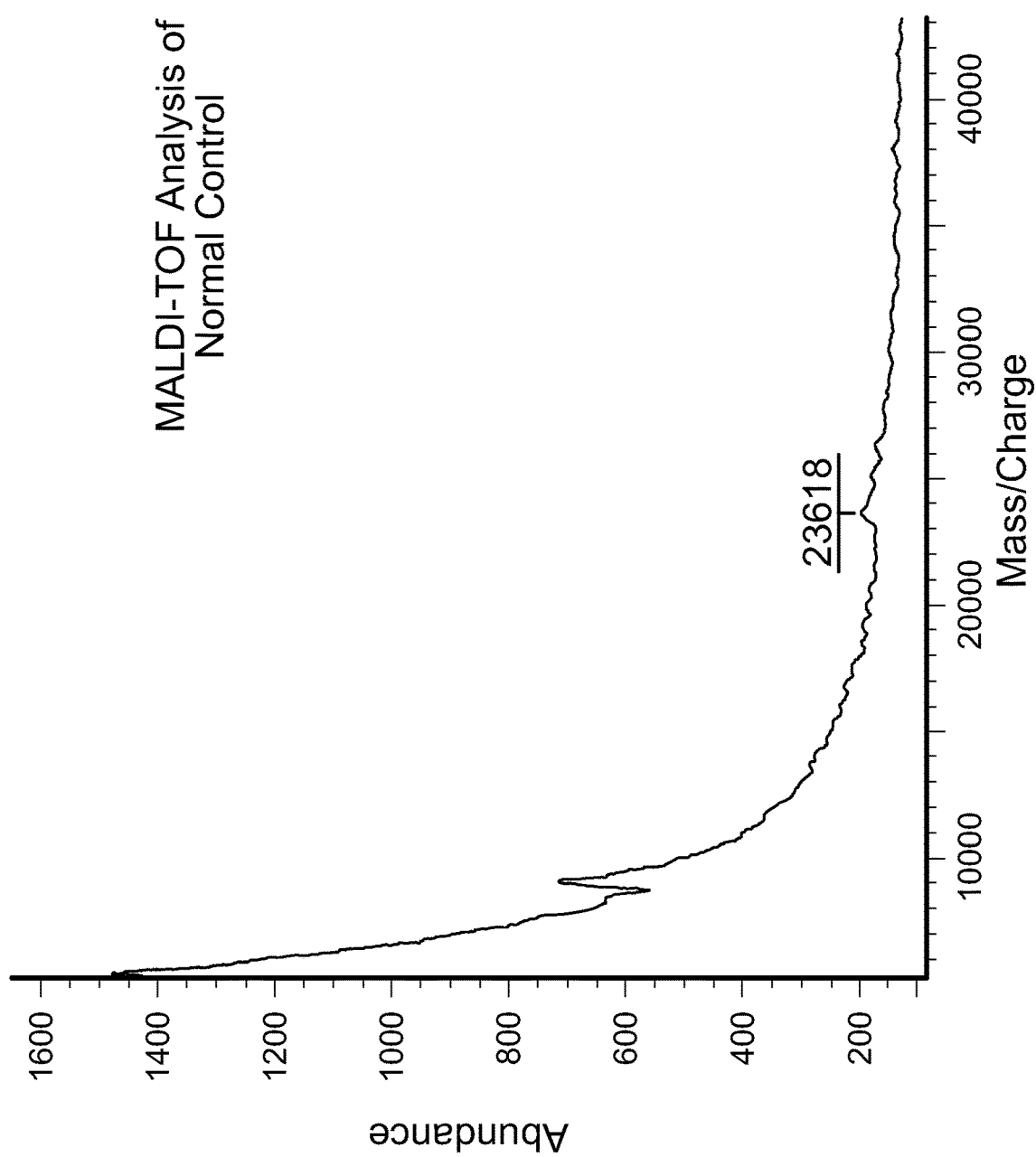
FIG. 6 is a mass spectrum of a serum sample from a healthy individual without monoclonal gammopathy, measured by MALDI-TOF MS analysis.
Figure 7:
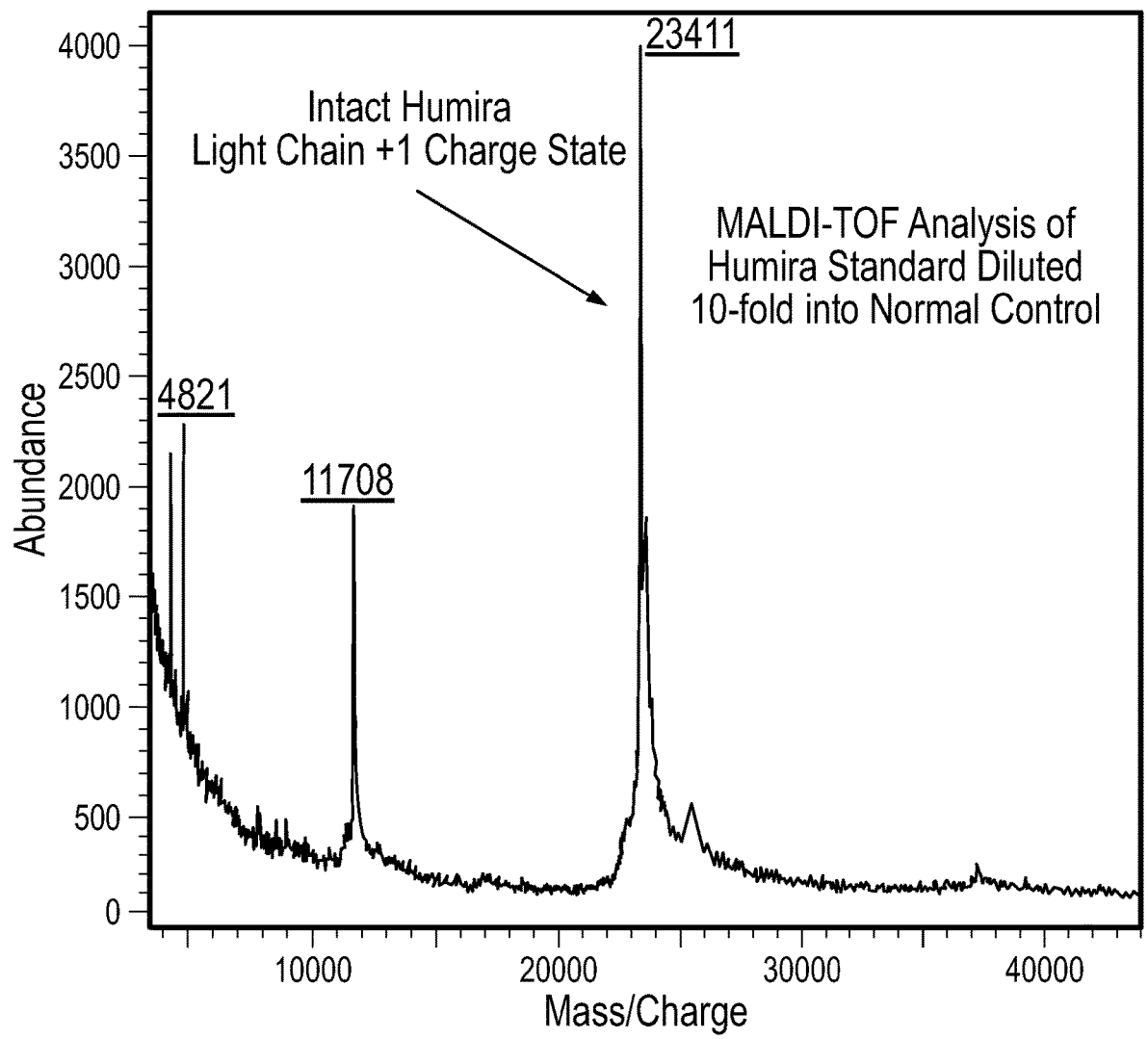
FIG. 7 is a mass spectrum of a serum sample from a healthy individual spiked with diluted the therapeutic monoclonal immunoglobulin adalimumab, measured by MALDI-TOF MS analysis.

Detection of Immunoglobulin Light Chains in Serum or Urine Samples by MALDI-TOF MS Matrix Assisted Laser Desorption Ionization-Time of Flight Mass Spectrometry (MALDI-TOF MS) was also used for monitoring monoclonal antibodies in serum and urine. Melon Gel purified adalimumab (HUMIRA®) and normal serum controls were used to get initial results using MALDI-TOF MS (FIGS. 5-7). The most abundant peak representing the immunoglobulin light chain in FIG. 5 is roughly 3000 counts for the adalimumab, while the background level of immunoglobulin light chains in the normal control sample in FIG. 6 is roughly 50 counts. Next, the adalimumab was diluted tenfold and spiked into a normal control serum sample to simulate the presence of a monoclonal immunoglobulin in a patient serum sample and analyzed by MALDI-TOF MS. As shown in FIG. 7, adalimumab was detected in the normal serum sample by MALDI-TOF MS.

Figure 8:
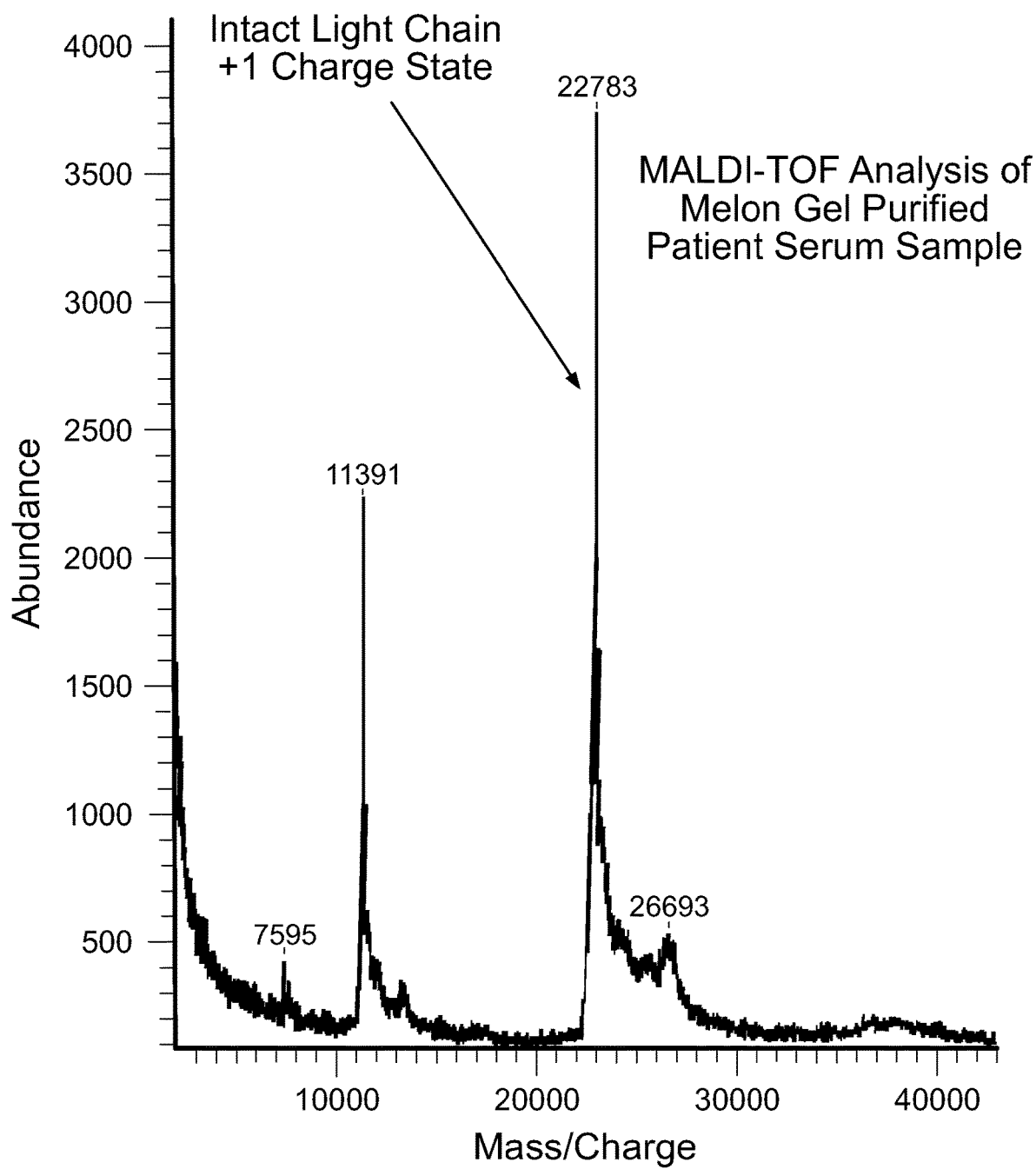
FIG. 8 is a mass spectrum of a serum sample from a patient with a lambda light chain multiple myeloma, measured by MALDI-TOF MS analysis.

MALDI-TOF MS was then used to identify monoclonal antibodies in serum samples from a patient with multiple myeloma. Serum sample was prepared as describe above in Example 1 and analyzed by MALDI-TOF MS. The monoclonal light chain antibody associated with the malignant clone was clearly seen at Mass/Charge 22,783 (FIG. 8).

Figure 9:
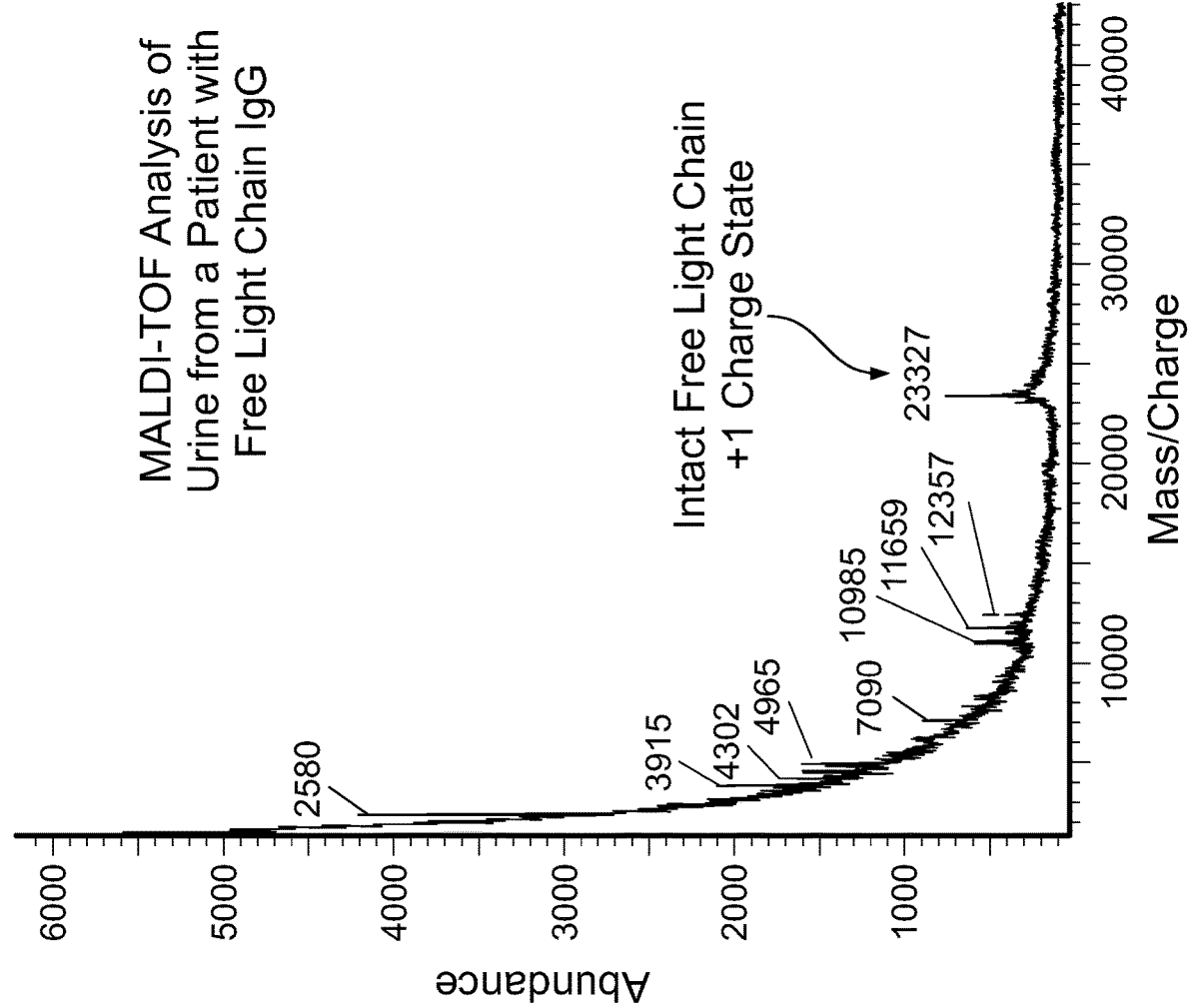
FIG. 9 is a mass spectrum of a urine sample from a patient with a kappa free light chain, measured by MALDI-TOF MS analysis.

The ability of MALDI-TOF MS to identify the presence of monoclonal free light chains (>3 mg/mL) in urine sample from patients with multiple myeloma was also evaluated. A 50 µl urine sample from the patient was diluted first with 50 µl of 50 mM ammonium bicarbonate and then reduced with 100 mM DTT for 30 minutes at 55° C. The reduced sample was acidified with formic acid then examined by MALDI-TOF MS. The results from the MALDI-TOF MS analysis of a urine sample from a patient with known lambda free light chains were shown in FIG. 9, and a peak at 23,327 Mass/Charge indicates the presence of the lambda free light chain in the urine sample. These findings indicate that MALDI-TOF MS can be used to screen patient samples for monoclonal gammopathies.

Example 3

Figure 10:
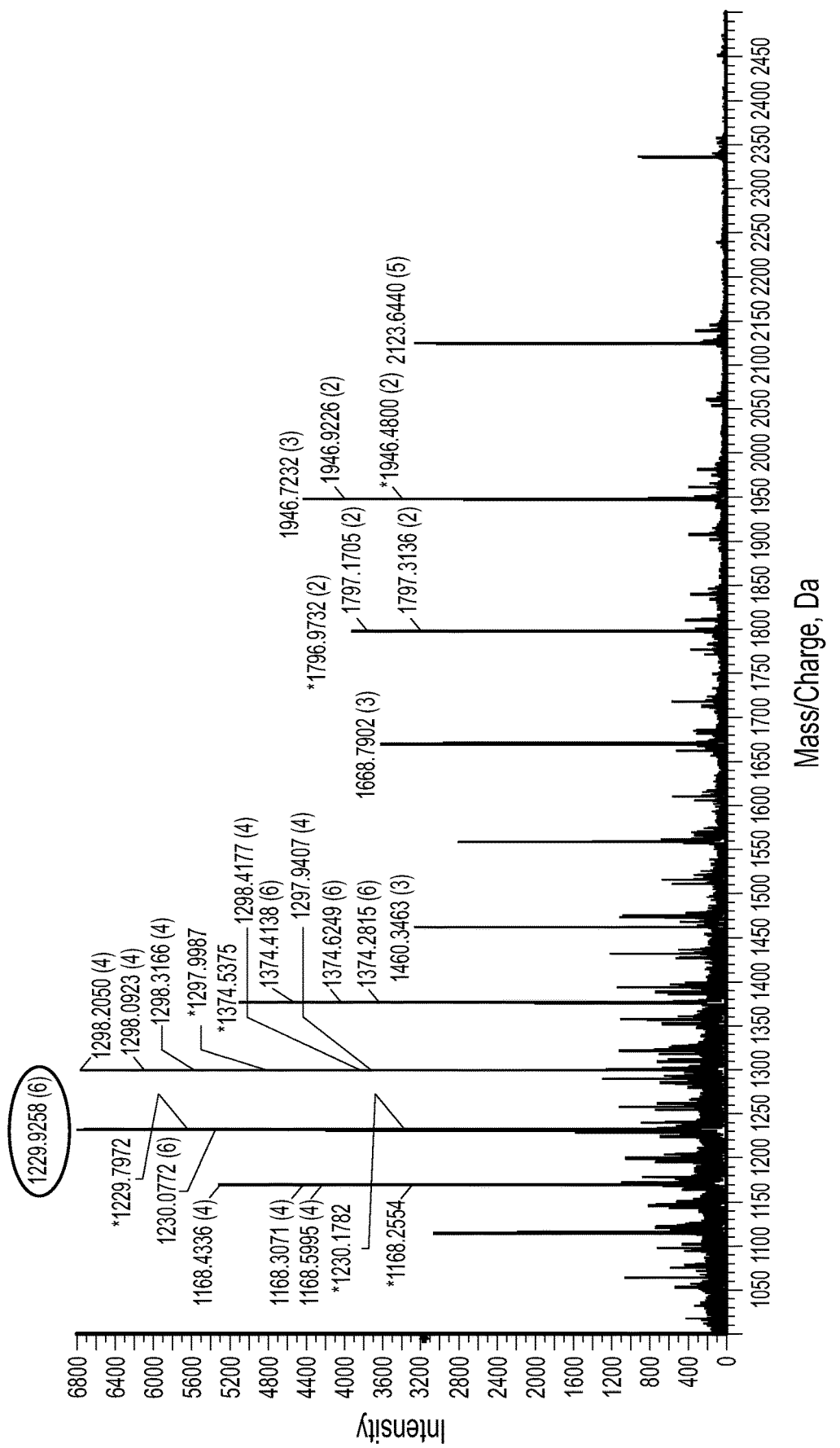
FIG. 10 is a mass spectrum of a serum sample from a patient with IgG kappa monoclonal gammopathy, measured by LC-MS, with highlights of the peak at 1229.9 Mass/Charge which is selected as the precursor ion for LC-MS/MS.

Determination of Whether an Immunoglobulin Light Chain is Lambda or Kappa Light Chain by Tandem Mass Spectrometry FIG. 10 is a mass spectrum of a serum sample from a patient with IgG kappa monoclonal gammopathy, measured by LC-MS, with highlights of the peak at 1229.9 Mass/Charge which is selected as the precursor ion for LC-MS/MS. Once the precursor ion mass was determined, an LC-MS/MS method was selected that allows the quadrupole portion of the mass spectrometer to select that specific ion. This precursor ion was then fragmented using collision-induced dissociation (CID) in the collision cell portion of the mass spectrometer. The fragment ions produced were then analyzed using the time-of-flight (TOF) portion of the mass spectrometer.

Figure 11:
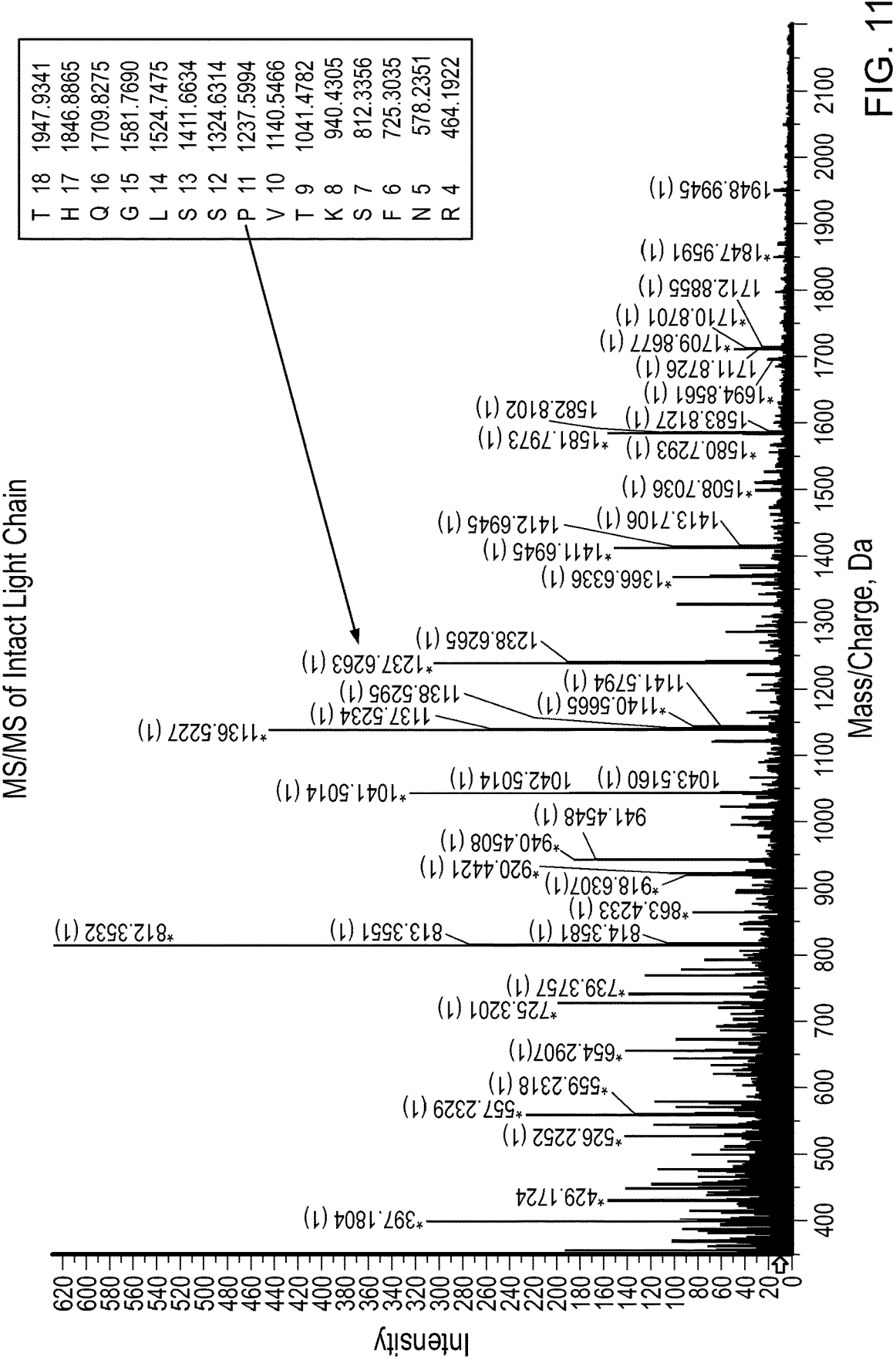
FIG. 11 shows the fragment ion mass spectrum for the precursor ion labeled in FIG. 10.

FIG. 11 showed the fragment ion spectrum for the precursor ion labeled in FIG. 10. On the right hand side of FIG. 11 was a list of C-terminal y-ion fragments and their masses from the constant region for kappa light chain. FIG. 11 also showed an arrow pointing from the list at P (proline) residue 11 with a mass of 1237.5994, to a peak in the fragment ion spectrum at mass 1237.6263. By comparing other fragment ion peaks with the list of y-ions for the C-terminal constant region for kappa light chain, it was possible to identify the M-spike as a kappa light chain.

Figure 12:
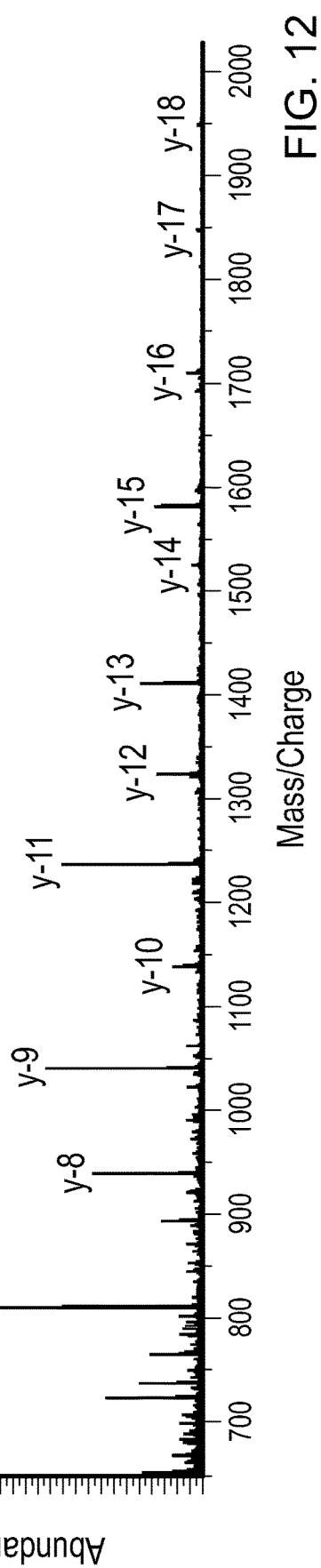
FIG. 12 shows the light chain mass spectra from different multiple myeloma patients with known kappa light chains.
Figure 12:
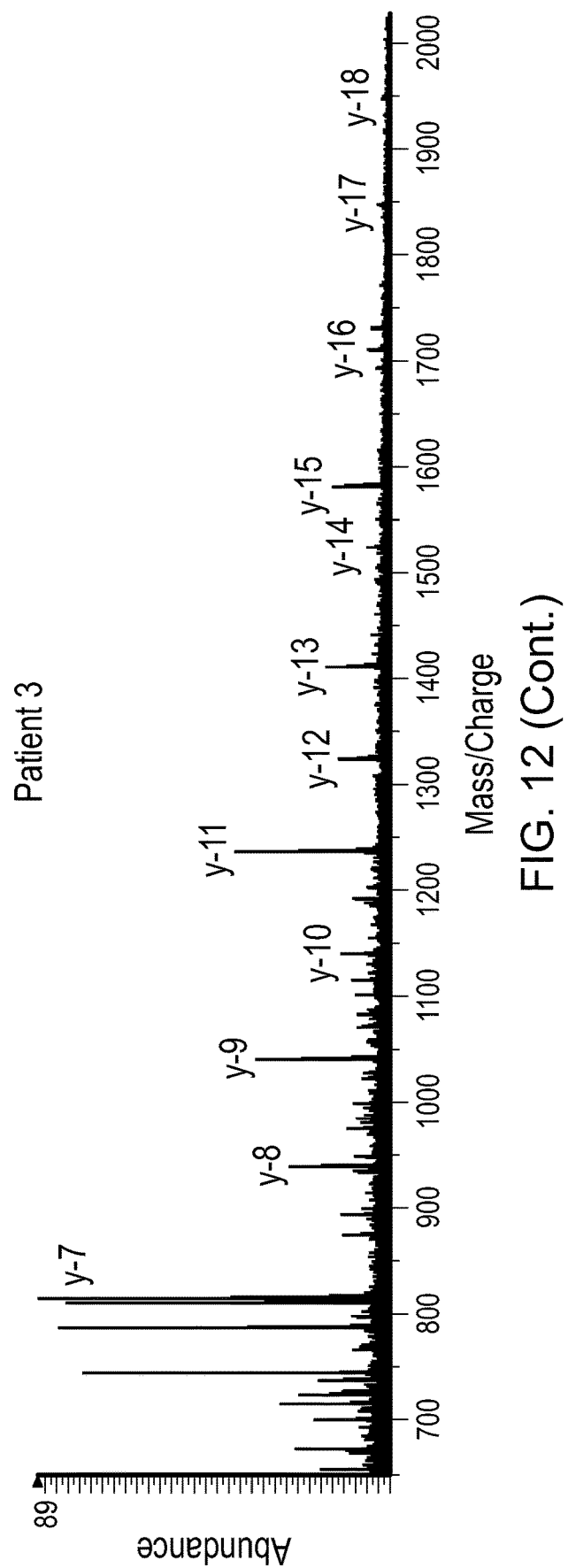

Serum sample from several multiple myeloma patients with known M-spike kappa light chains, were prepared as described above in Example 1. FIG. 12 showed the M-spike light chain mass spectra of the serum samples from different multiple myeloma patients with known M-spike kappa light chains. Each spectrum showed a different set of multiply charged ions from each patient's unique light chain. These results clearly showed that LC-MS/MS of the intact light chain can be used to determine if it is a kappa light chain.

Figure 13:
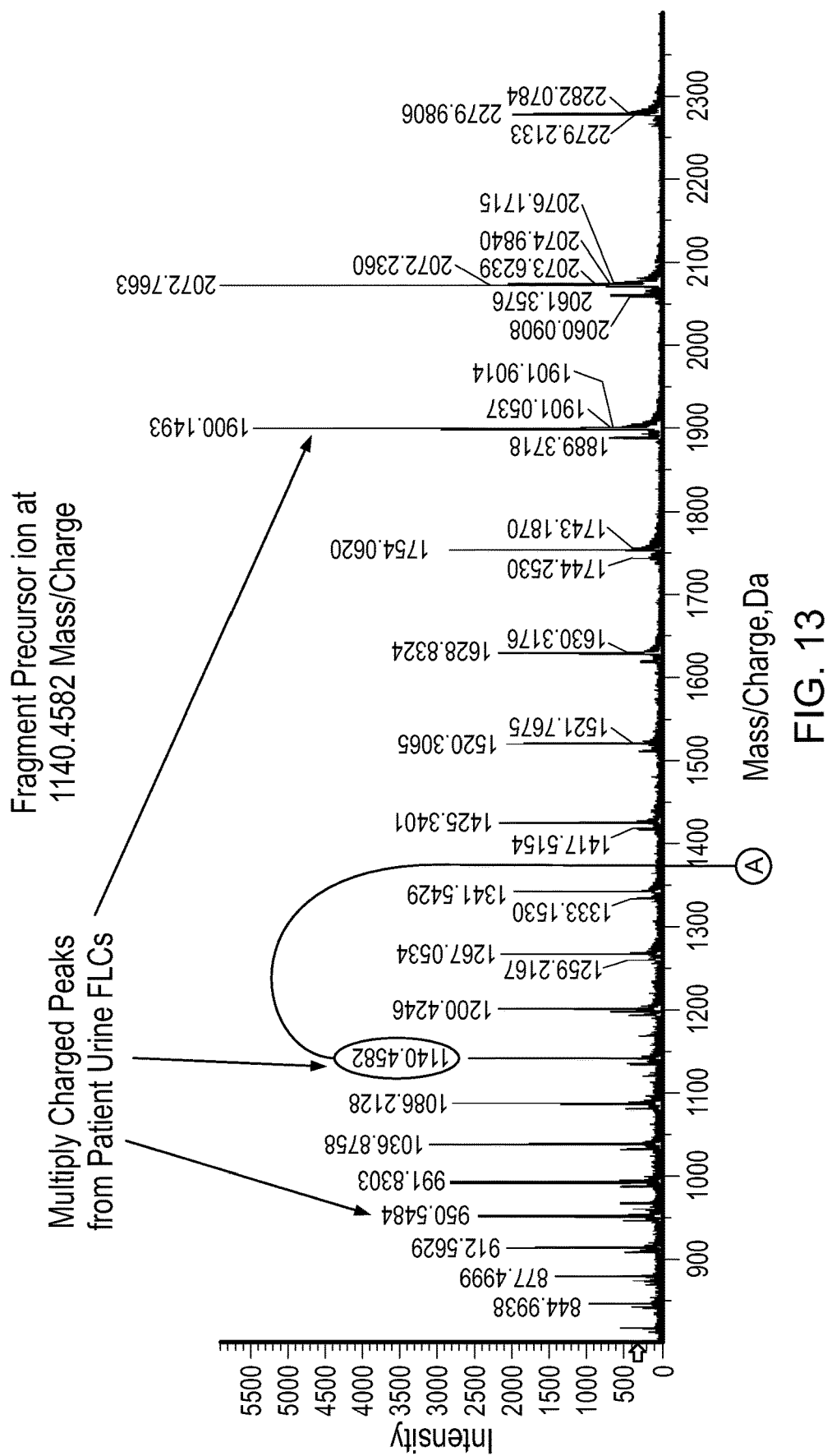
FIG. 13 shows the light chain mass spectrum of a urine sample from a multiple myeloma patient with known lambda light chains along with the lambda light chain specific LC-MS/MS fragment ions.
Figure 13:
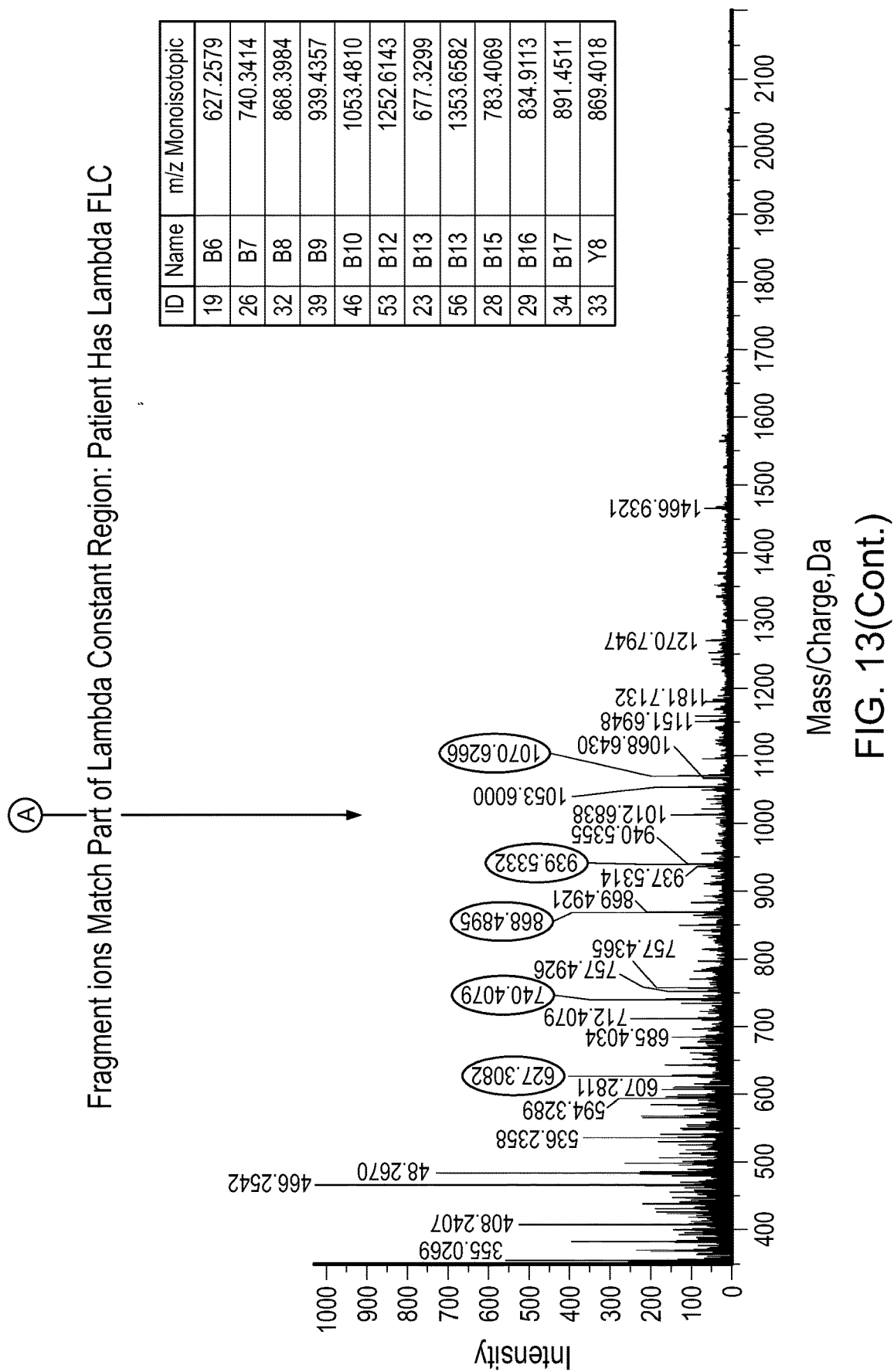

Equivalent experiments were performed on multiple myeloma patients with known M-spike lambda light chains found in urine. Urine samples were prepared as described in Example 1. Data obtained for patient urine samples demonstrated the superior analytical sensitivity and specificity of the method over methods currently used in clinical laboratories, for example serum protein gel electrophoresis (SPEP), or urine protein gel electrophoresis (UPEP). FIG. 13 showed the M-spike light chain mass spectrum from a patient urine sample with known M-spike lambda light chains. The spectrum at the top of FIG. 13 showed the multiply charged ions from lambda free light chains (FLCs) found to be present in the patient's urine using a standard immunoassay. The spectrum at the bottom of FIG. 13 showed the LC-MS/MS fragment ion spectra from the patient's intact lambda light chain ion at 1140.4582 Mass/Charge. By using a commercially available software package called Prosight, the identity of the fragment ions observed can be determined. The software identified the ions as b-ions produced from the N-terminal portion of the lambda constant region. Ions that match the expected b-ions were circled in the lower spectrum in FIG. 13. These results clearly showed that LC-MS/MS of an intact light chain can be used to determine if it is lambda light chain.

Figure 14:
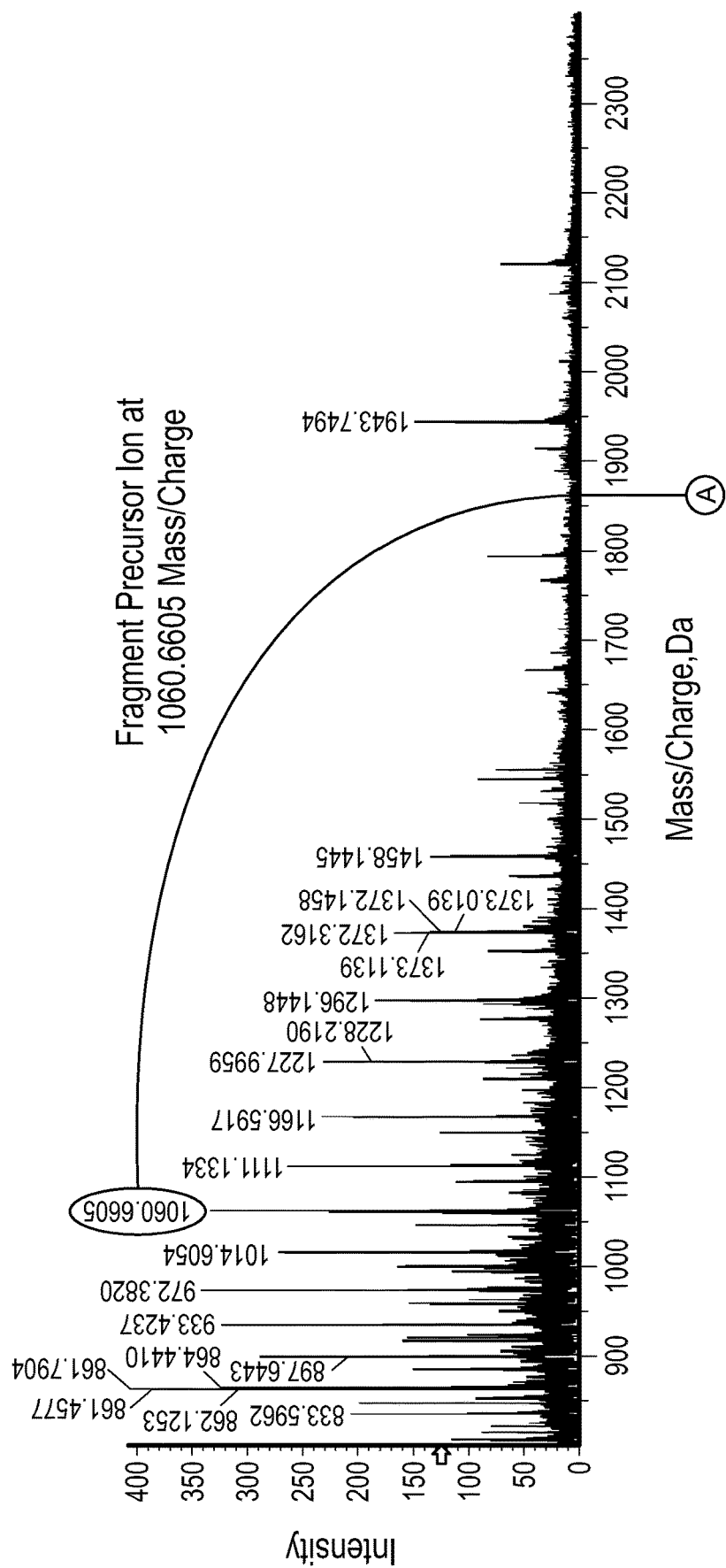
FIG. 14 shows the light chain mass spectrum of a urine sample from a patient with known kappa free light chains, along with the kappa light chain specific LC-MS/MS fragment ions.
Figure 14:
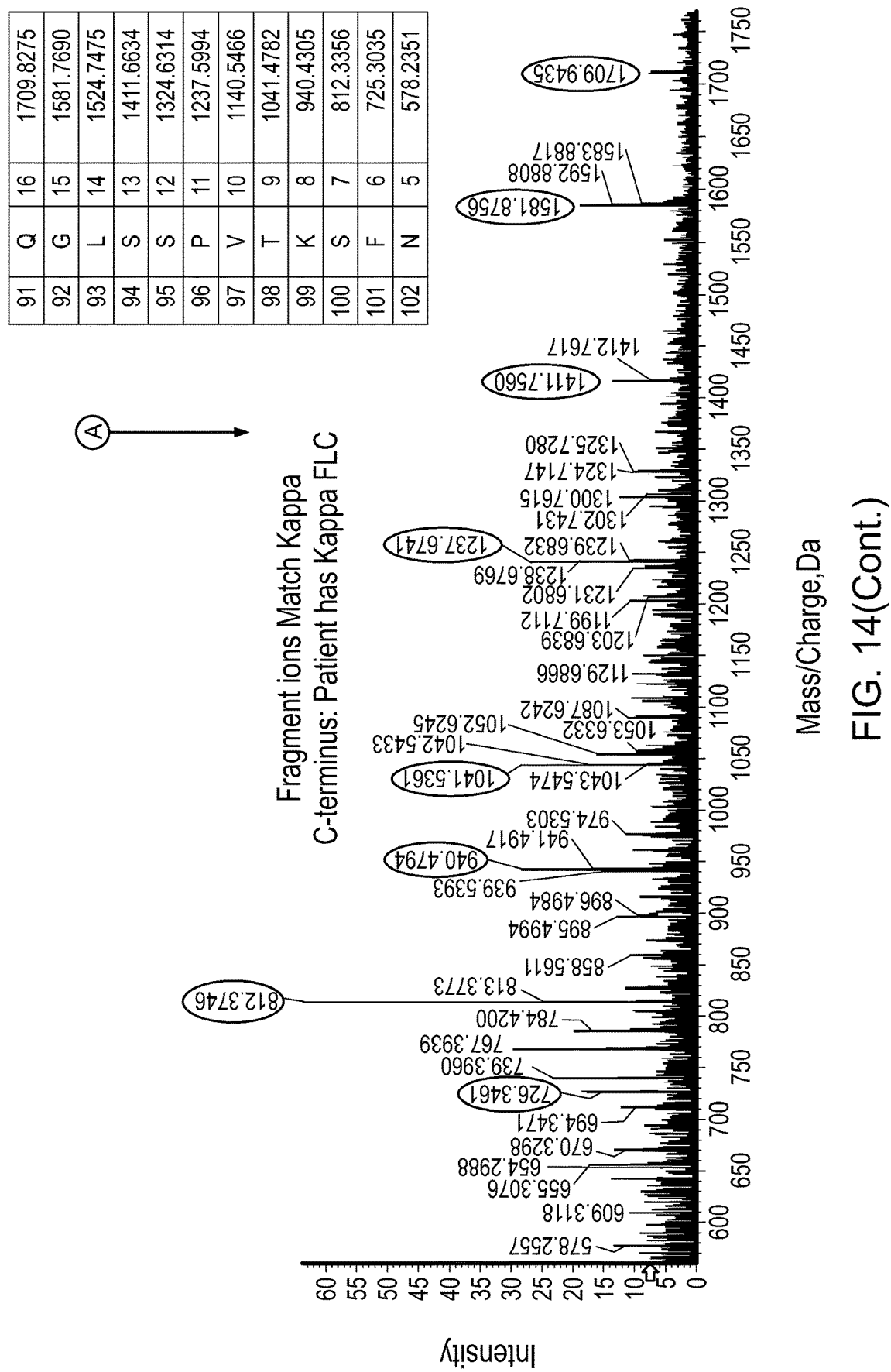
Figure 15A:
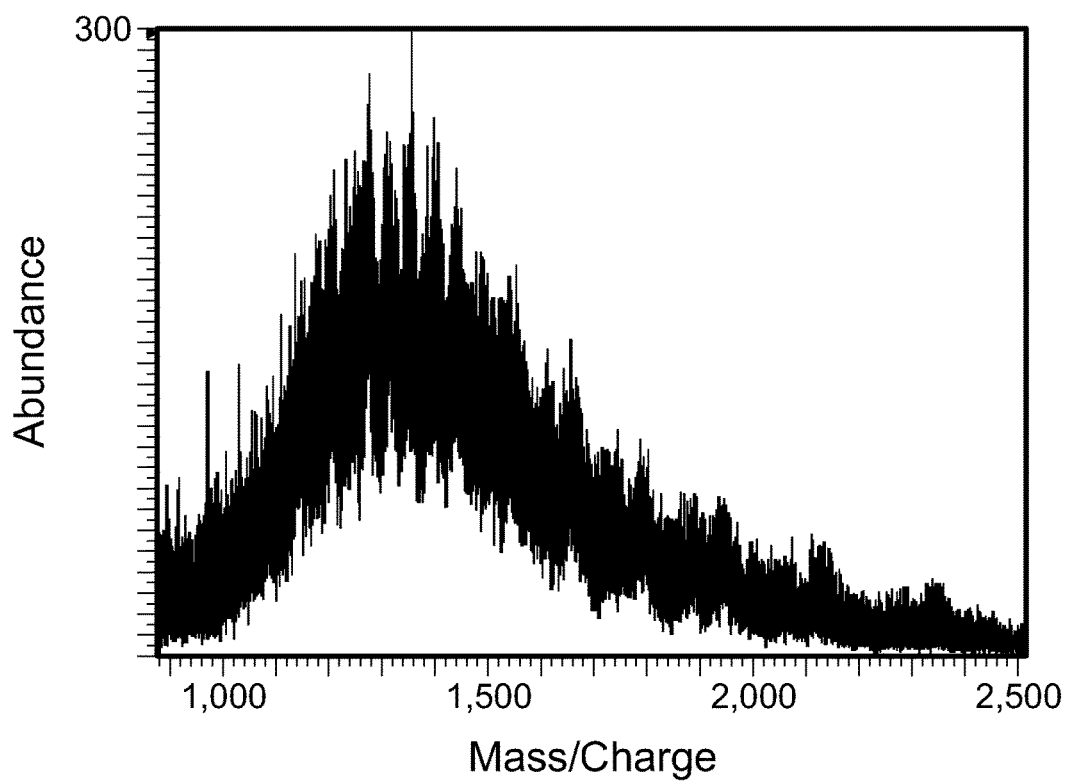
FIG. 15A-15B are a set of mass spectra from a normal serum sample (1A) and normal serum spiked with 0.5 g/dL of the IgG kappa recombinant mAb adalimumab (1B). The normal serum mass spectrum displays a broad range of unresolved peaks, whereas the normal serum spiked with 0.5 g/dL of adalimumab shows a clearly defined multiply charged protein ions.
Figure 15B:
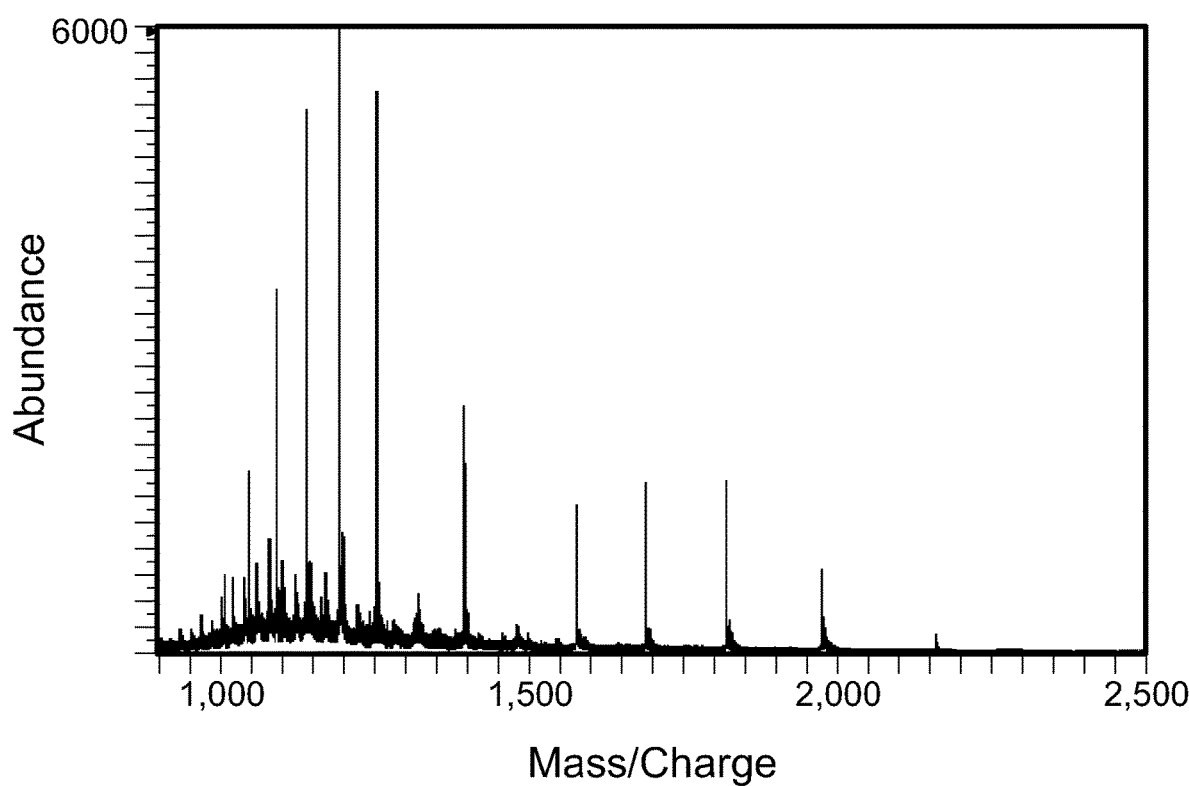
Figure 15C:
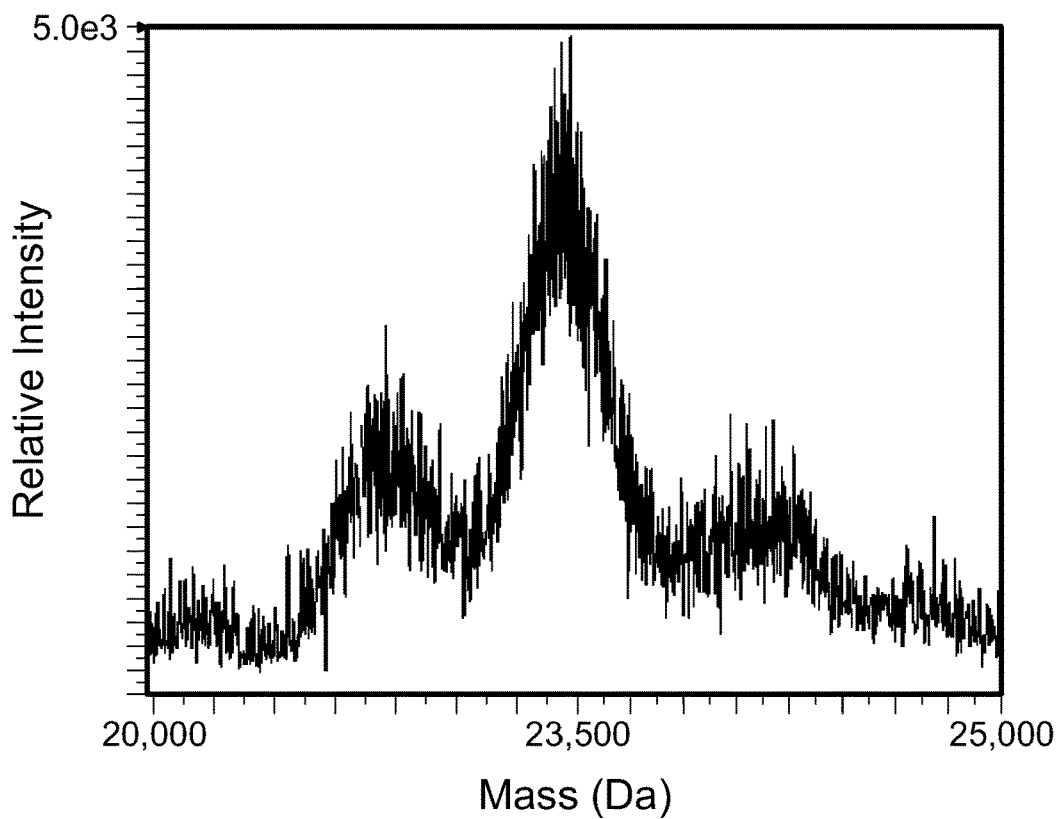
FIG. 15C is a converted spectrum for the normal serum sample displaying a broad range of unresolved peaks.
Figure 15D:
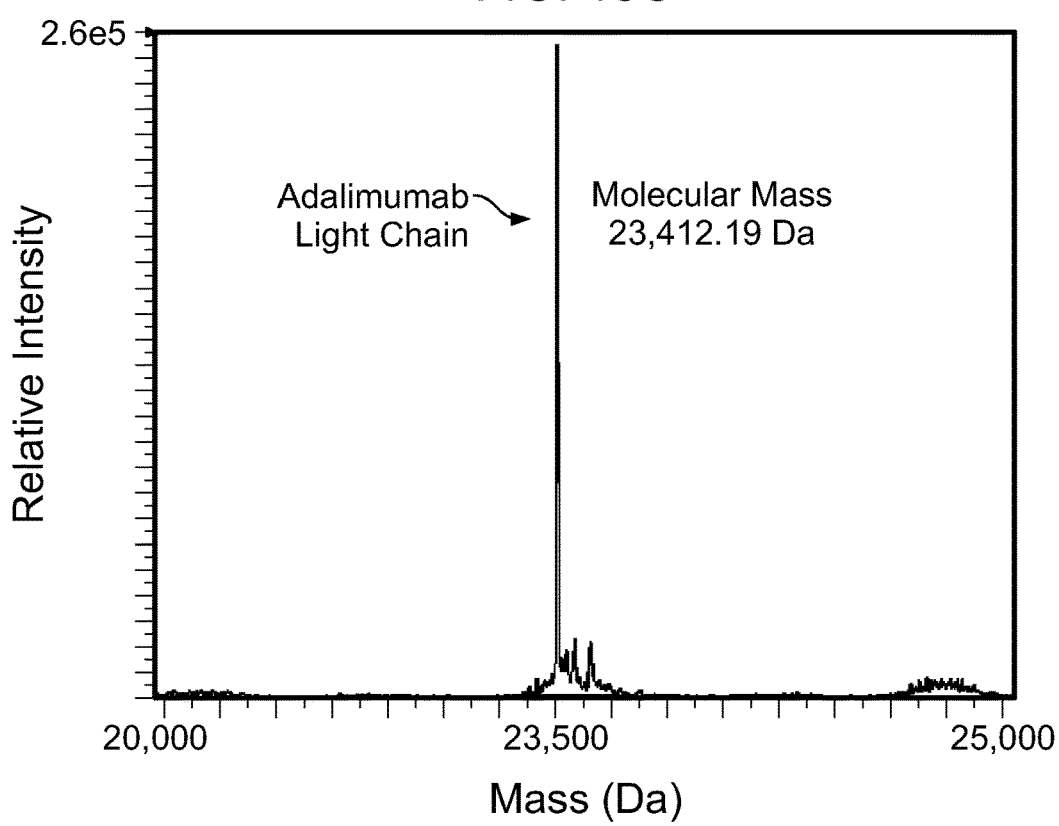
FIG. 15D is a converted mass spectrum for the normal serum spiked with 0.5 g/dL of adalimumab showing a single peak at an average molecular mass of 23 412.19 Da. This mass is in excellent agreement with the calculated average molecular mass of 23 412.13 Da for the kappa light chain of adalimumab.

Urine samples from patient with known kappa free light chains were tested using the same method. The results from these experiments were shown in FIG. 14. The top of FIG. 14 showed the spectrum for the intact kappa free light chain in the urine sample. The spectrum was similar to those observed for serum. The bottom of FIG. 14 showed the fragment ion spectrum for the intact multiply charged ion at 1060.6605 Mass/Charge. Fragment ions that match the expected ions from the constant region of the C-terminus were highlighted. The fragment ions observed were the same as those observed in serum samples from patients with a kappa light chain (see FIG. 11). This observation confirmed that kappa light chains can be identified in urine and serum samples.

Clear differences in the fragment ions were produced between kappa and lambda light chains and can be detected by tandem mass spectrometry. Intact kappa ions exposed to collision-induced dissociation (CID) during the MS/MS portion of the experiment on the 5600 Q-TOF mass spectrometer had produced y-ion fragments from the C-terminal portion of the molecule. Intact lambda ions exposed to the same CID, MS/MS conditions had produced b-ions from the N-terminal portion of the molecule. Similar method can be used to identify the different lambda subtypes giving an additional diagnostic aspect to this methodology. The unique y-ion series produced by the C-terminal amino acid sequence from kappa can be used as an MS/MS tag similar to protein tags that are added to recombinant proteins for purification purposes.

Example 4

Adalimumab in Normal Serum as a Model System

Adalimumab is an anti-TNF therapeutic monoclonal immunoglobulin that is widely prescribed for downregulating the inflammatory response in patients with autoimmune disorders. Therapeutic monoclonal immunoglobulins such as adalimumab are ideal surrogate standards for simulating a monoclonal immunoglobulin in serum because they are readily available in high purity and typically have a large body of literature on their structural properties. FIG. 15 shows the mass spectra for normal serum and serum spiked with 0.5 g/dL (30 µM) of adalimumab. Each mass spectrum represents the spectra summed together over the adalimumab light chain elution time. The mass spectrum from normal serum in section A shows a broad unresolved peak with a maximum relative abundance of 300 counts per second (cps). Alternatively the mass spectrum from the serum spiked with adalimumab in section B shows a distinct series of peaks from multiply charged protein ions with a maximum relative abundance of 6000 cps. The converted molecular mass for the normal serum in panel C shows a set of broad distribution of masses with no single mass higher in abundance than the background. This is in sharp contrast to the converted molecular mass for the normal serum spiked with 0.5 g/dL of adalimumab in panel D, which displays a single peak with the observed molecular mass of 23 412.19 Da. This molecular mass agrees with the average molecular mass calculated from the known amino acid sequence for the kappa light chain of adalimumab (23 412.13 Da). To assess microLC-ESI-Q-TOF MS for quantification, adalimumab was spiked into 50 mM ammonium bicarbonate buffer, normal serum, and normal urine. Ten different standard concentrations were used ranging from 0.005 to 5.0 g/dL. Standard curves made in serum used Melon Gel to enrich for immunoglobulins, whereas curves made in urine and buffer were reduced and analyzed without Melon Gel purification. Linearity and linear dynamic range values in the table are split according to the two quantification techniques. The first approach labeled "deconvolution peak area" uses the peak area found after deconvolution of the multiply charged ions to molecular mass, whereas the second approach labeled "extracted ion peak area" refers to using the peak areas obtained from a selected set of extracted ions. The table demonstrates that the standard curves have a linear dynamic range within the concentration range needed in clinical practice. The interassay precision of 10 replicate Melon Gel preparations of adalimumab spiked into normal serum at 0.1 g/dL was examined and found the CV for the peak area of the light chain to be 6.2%, whereas the CV for the heavy chain was 11%. The limit of quantification as defined by a CV<20% for 10 replicates using the deconvolution peak areas was 0.005 g/dL for the light chain and 0.025 g/dL for the heavy chain of adalimumab spiked into normal serum.

Example 5

Monitoring a Monoclonal Immunoglobulin in a Patient with Multiple Myeloma

Figure 16A:
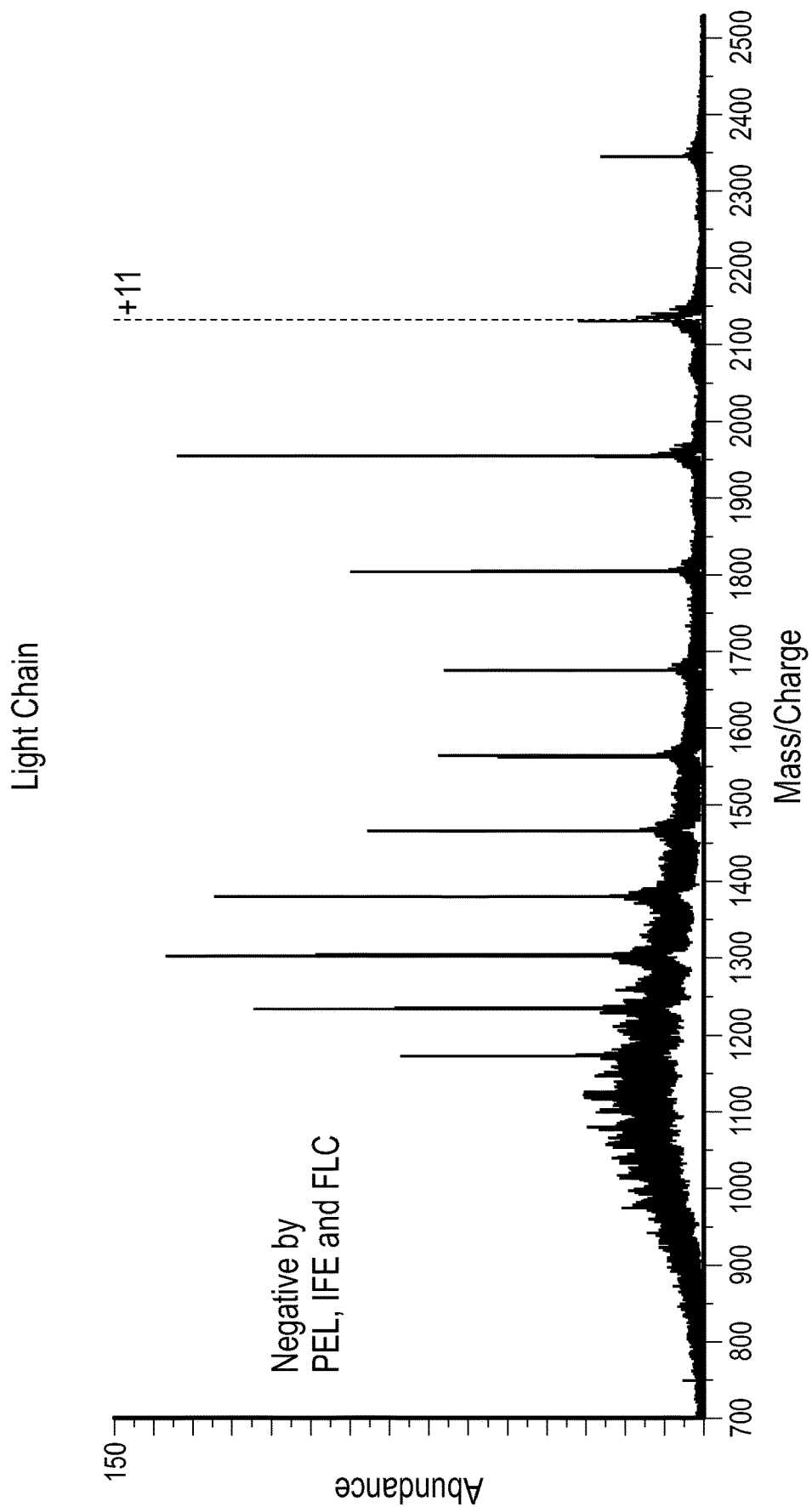
FIG. 16A-16C show results from the analysis of a serum sample from the same patient shown in FIG. 1 after treatment for multiple myeloma. The sample was negative by protein gel electrophoresis (PEL), immunofixation electrophoresis (IFE), and the free light chain (FLC) assay.
Figure 16B:
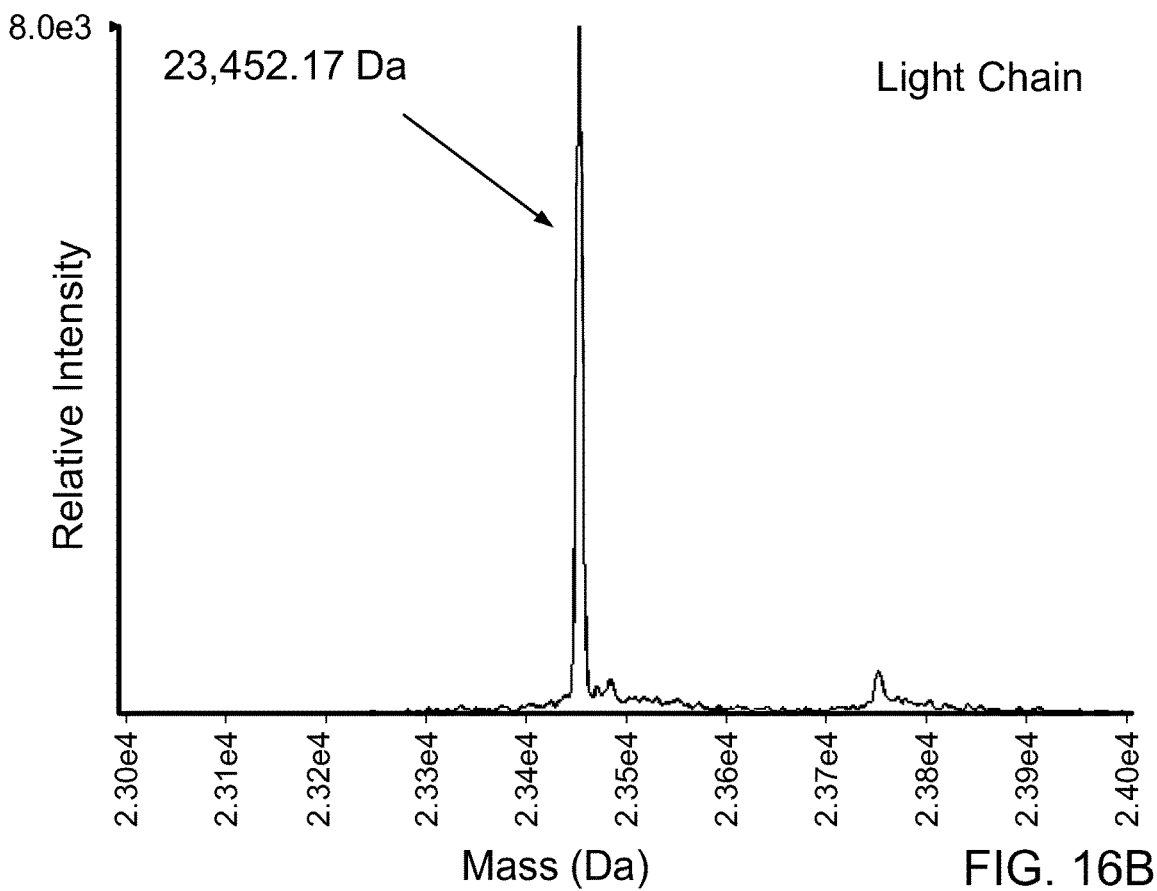
Figure 16C:
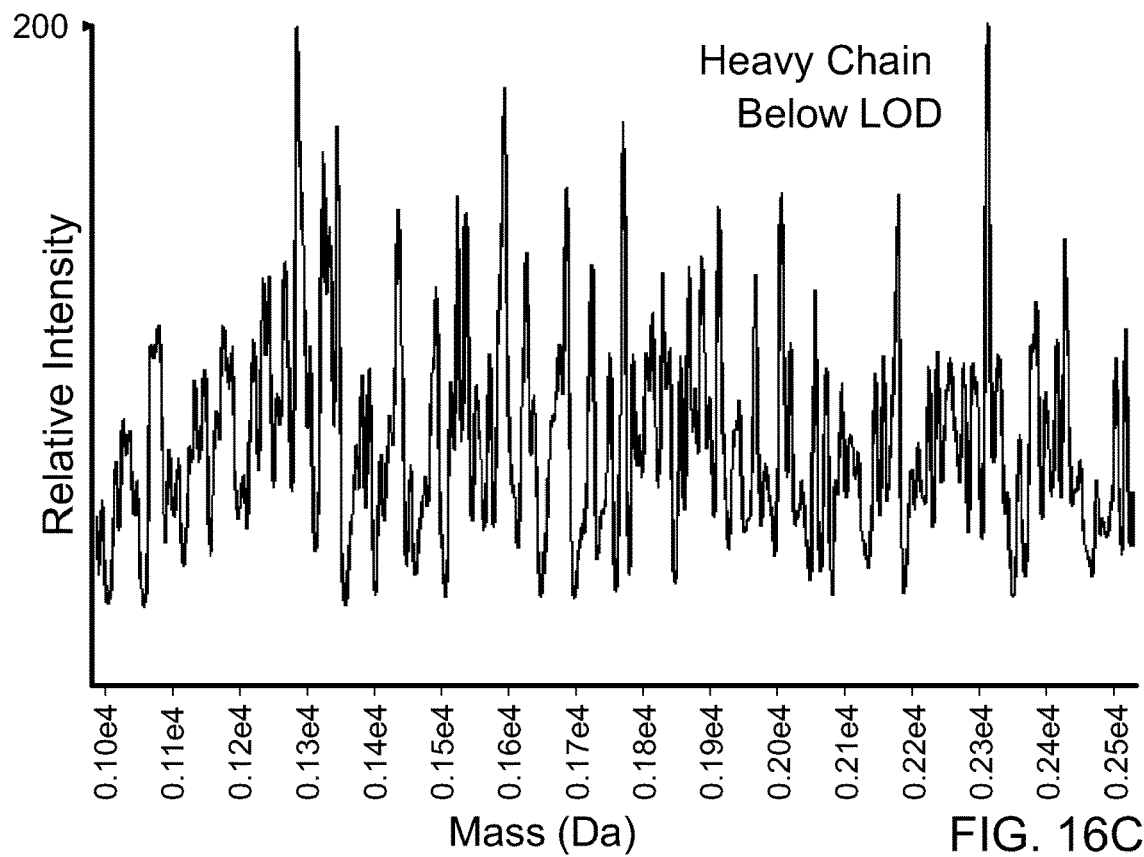

A series of samples from a patient diagnosed with IgG kappa multiple myeloma was examined. The mass spectrum from a serum sample is shown in FIG. 1. The spectrum in FIG. 1A represents a portion of the summed mass spectra across the immunoglobulin LC peak and shows a series of multiply charged ions. The converted molecular mass is shown in FIG. 1B and was calculated to be 23 452.64 Da, representing the proposed molecular mass of the kappa light chain portion of the M-protein. The spectrum in panel C shows another portion of the summed immunoglobulin LC peak and displays a different series of multiply charged ions. The molecular mass for this series shown in FIG. 1D was found to have two components, one at 51 596.07 Da and another at 51 758.27 Da, both of which are consistent with IgG heavy chain. The difference of 162.20 Da between series 2 and 3 may be due to two heavy chain proteoforms differing by the number of hexose units (average MW, 162.14 Da) in the carbohydrate chain. Additional samples taken over a 7 year period were available for testing from this patient. FIG. 16 shows the result using mass spectrometry for a sample taken after the patient had been treated for multiple myeloma and was found to be negative by PEL, IFE, and the quantitative FLC immunoassay. However, multiply charged ions from the light chain are clearly evident in the mass spectrum shown in FIG. 16A. After conversion to molecular mass, a distinct peak at 23 452.17 Da is observed that differs by 0.47 Da compared to the value calculated in the spectrum from the initial diagnosis sample taken over 6 years earlier. Table 1 lists a summary of the results of monitoring the M-protein in serum by PEL, IFE, and microLC-ESI-Q-TOF MS and shows that the light chain is observed throughout the sampling dates, including all of the dates where PEL and IFE were negative. Also, the molecular mass of the light chain remains consistent with an average value of 23 452.54 Da and a standard deviation of 0.86 Da for molecular mass calculations over the 7 year sample period. The heavy chain was observed in the PEL and IFE positive samples, and in those samples, the molecular mass calculations were consistent over the 7 year period. This supports the assumption that M-protein molecular mass is a highly sensitive marker of the plasma cell clone. In addition, a linear regression analysis was done to evaluate the correlation in response between the M-spike value and the peak areas from deconvolution. The correlation for the light chain was r2=0.9455, whereas the two heavy chain proteoforms had $r^2$=0.9205 and 0.9222, respectively.

Figure 18:
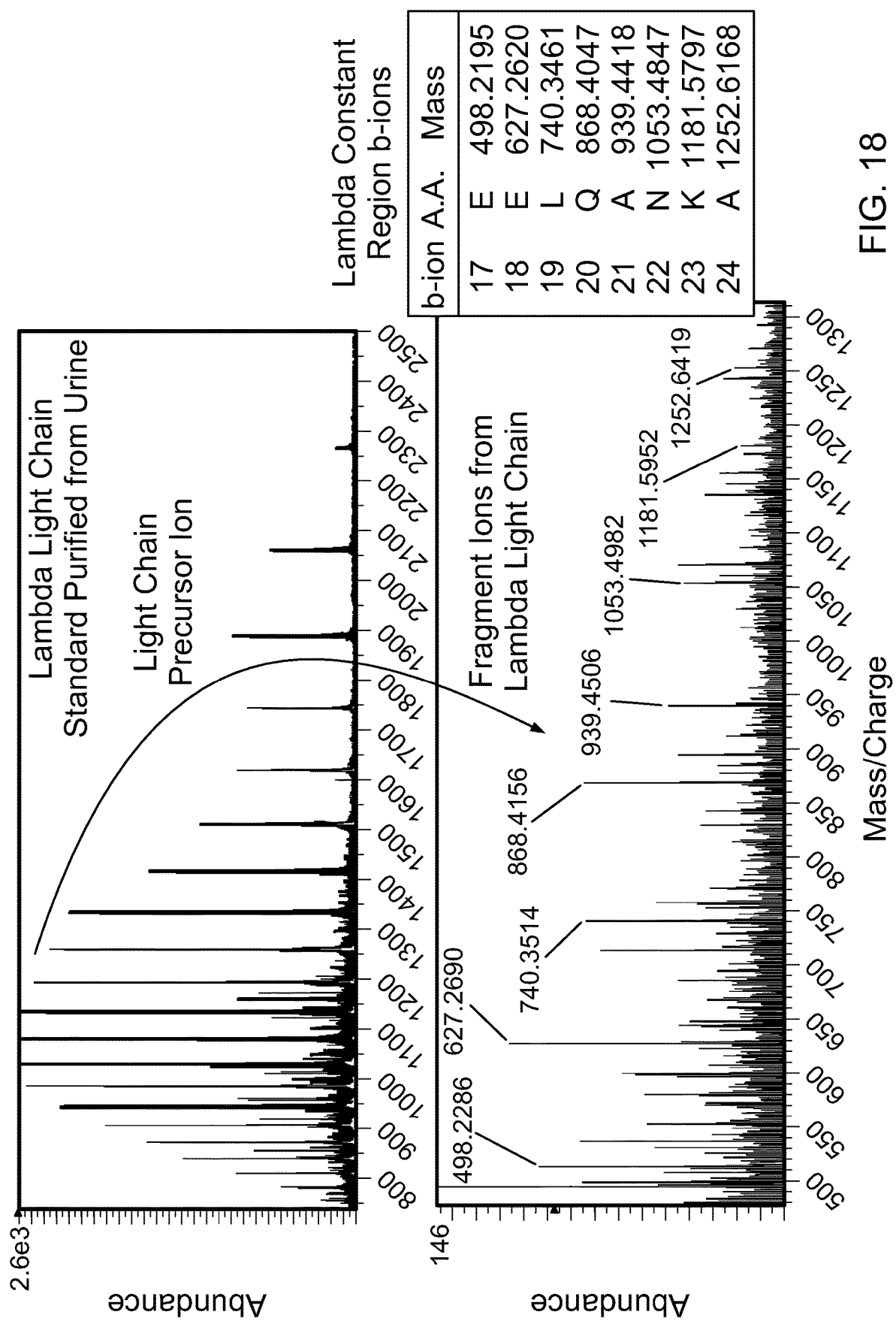
FIG. 18 shows results of the top-down MS of a lambda immunoglobulin light chain standard. The light chain ion at m/z=1193 in the top spectrum was selected for MS/MS, and the fragment ion mass spectrum is shown below. Fragment ions that match a portion of the lambda light chain constant region are labeled with their respective monoisotopic masses. The calculated b-ion monoisotopic masses for the lambda constant region-specific sequence are shown in the table.

Additional experiments were performed using matched urine and serum samples taken from a patient with a known monoclonal gammopathy to determine if the molecular mass of the monoclonal light chain would remain constant after being excreted through the kidney into the urine. Two patients (one IgA kappa and one IgA lambda) who had previously been identified as having a monoclonal gammopathy were examined. However, the samples analyzed by microLC-ESI-Q-TOF MS were negative by PEL and IFE for a monoclonal immunoglobulin in both serum and urine. Our findings showed that the molecular mass of the light chain did not change between serum and urine within the expected mass error of the experiment. These results reinforce the principle that molecular mass alone can be used to monitor a monoclonal immunoglobulin regardless of the sample type and that microLC-ESI-Q-TOF MS is a method for identifying a monoclonal immunoglobulin in urine.

topic masses, which closely match the calculated monoisotopic masses for y ions from the constant region of the kappa light chain. To determine if this would hold true for other patients with kappa light chains, a set of 20 IgG kappa patients was analyzed by top-down MS on the light chains. The fragment ion mass spectrum for each patient was generated from a different multiply charged precursor ion because of an individual's different variable region amino acid sequence. However, regardless of the patient-specific precursor ion, the same y ions matching the kappa constant region were identified. All 20 of the patients tested showed the same kappa-specific fragment ions. LC-ESI-Q-TOF MS experiments were also performed on a commercially available lambda light chain. The mass spectrum on the top of FIG. 18 shows the multiply charged lambda light chain with the fragment ion spectrum on the bottom of FIG. 18. Initial comparison between the monoisotopic masses for the observed fragment ions and the potential y ions from the 5' lambda constant region did not produce matches. The top-down MS protein database search engine ProSight was used to search the fragment ions to find a possible match within the constant region. The table on the right of FIG. 18 lists the lambda light chain constant region sequence tag found by ProSight along with the monoisotopic masses for b ions from the sequence. Fragment ions that match the monoisotopic masses in the table are labeled in the spectrum. Although the intensity of the b-ion series for lambda may be less pronounced than those observed for kappa, the fragment ions observed are unique to the lambda light chain isotype. A set of 20 patients positive for an IgG lambda light chain was analyzed by top-down MS fragment, and the b ions matching the N-terminal portion of the lambda constant region were observed in each patient. In addition, IFE positive urine samples were analyzed by top-down MS and

TABLE 1

Comparison of M-protein PEL and IFE Results with the Peak Areas and Molecular Masses Observed for the M-protein by microLC-ESI-Q-TOF MS[a]

| sampling date | M-spike (g/dL) | IFE | light chain | | heavy chain |
|---|---|---|---|---|---|
| | | | peak area | molecular mass (Da) | molecular mass (Da) |
| Feb. 23, 2005[b] | 4.35 | pos | 3010 899 | 23 452.64 | 51 595.07   51 758.27 |
| Mar. 29, 2006 | 0.26 | pos | 34 839 | 23 452.10 | |
| Apr. 24, 2007 | 0 | neg | 9 301 | 23 451.78 | |
| Oct. 31, 2007 | 0 | neg | 11 496 | 23 452.31 | |
| Apr. 23 2008 | 0.54 | pos | 152 021 | 23 452.20 | 51 596.46   51 757.84 |
| May 7, 2009 | 0.43 | pos | 323 375 | 23 452.34 | 51 596.66   51 758.52 |
| Jul. 27, 2010 | 3.24 | pos | 3 121 072 | 23 452.50 | 51 596.56   51 758.91 |
| Aug. 22, 2011[c] | 0 | neg | 21 12 | 23 452.17 | |
| Mar. 5, 2012 | 0.79 | pos | 600 281 | 23 452.50 | 51 596.44   51 758.74 |

[a]Results are from serum samples obtained from a patient diagnosed with muliple myeloma taken over a 7 year period.
[b]Sample date Feb. 23, 2005 was used in FIG. 2
[c]Sample date Aug. 22, 2011 was used in FIG. 3.

Example 6

Identification of Light Chain Isotype by Top-Down MS

Figures 17A, 17B:
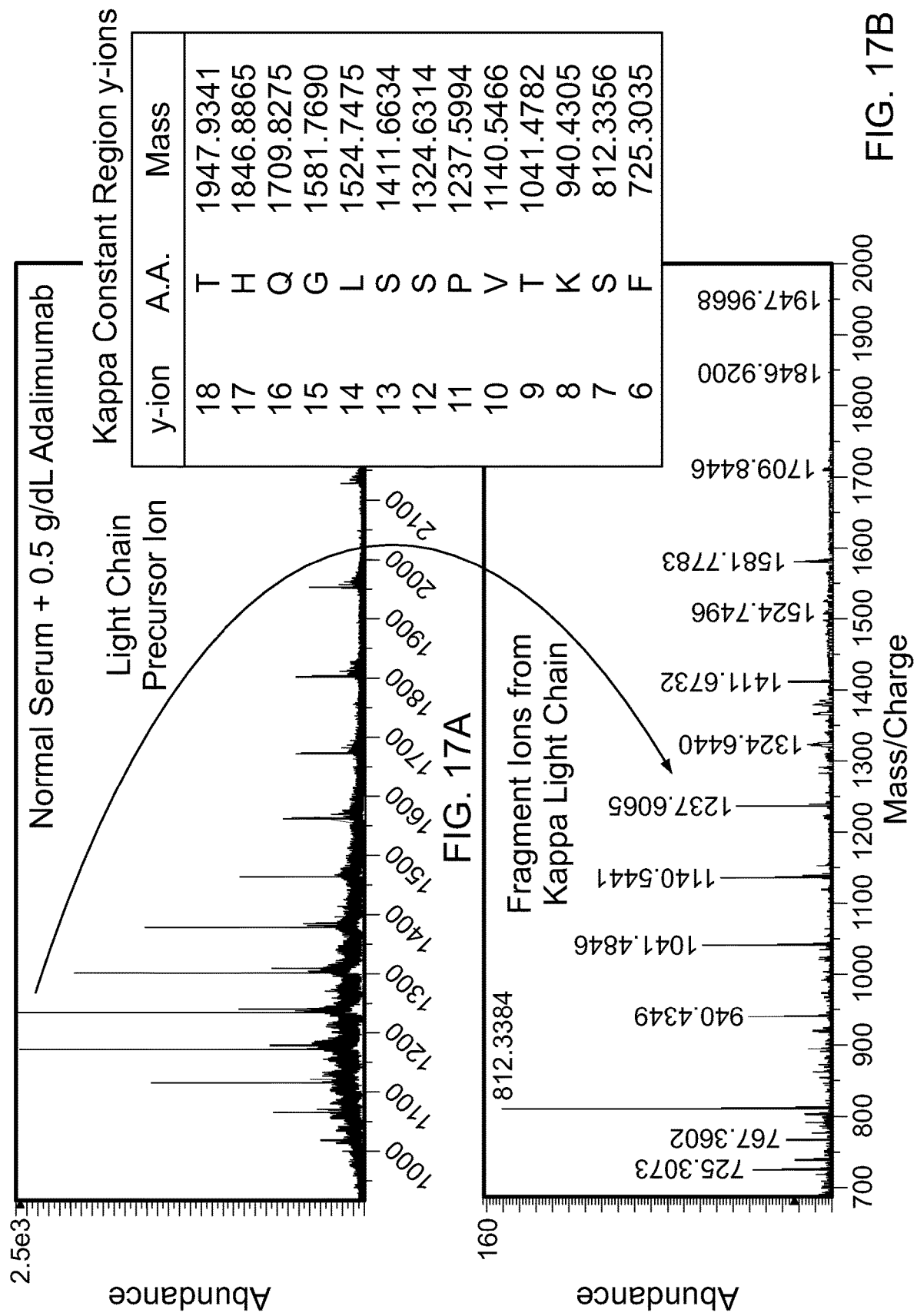
FIG. 17 shows results of the top-down MS of adalimumab spiked into normal serum. The ion at m/z=1233 in the top spectrum matches the +19 charge state ion from the kappa light chain of adalimumab and was selected for top-down MS. The arrow points to the fragment ion mass spectrum. The labeled fragment ions match the expected masses for fragment ions from the C-terminal portion of the kappa light chain that contains the constant region. The calculated y-ion masses for the kappa light chain constant region-specific amino acid sequence are shown in the table.

Top-down MS was done on a multiply charged ion from the light chain of adalimumab, which has a kappa isotype. The results from a top-down analysis using adalimumab spiked into normal serum are shown in FIG. 17. FIG. 17A shows the multiply charged ions from the kappa light chain along with an arrow to the fragment ion mass spectrum produced from the CID of the precursor at m/z=1233 shown in FIG. 17B. Fragment ions are labeled with their monoisofound that lambda-positive samples had lambda-specific fragment ions and kappa-positive samples had kappa-specific fragment ions. These findings led us to conclude that top-down MS could be used to isotype kappa and lambda light chains.

The results shown here provide the empirical evidence to substantiate the utility of mass spectrometry as a tool to monitor an M-protein in patients with a monoclonal gammopathy. The molecular mass of the monoclonal immunoglobulin, whether it is the light chain, heavy chain, or the intact molecule, represents a sensitive and specific marker of immunoglobulin-secreting plasma cell clones. The methodology can readily identify a monoclonal immunoglobulin present above the polyclonal background, providing exceptionally detailed information about the status of patient-specific plasma cell clones. In the future, mass spectrometry might play an important role in the quantitation and monitoring of immunoglobulins in human health and disease.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of detecting the presence of a monoclonal immunoglobulin expansion in a whole blood, serum, plasma or urine sample obtained from a subject, the method comprising:
    a. isolating (i) intact IgG, IgA, and/or IgM immunoglobulins, and/or (ii) intact lambda and/or kappa immunoglobulins from the sample to obtain a mixture of immunoglobulins comprising different intact immunoglobulins present in the subject;
    b. decoupling the intact immunoglobulins within the immunoglobulin mixture to generate a decoupled immunoglobulin sample comprising immunoglobulin heavy chains and immunoglobulin light chains;
    c. subjecting the decoupled immunoglobulin sample to a top down mass spectrometry technique to obtain a mass spectrum of the decoupled immunoglobulin sample comprising a distribution of fragment ion peaks generated from the immunoglobulin light chains having a molecular mass of about 21,000 Da to about 26,000 Da; and
    d. detecting the presence of the monoclonal immunoglobulin expansion based on the presence of a M-protein peak within the distribution of fragment ion peaks, the M-peak having an ion intensity at least 3-fold higher than a background ion intensity produced by other immunoglobulins present in the mixture of immunoglobulins.

2. The method of claim 1, wherein the mass spectrometry technique comprises a matrix assisted laser desorption ionization-mass spectrometry (MALDI-MS).

3. The method of claim 1, wherein the isolating step comprises chemical based fractionation or affinity purification.

4. The method of claim 1, wherein the monoclonal immunoglobulin light chain is an endogenous monoclonal immunoglobulin light chain associated with a monoclonal gammopathy.

5. The method of claim 4, wherein the monoclonal gammopathy is multiple myeloma.

6. The method of claim 1, wherein said decoupling comprises treating the intact immunoglobulins with a reducing agent.

7. A method of diagnosing a monoclonal gammopathy in a subject, the method comprising:
    a. isolating (i) intact IgG, IgA, and/or IgM immunoglobulins, and/or (ii) intact lambda and/or kappa immunoglobulins from a whole blood, serum, plasma or urine sample obtained from the subject to obtain mixture of immunoglobulins comprising different intact immunoglobulins present in the subject;
    b. decoupling the intact immunoglobulins within the immunoglobulin mixture to generate a decoupled immunoglobulin sample comprising immunoglobulin heavy chains and immunoglobulin light chains;
    c. subjecting the decoupled immunoglobulin sample to a top down mass spectrometry technique to obtain a mass spectrum of the decoupled immunoglobulin sample comprising a distribution of fragment ion peaks generated from the immunoglobulin light chains having a molecular mass of about 21,000 Da to about 26,000 Da;
    d. detecting the presence of a monoclonal immunoglobulin expansion based on the presence of a M-protein peak within the distribution of fragment ion peaks, the M-peak having an ion intensity at least 3-fold higher than a background ion intensity produced by other immunoglobulins present in the mixture of immunoglobulins; and
    e. diagnosing the monoclonal gammopathy in the subject based on the presence of the M-protein peak.

8. The method of claim 7, wherein said decoupling comprises treating the intact immunoglobulins with a reducing agent.

9. A method of monitoring a treatment of monoclonal gammopathy in a subject, the method comprising:
    a. isolating (i) intact IgG, IgA, and/or IgM immunoglobulins, and/or (ii) intact lambda and/or kappa immunoglobulins from a first whole blood, serum, plasma or urine sample obtained from the subject before the treatment to obtain a first mixture of immunoglobulins comprising different intact immunoglobulins present in the subject;
    b. isolating (i) intact IgG, IgA, and/or IgM immunoglobulins, and/or (ii) intact lambda and/or kappa immunoglobulins from a second whole blood, serum, plasma or urine sample obtained from the subject during or after the treatment to obtain a second mixture of immunoglobulins comprising different intact immunoglobulins present in the subject;
    c. decoupling the intact immunoglobulins within the first immunoglobulin mixture to generate a first decoupled immunoglobulin sample comprising immunoglobulin heavy chains and immunoglobulin light chains, and decoupling the intact immunoglobulins within the second immunoglobulin mixture to generate a second decoupled immunoglobulin sample comprising immunoglobulin heavy chains and immunoglobulin light chains;
    d. subjecting the first and second decoupled immunoglobulin samples to a top down mass spectrometry technique to obtain a first mass spectrum of the first decoupled immunoglobulin sample and a second mass spectrum of the second decoupled immunoglobulin, each mass spectrum comprising a distribution of fragment ion peaks generated from the immunoglobulin light chains having a molecular mass of about 21,000 Da to about 26,000 Da;
    e. determining a first level of a monoclonal immunoglobulin expanded in the monoclonal gammopathy based on the M-protein peak within the distribution of fragment ion peaks in the first mass spectrum, the M-peak having an ion intensity at least 3-fold higher than a background ion intensity produced by other immunoglobulins present in the mixture of immunoglobulins, and determining a second level of the monoclonal immunoglobulin expanded in the monoclonal gammopathy based on the M-protein peak within the distribution of fragment ion peaks in the second mass spectrum; and f. comparing the first level of the monoclonal immunoglobulin and the second level of the monoclonal immunoglobulin wherein the treatment is determined to be effective when the second level is decreased relative to the first level, and wherein the treatment determined to be ineffective when the second level is not decreased relative to the first level.

10. The method of claim 9, wherein said decoupling comprises treating the intact immunoglobulins with a reducing agent.

* * * * *